United States Patent
Chen

(10) Patent No.: US 8,587,451 B2
(45) Date of Patent: Nov. 19, 2013

(54) LASER PROJECTION SYSTEM

(75) Inventor: Chih-Hsiao Chen, New Taipei (TW)

(73) Assignee: ALVIS Technologies Inc., New Taipei (TW)

( * ) Notice: Subject to any disclaimer, the term of this patent is extended or adjusted under 35 U.S.C. 154(b) by 307 days.

(21) Appl. No.: 13/157,001

(22) Filed: Jun. 9, 2011

(65) Prior Publication Data

US 2011/0316721 A1 Dec. 29, 2011

(30) Foreign Application Priority Data

Dec. 10, 2008 (CN) ............... 2008 2 0189919 U
Dec. 9, 2009 (CN) ............... 2009 1 0250433

(51) Int. Cl.
*G08B 7/00* (2006.01)

(52) U.S. Cl.
USPC .......... 340/815.69; 340/815.4; 340/815.65; 362/257; 353/30

(58) Field of Classification Search
USPC .......... 340/815.69, 815.65, 815.4; 363/257; 353/30

See application file for complete search history.

(56) References Cited

U.S. PATENT DOCUMENTS

| 4,213,153 A * | 7/1980 | Schafer ............... 348/744 |
| 6,900,916 B2 * | 5/2005 | Okazaki et al. ........... 359/202.1 |
| 2002/0122260 A1 * | 9/2002 | Okazaki et al. ........... 359/636 |

FOREIGN PATENT DOCUMENTS

| CN | 1482487 A | 3/2004 |
| CN | 1573525 A | 2/2005 |
| JP | 2006-91463 A | 4/2006 |

* cited by examiner

*Primary Examiner* — Travis Hunnings
(74) *Attorney, Agent, or Firm* — Muncy, Geissler, Olds & Lowe, PLLC

(57) ABSTRACT

A laser projection system including a projection screen and a laser projector is revealed. The projection screen includes at least one light emitting layer having at least one luminescent material that is excited by excitation light with a specific wavelength range to generate excited light with another wavelength range. The laser projector consists of a laser light source module, a laser signal modulation module, a rotation plane mirror module, a rotation plane mirror control module, and a signal conversion module. The laser projector produces excitation laser according to an image signal of a static image or dynamic image and projects the laser to the projection screen correspondingly for an image displayed. Thus a projected image with high recognition is displayed on the projection screen in a transparent manner in natural sunlight. Therefore efficiency and application of the laser projection are improved.

64 Claims, 34 Drawing Sheets

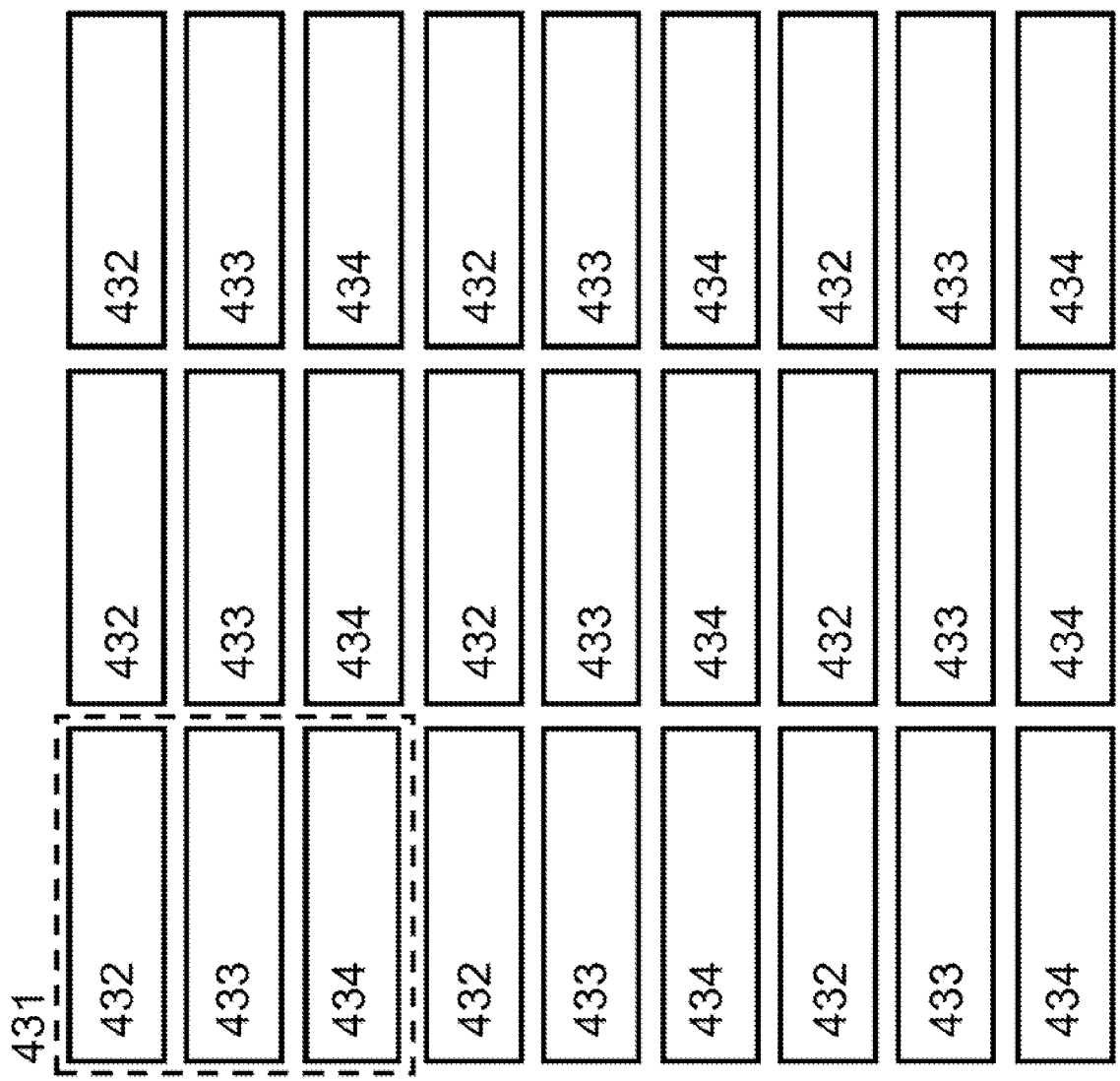

| 472 | 473 | 476 | 472 | 473 | 476 |
| 476 | 474 | 475 | 476 | 474 | 475 |
| 472 | 473 | 476 | 472 | 473 | 476 |
| 476 | 474 | 475 | 476 | 474 | 475 |
| 472 | 473 | 476 | 472 | 473 | 476 |
| 476 | 474 | 475 | 476 | 474 | 475 |

(471 indicates the dashed 2×3 group at lower-left containing 472/476, 473/474, 476/475)

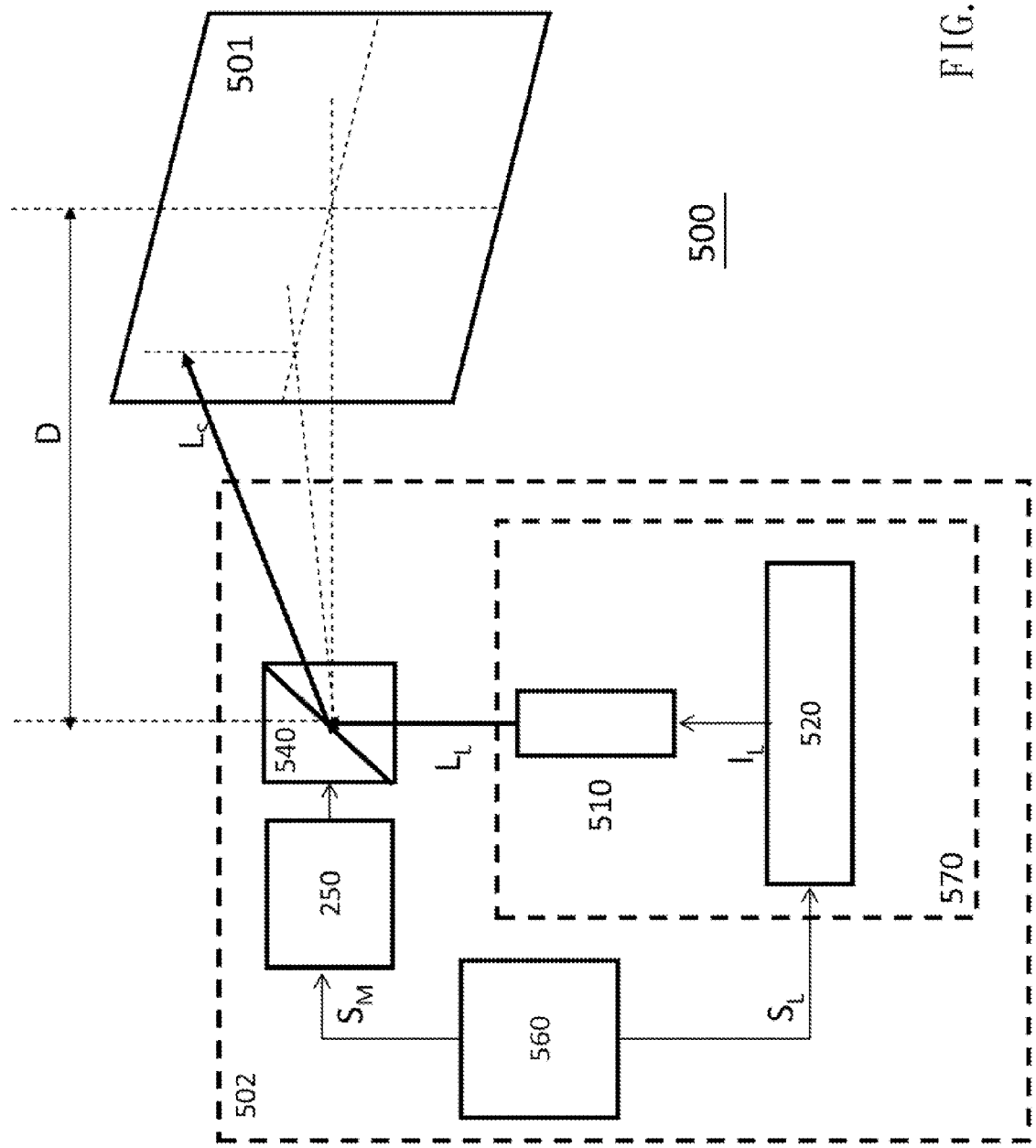

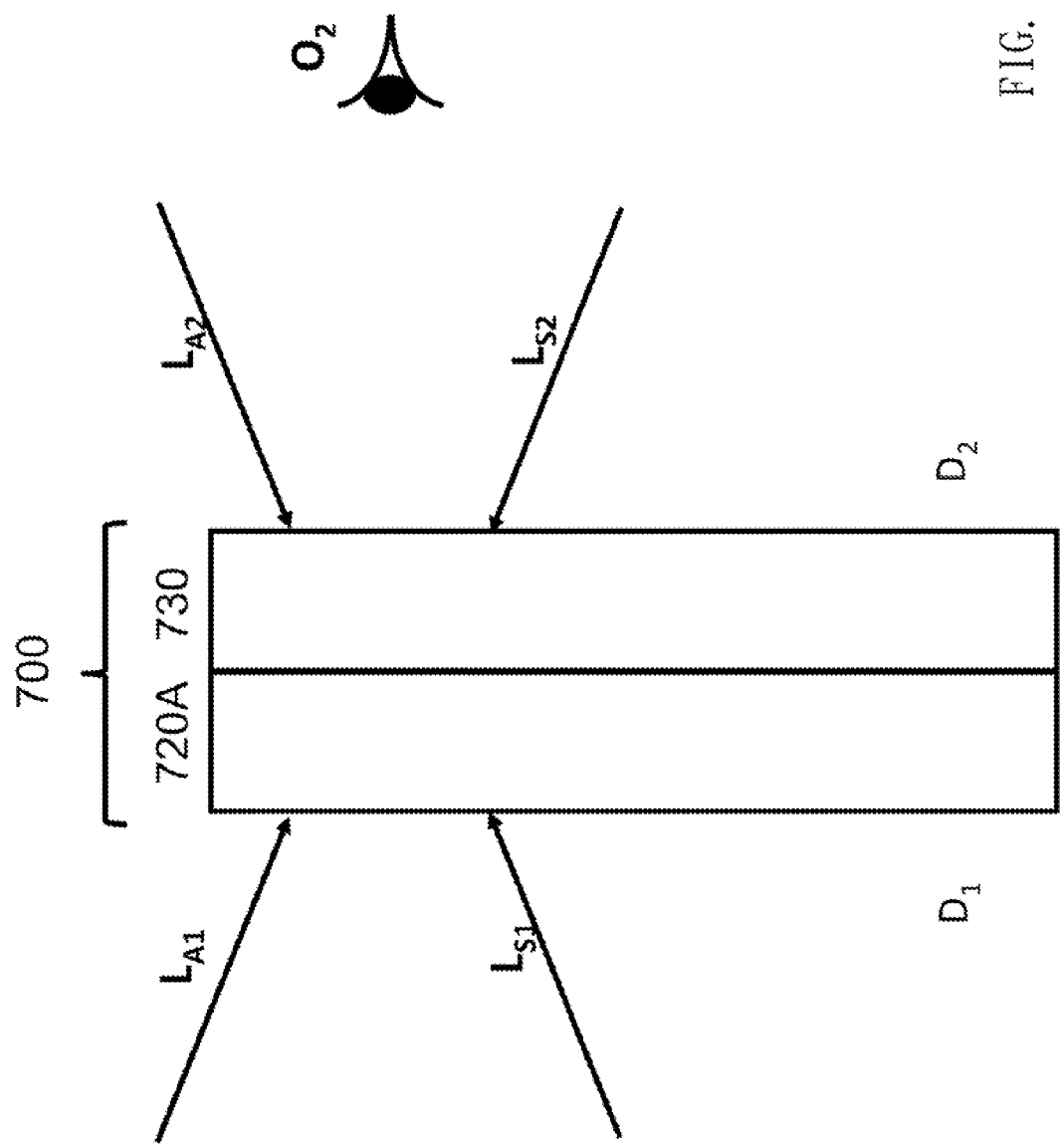

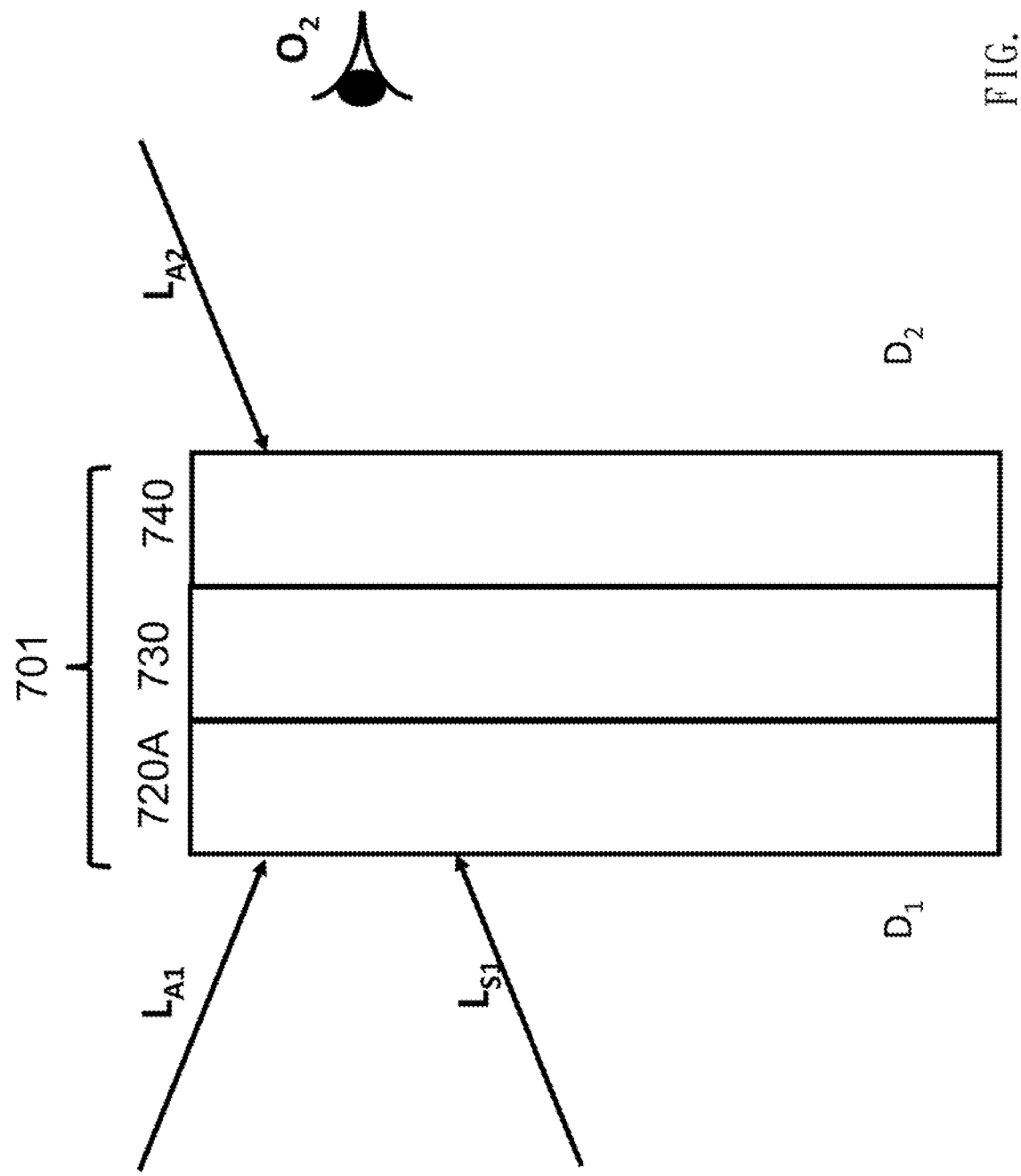

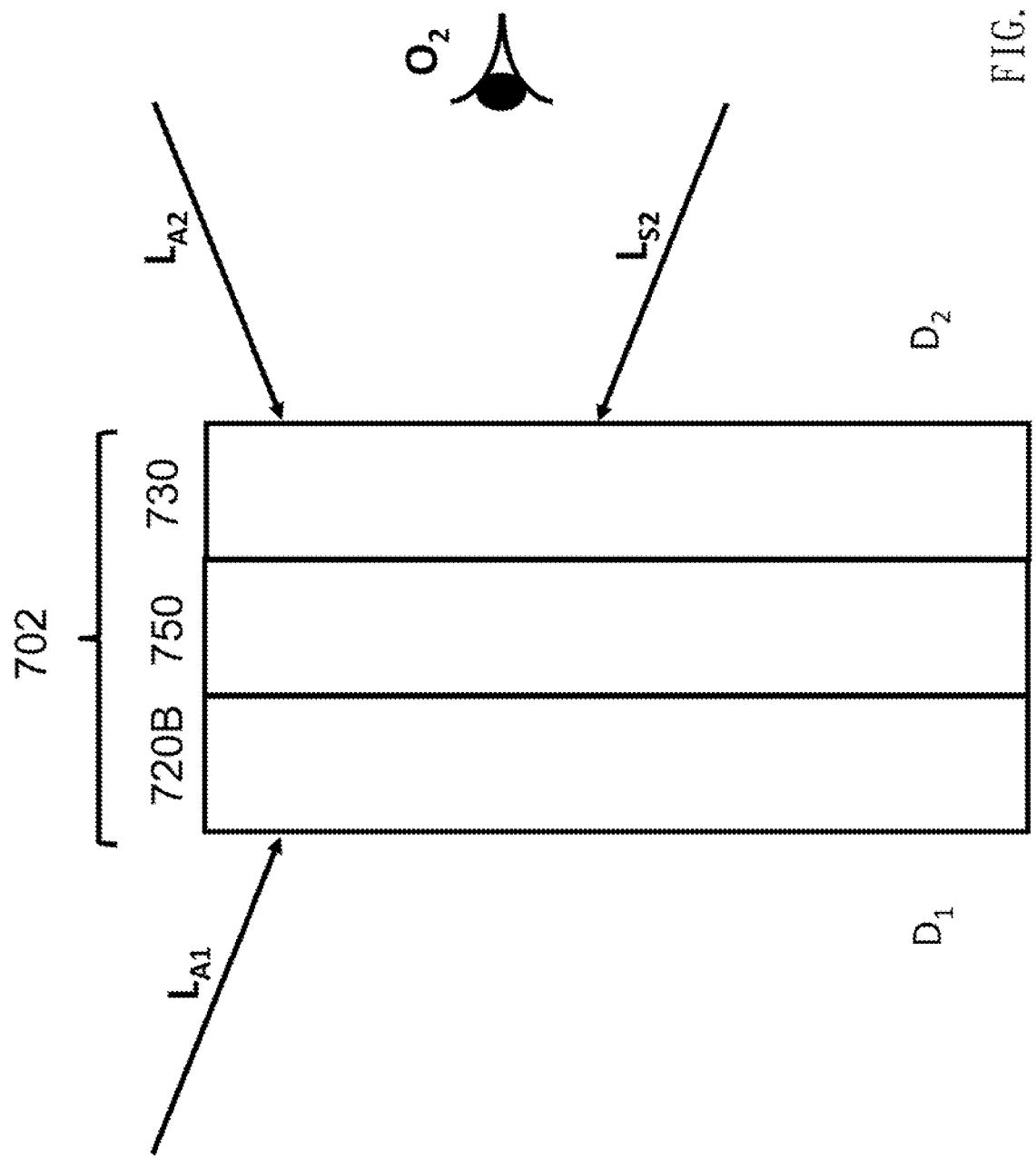

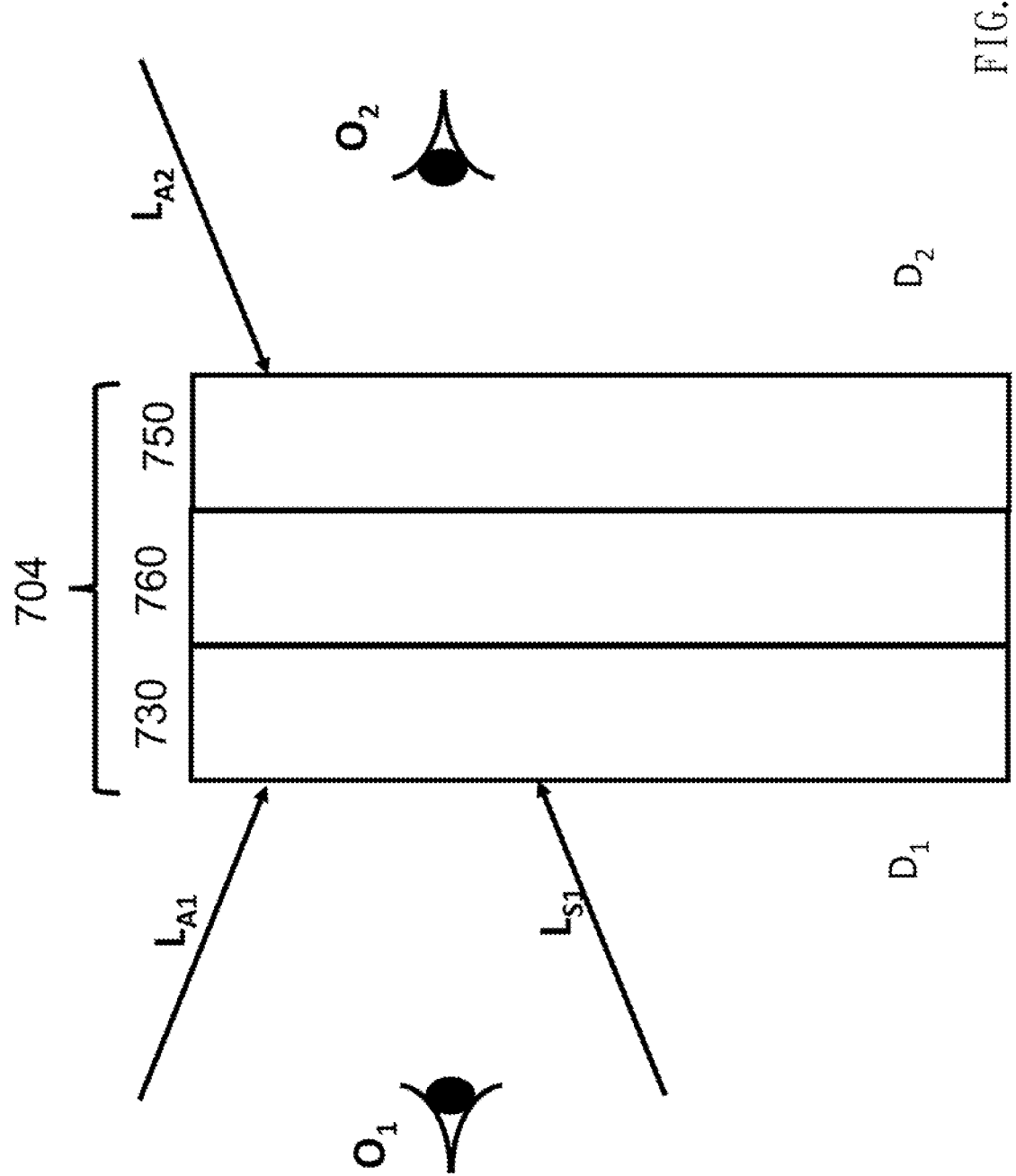

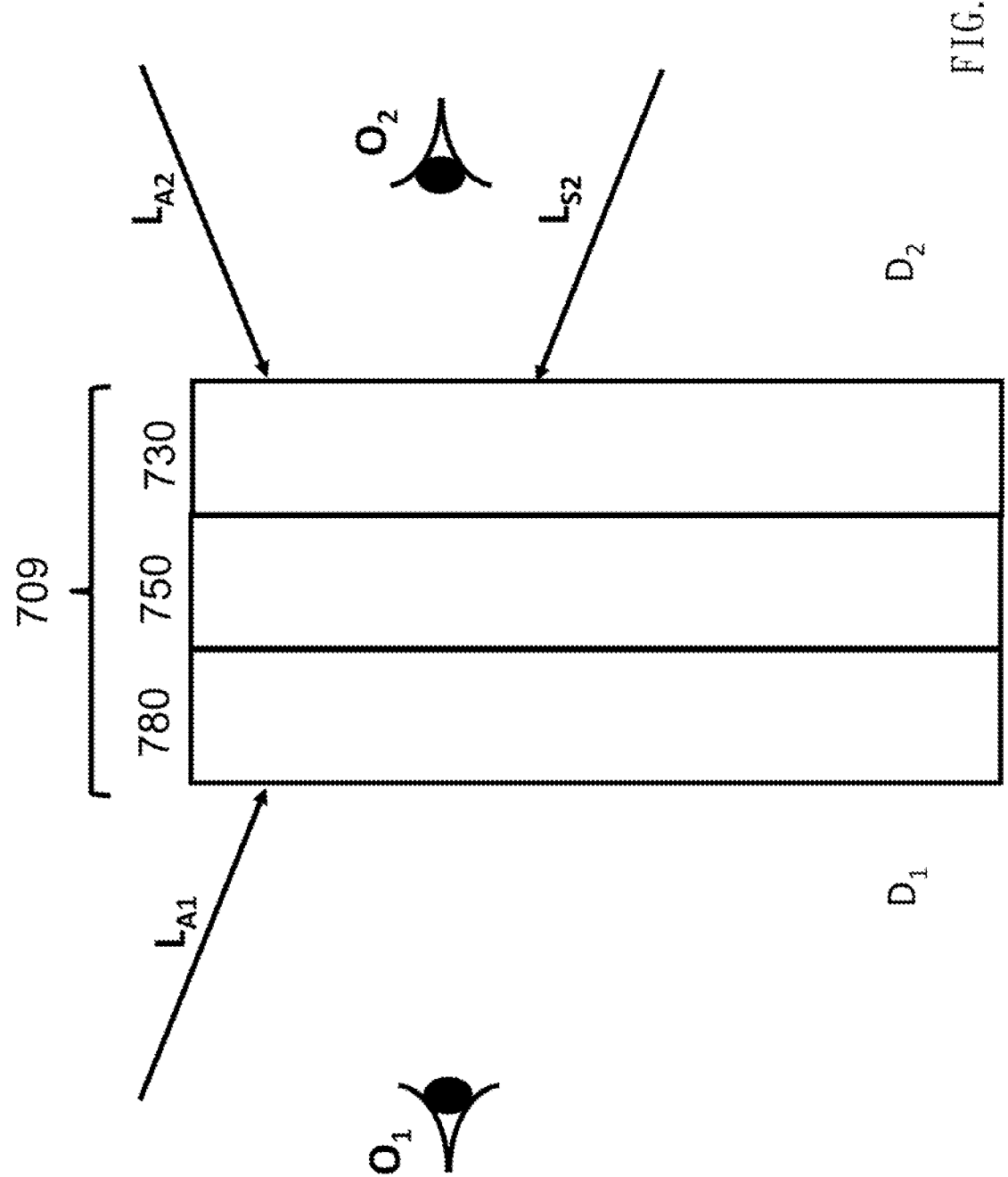

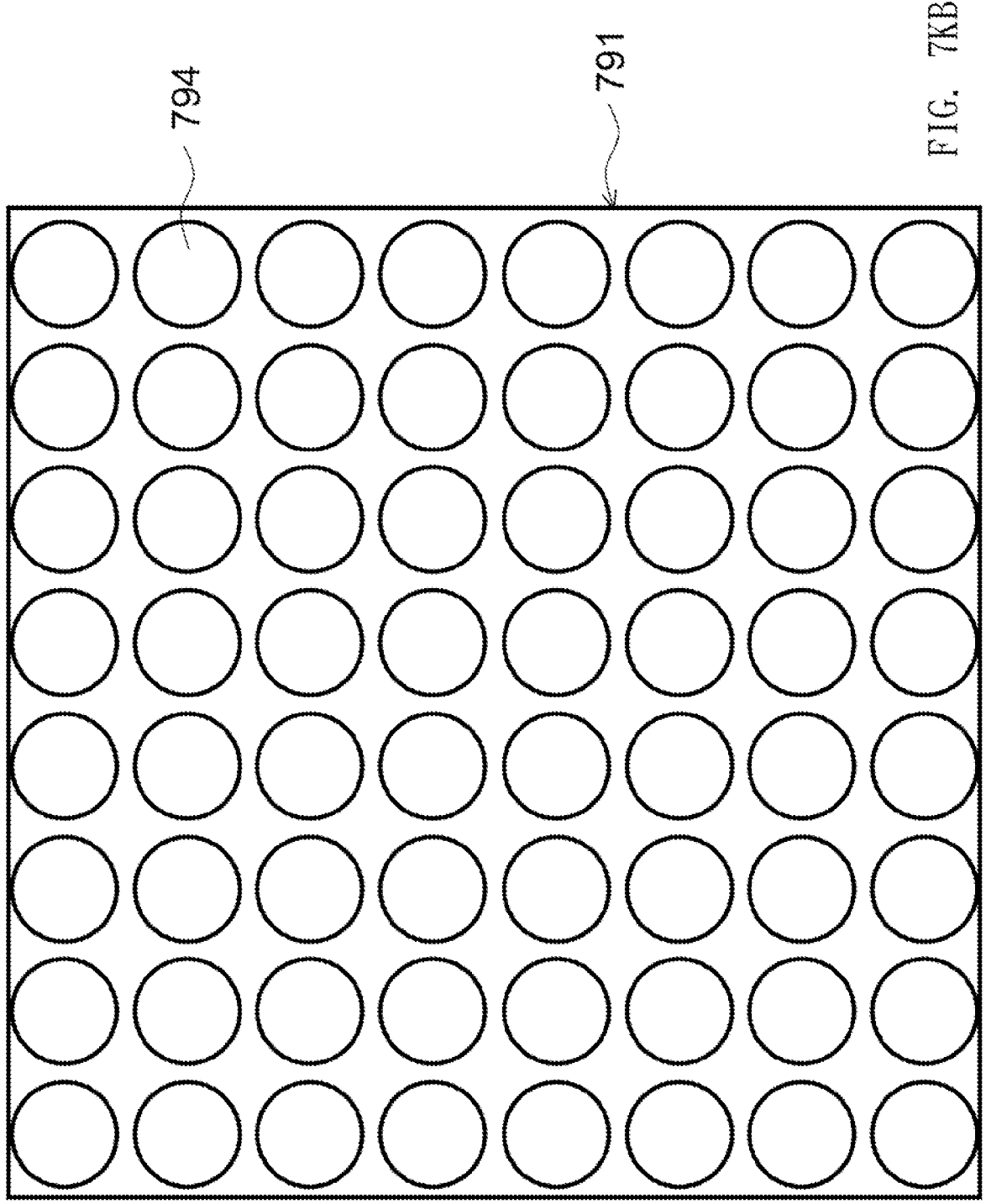

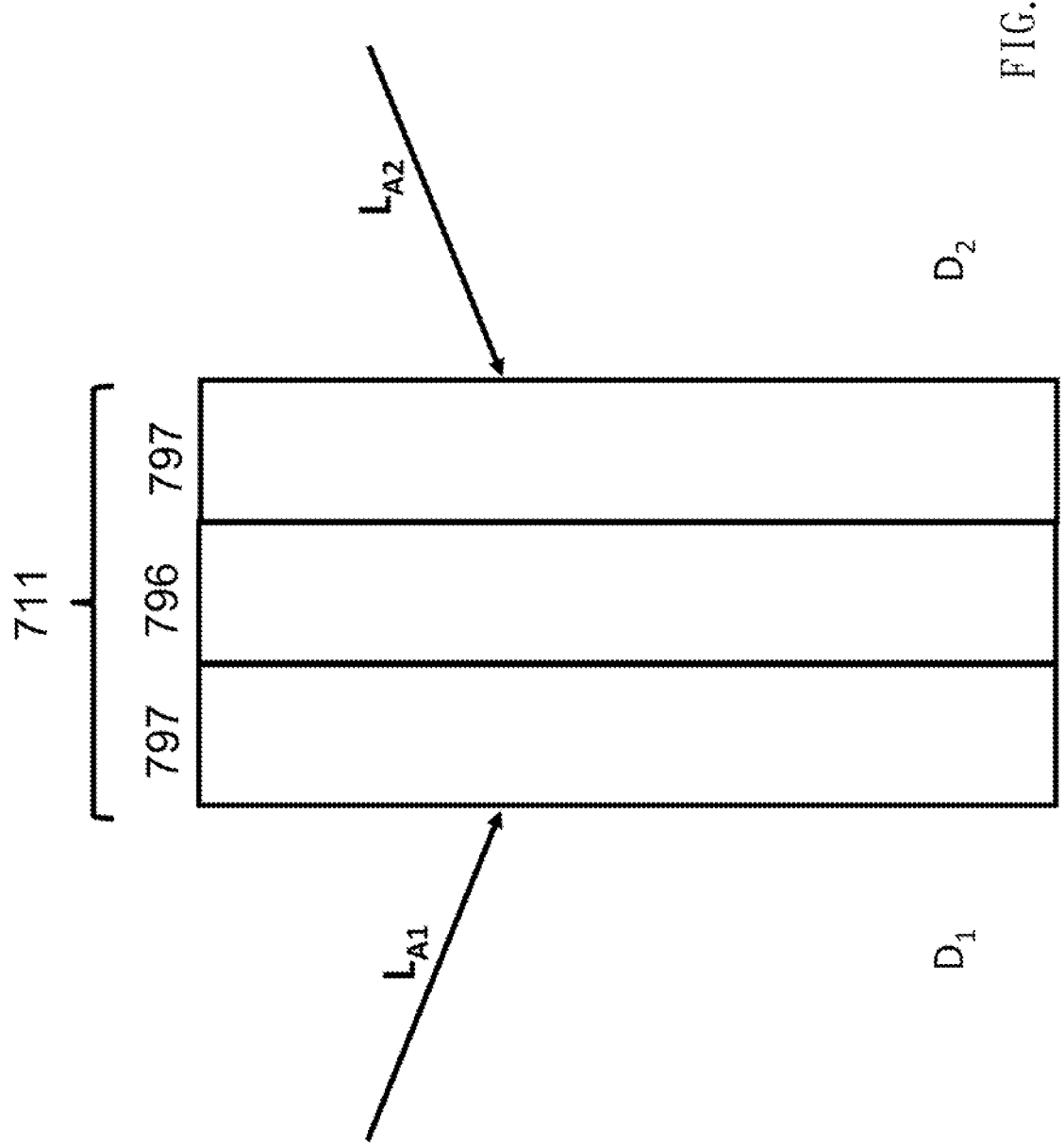

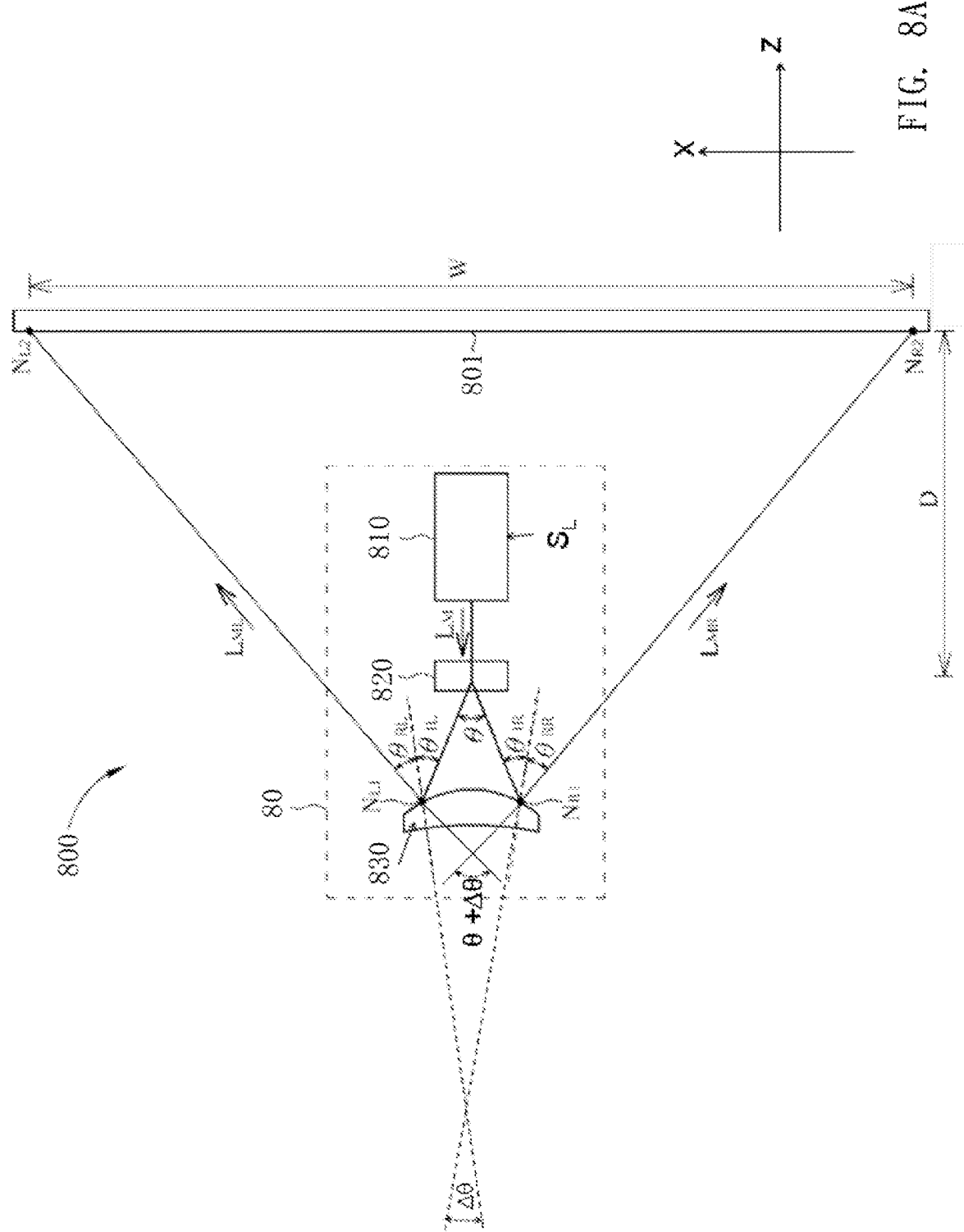

LASER PROJECTION SYSTEM

BACKGROUND OF THE INVENTION

1. Fields of the Invention

The present invention relates to a projection system, especially to a laser projection system in which a laser projector emits laser beams according to an image signal of a static image or a dynamic image and projects the laser to a corresponding projection screen to generate an image. Thus a projection nearly transparent is displayed in a nearly transparent manner on the projection screen in natural sunlight. The projected image and objects behind the projection screen are seen at the same time.

2. Descriptions of Related Art

A lot of designs related to laser projection system are available now. Among them, U.S. Pat. Nos. 6,986,581, 7,090, 355, 7,182,467, 7,213,923, 7,452,082, etc. are related to films of projection screens. Refer to U.S. Pat. No. 6,843,568 and the references cited, a laser scanning display is revealed. In the U.S. Pat. No. 6,329,966, techniques related to UV beam on phosphorus dots on film are revealed. The U.S. Pat. No. 4,213,153 discloses images formed by modulated UV laser on phosphorus material. In the U.S. Pat. No. 6,900,916, techniques regarding scanned UV light to generate images on fluoresce film are disclosed.

Refer to FIG. 1, a common laser projection system 100 includes a laser projector 10 and a projection screen 101. According to the image signal S1, the laser projector 10 projects images onto the projection screen 101. The laser projector 10 consists of a laser light source module 110 and a rotation plane mirror module 120. The laser light source module 110 is composed of a visible red laser light source 111, a visible blue laser light source 112, a visible green laser light source 113, an alignment module 115, and a modulation module 114. The visible red laser light source 111, the visible blue laser light source 112, and the visible green laser light source 113 respectively are used to provide a visible red laser beam $L_R$, a visible blue laser beam $L_B$, a visible green laser beam $L_G$ according to driving current $I_{RD}$, $I_{BD}$, and $I_{GD}$. In accordance with an image signal $S_1$, the modulation module 114 provides the respective driving current $I_{RD}$, $I_{BD}$, and $I_{GD}$ to the visible red laser light source 111, the visible blue laser light source 112, and the visible green laser light source 113 for modulation of the laser beams $L_R$, $L_B$, and $L_G$ so as to achieve light intensity of the figures and words required on the projection screen 101. As to the alignment module 115, it aligns the laser beams $L_R$, $L_B$, and $L_G$ to generate a modulated laser beam $L_M$. The rotation plane mirror module 120 is for reflecting the modulated laser beam $L_M$ to the projection screen 101. By the rotation plane mirror module 120, the laser projector 10 adjusts a deflection angle θ and a deflection angle φ for changing the direction of the modulated laser beam $L_M$ after reflection. Thus the modulated laser beam $L_M$ scan each position corresponding to each pixel of the projection screen 101 quickly and an image is displayed on the projection screen 101 due to the modulated laser beam $L_M$ being scattered by the projection screen 101.

The laser projection technology mentioned above has following disadvantages:

1. For images formed by scattering, the projection screen is not transparent. Thus the applications of the imaging technique to transparent screens are restricted. For example, the transparent screen may be a head-up display that projects images onto a car glass windshield.

2. The deflection angles θ, φ of the rotation plane mirror module are limited. Thus the distance D between the projection screen and the laser projector needs to be increased so as to generate a larger projected image.

3. When visible light of the background light is lighter and emitted to the projection screen, the color contrast of the images formed is reduced.

SUMMARY OF THE INVENTION

Therefore it is a primary object of the present invention to provide a laser projection system, especially to a laser projector that generates excitation laser according to an image signal of a single static image or dynamic image and projects the laser to a corresponding projection screen for generation of a projected image. The projection screen includes at least one light emitting layer with at least one luminescent material that is excited by excitation light with a specific wavelength range to generate excited light with another wavelength range. The transverse distance between particles of each luminescent material in a plane parallel to the projection screen is smaller than a diameter of the cross section of the laser beam. Thus in natural sunlight, the image with high recognition is displayed on the projection screen transparently. Besides the projected image, the object behind the projection screen can also be seen at the same time. Therefore, the efficiency and application of the laser projection system are improved.

It is another object of the present invention to provide a laser projection system that uses laser with wavelength of invisible light including but not limited to, 808 nm, 850 nm, 980 nm, 1064 nm, etc. or wavelength of light less sensitive for eyes includes, but not limited to, 405 nm, 780 nm, etc. as laser light source of the laser light source module. Moreover, excitation light source whose color is similar to the excited light, including but not limited to the laser light with the wavelength of 405 nmb (violet purple) or 450 nm (blue) to produce blue images (about 450 nm wavelength). Or laser light with the wavelength of 780 nm (red), 640 nm (red) excites the light emitting layer to generate red images (the wavelength is about 640 nm). Thus the messed-up color caused by reflection or scattering of excitation light is reduced.

It is a further object of the present invention to provide a laser projection system in which a laser light source module includes a type one laser light source module and a type two laser light source module. And a corresponding transparent projection screen includes a light emitting layer and a scattering layer. The light emitting layer is in front of the scattering layer, facing light beam projected from the laser projector. The type one laser light source module includes at least one set of laser sources, respectively emitting laser light with type one wavelength that is corresponding to and within the excitation light wavelength of various luminescent materials in the light emitting layer so as to excite the luminescent materials in the light emitting layer and produce excited light respectively. The type one laser light source module includes at least one set of laser sources, respectively emitting laser light with a type one wavelength. The light emitting layer has low absorption and scattering of the laser light with the type two wavelength and emitted from the type one laser light source module so that the laser light with the type two wavelength passes through the light emitting layer and enters the scattering layer. Most of the laser light with type one wavelength emitted from the type one laser light source module is absorbed by the light emitting layer. The scattering layer is used to scatter the laser light with type two wavelengths and the excited light that is emitted from the light emitting layer and is excited by the laser light with type one wavelength.

It is a further object of the present invention to provide a laser projection system in which a light emitting layer of a projection screen is further assembled with other functional layers to form a projection screen for improving efficiency and applications of the laser projection system. The functional layers include an excited light absorption layer, an excitation light absorption layer, an excited light and scattered light absorption layer, a scattering layer, an excitation light reflection layer, an excited light partial reflection layer, a partial reflection layer of excitation light and scattered light, a light gathering layer, partial light shielding layer, etc. Thus the effect and application of the laser projection system are improved.

It is a further object of the present invention to provide a laser projection system which further includes at least one convex mirror disposed between a rotation plane mirror module and a projection screen of a laser projector. Or the laser projection system includes at least one plane mirror module arranged between the convex mirror and the projection screen. Thus laser beam from the laser projector, reflected by the rotation plane mirror module is reflected by the convex mirror or the plane mirror module to be projected onto the projection screen so as to increase scanning angle of the laser beam. Therefore the height and width of the projected image are increased under the condition that a distance between the projection screen and the laser projector is fixed.

In order to achieve above objects, a laser projection system of the present invention includes a projection screen and a laser projector. The laser projector produces excitation light according to an image signal of a single static image or dynamic image and the projects the excitation light to a corresponding transparent projection screen for displaying an image.

The projection screen includes at least one light emitting layer having at least one luminescent material, ranging from $F_1, F_2, \ldots, F_n$. The luminescent material is excited to emit excited light with a wavelength range after being exposed to and radiated by excitation light with another wavelength range.

The transverse distance between particles of luminescent materials, parallel to the projection screen, is much smaller than a diameter of the cross section of the laser beam.

The laser projector includes a laser light source module, a laser signal modulation module, an alignment module, a rotation plane mirror module, a rotation plane mirror control module, and a signal conversion module.

The signal conversion module receives the image signal $S_1$ the of a single static image or dynamic image and coverts the image signal $S_1$ into a signals $S_L$ that controls the laser light source module and a signal $S_M$ that controls the rotation plane mirror module. The signal conversion module also coordinates signals of the laser signal modulation module and signals of the rotation plane mirror module in a synchronous manner.

The laser light source module includes at least one set of laser source, respectively emitting laser beam $L_{1S}, L_{2S}, \ldots, L_{nS}$ with wavelength of $\lambda_{1L}, \lambda_{2L}, \ldots, \lambda_{nL}$, corresponding to and falling within wavelength range $\lambda_{1S}, \lambda_{2S}, \ldots, \lambda_{nS}$ of the excitation light for respective luminescent material of the light emitting layer. Thus each luminescent material of the light emitting layer is excited to generate light with wavelength of $\lambda_{1E}, \lambda_{2E}, \ldots, \lambda_{nE}$.

The alignment module is to align all laser beams $L_{1S}, L_{2S}, \ldots, L_{nS} (L_{iS})$ to generate the gross modulated laser beam $L_M$. The gross modulated laser beam $L_M$ is incident into and is reflected by the rotation plane mirror module to form a gross modulated scanning laser beam $L_S$ which is projected onto the projection screen.

The rotation plane mirror module is used to rotate a certain angle θ at a first plane and rotate a certain angle φ at a second plane that is not parallel to the first plane.

The rotation plane mirror control module is used to control rotation of the rotation plane mirror module, receive the signal SM from the signal conversion module and coverts the signal SM into signal that controls rotation angle of the rotation plane mirror module. Thus the rotation angle of the rotation plane mirror module is controlled by the rotation plane mirror control module to be changed along with the time. And the gross modulated scanning laser beam $L_S$ progressively scans each position of the projection screen that is intended to produce exited light.

According to the image signal $S_1$ of a single static image or dynamic image from the signal conversion module, the laser signal modulation module generates driving current $I_i$, respectively corresponding to each laser light source so as to modulate light power of the respective laser beam $L_{iS}$ with specific wavelength.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4A-4E are schematic drawings showing arrangement of adjacent pixels of a light emitting layer of a projection screen of the embodiment in FIG. 4;

FIG. 5 is a schematic drawing showing a further embodiment of a laser projection system according to the present invention;

FIG. 7A-7K are schematic drawings showing different structures of a further embodiment of a projection screen according to the present invention;

FIG. 7KA is an embodiment of a light shielding layer of the embodiment in FIG. 7K according to the present invention;

FIG. 7KB is an embodiment of a light gathering layer of the embodiment in FIG. 7K according to the present invention;

FIG. 7L is a schematic drawing showing a twelfth kind of projection screen of an embodiment according to the present invention;

FIG. 8A is a top view of a cross section of a laser projection system parallel to the x-z plane according to the present invention;

DETAILED DESCRIPTION OF THE PREFERRED EMBODIMENT

Embodiment 1

Figure 2:
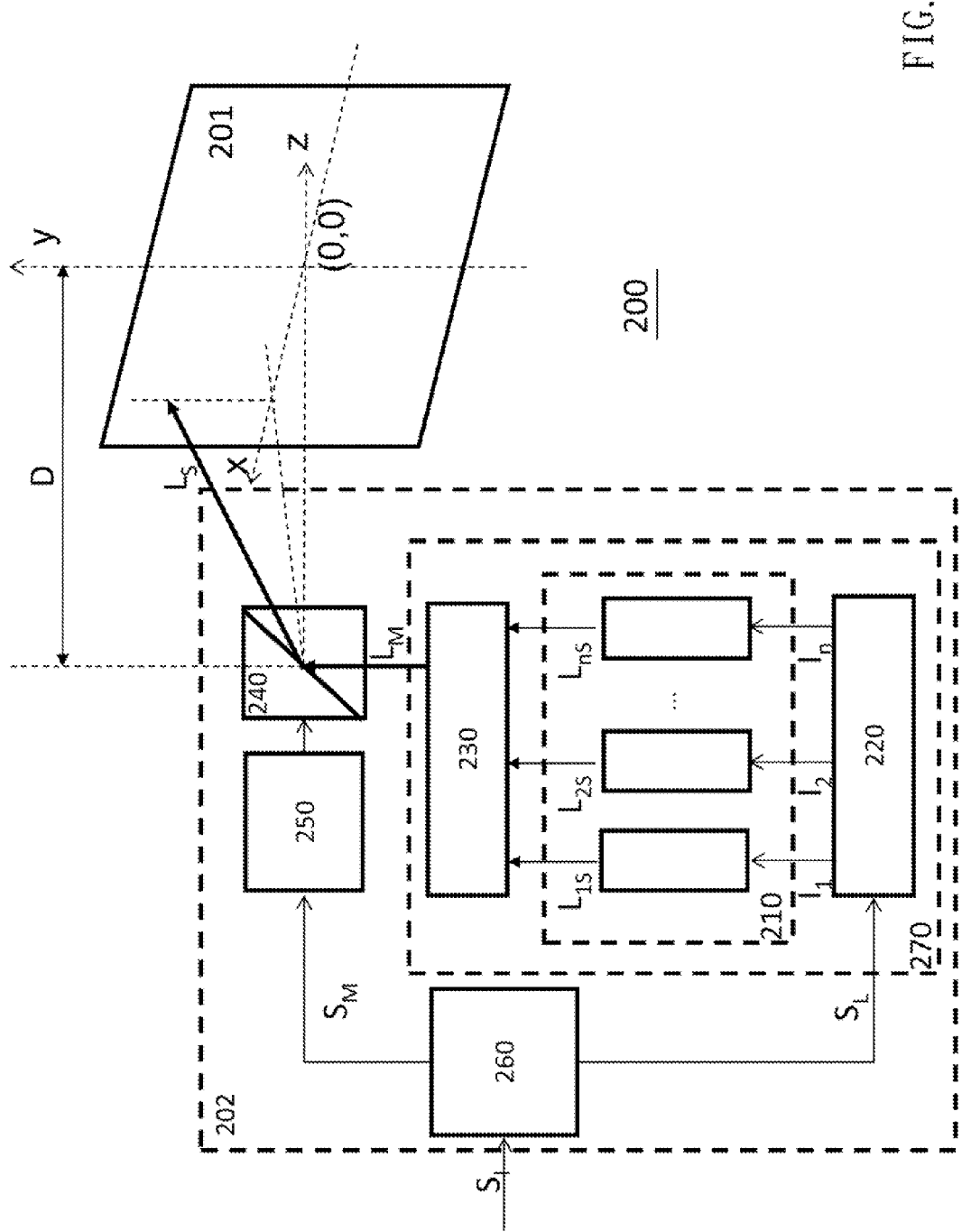
FIG. 2 is a schematic drawing showing an embodiment of a laser projection system according to the present invention.

Refer to FIG. 2, a laser projection system 200 of the present invention includes a projection screen 201 and a laser projector 202. According to an image signal $S_1$ of a single static image or dynamic image, the laser projector 202 projects images onto the projection screen 201. The laser projector 202 consists of a laser light source module 210, a laser signal modulation module 220, an alignment module 230, a rotation plane mirror module 240, a rotation plane mirror control module 250, and a signal conversion module 260. Moreover, for convenience of further discussion, the combination of the laser light source module 210, the laser signal modulation module 220, and the alignment module 230 is defined as an optical laser module 270.

The projection screen 201 includes a light emitting layer having at least one luminescent material, ranging from $F_1$, $F_2$, ..., $F_n$. n is the number of kinds of the luminescent material. The luminescent material is excited to emit excited light with a wavelength range after being exposed to and radiated by excitation light with another wavelength range, having but not limited to fluorescent materials, phosphorescent materials, laser dyes, laser crystal, etc. After being excited by light having different wavelength ($\lambda_{1S}, \lambda_{2S}, ..., \lambda_{nS}$), each luminescent material in the light-emitting layer emits light with different wavelength ($\lambda_{1E}, \lambda_{2E}, ..., \lambda_{nE}$). In order to make each position of a single laser beam projected onto the projection screen become excited and emit light with different wavelengths, a cross section of the single laser beam should cover lots of different kinds of particles of luminescent materials. Thus the transverse distance between different kinds of particles of luminescent materials, parallel to the projection screen, is much smaller than a diameter of the cross section of the laser beam. In this embodiment, the $\lambda_{1S}, \lambda_{2S}, ..., \lambda_{nS}$ and the $\lambda_{1E}, \lambda_{2E}, ..., \lambda_{nE}$ can be either a value or a certain range.

In order to improve excitation efficiency of the light emitting layer and reduce light power of the pump laser transmitted through the light emitting layer, the light emitting layer should absorb most of the energy of the pump laser. Moreover, in order to make the light emitting layer look transparent, scattering and absorption of visible light should be minimized. One of the factors that achieve this purpose is that the particle diameter of the luminescent material should be smaller than the shortest wavelength of visible light (about 360 nm).

Figure 2A:
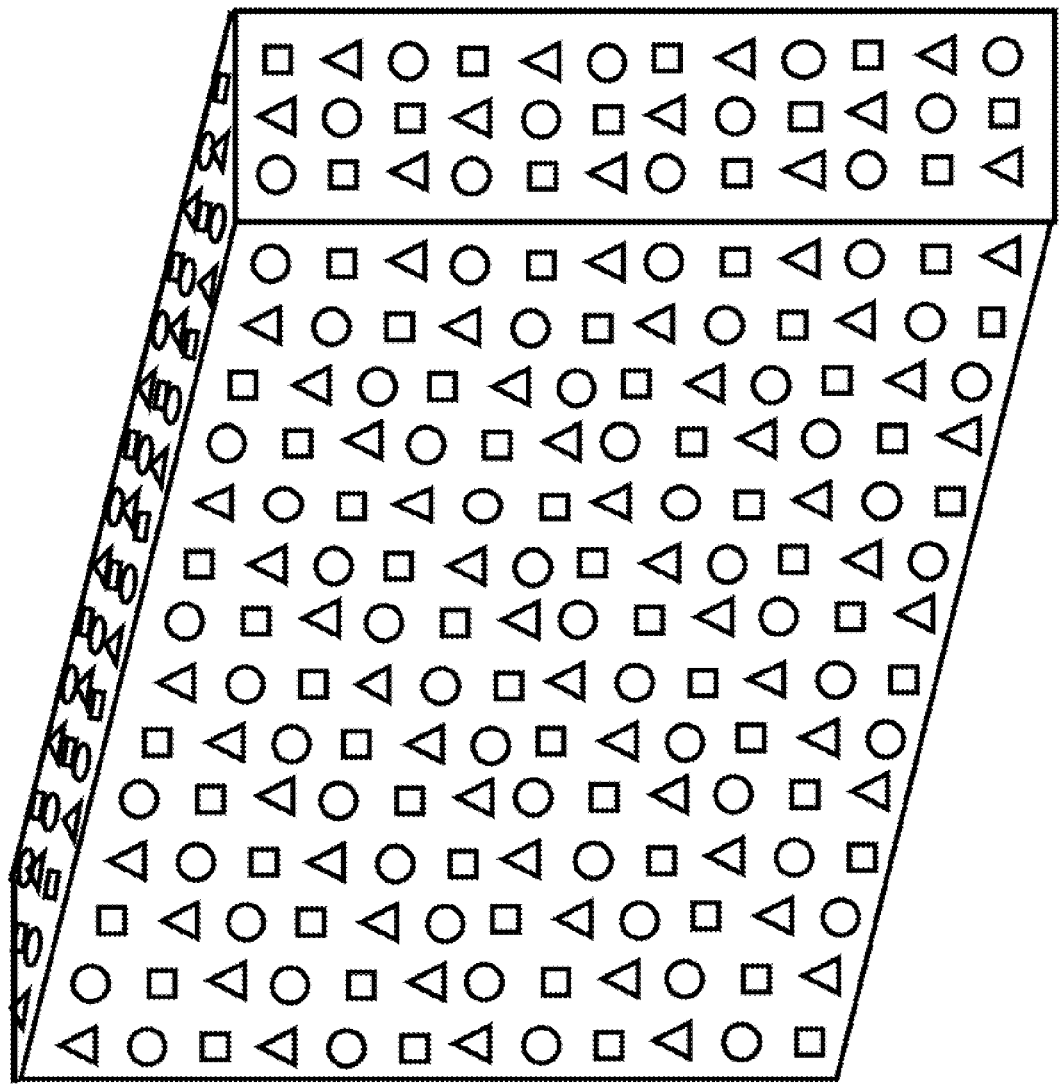
FIG. 2A-2C are schematic drawings showing different structures of a light emitting layer of a projection screen of the embodiment in FIG. 2.
Figure 2B:
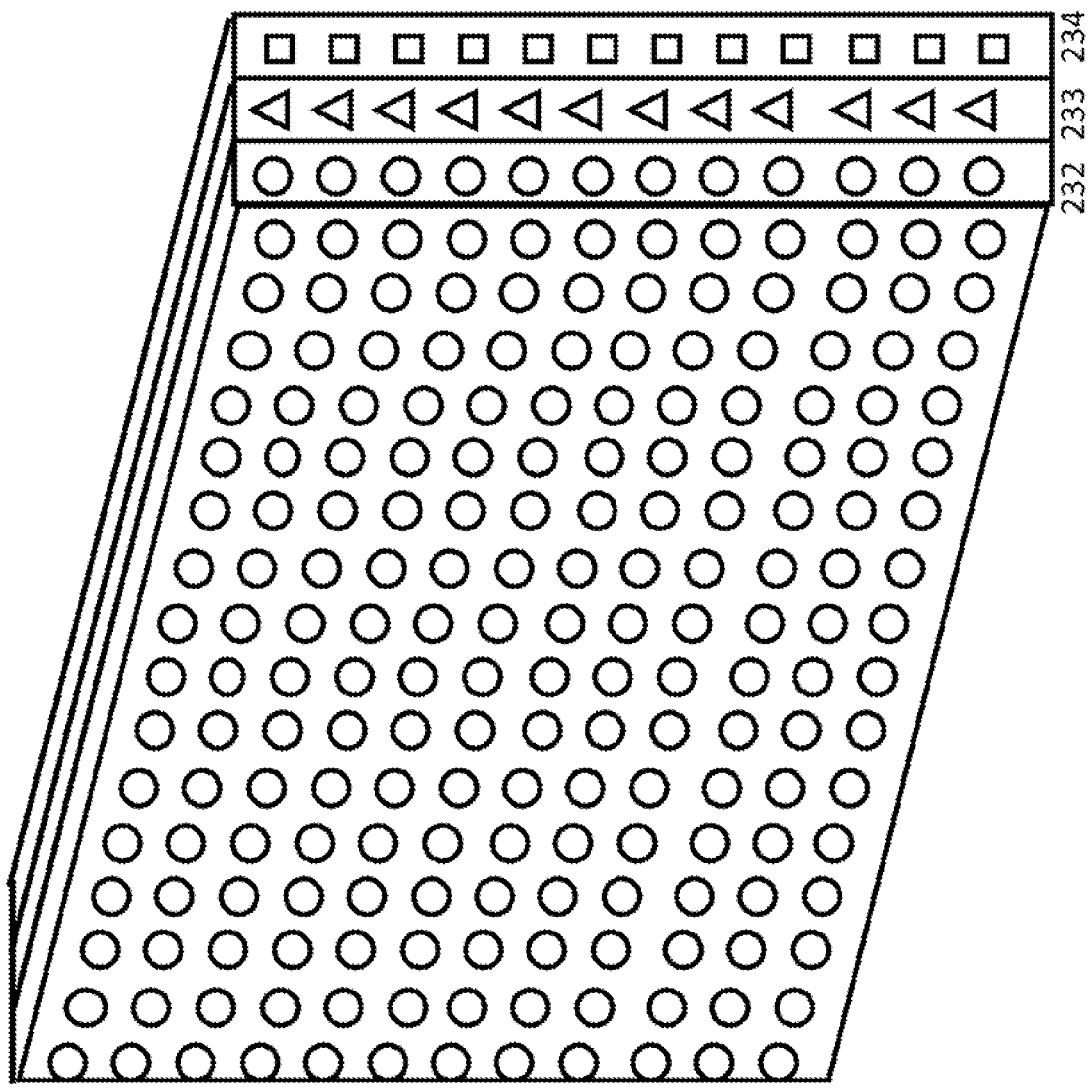
Figure 2C:
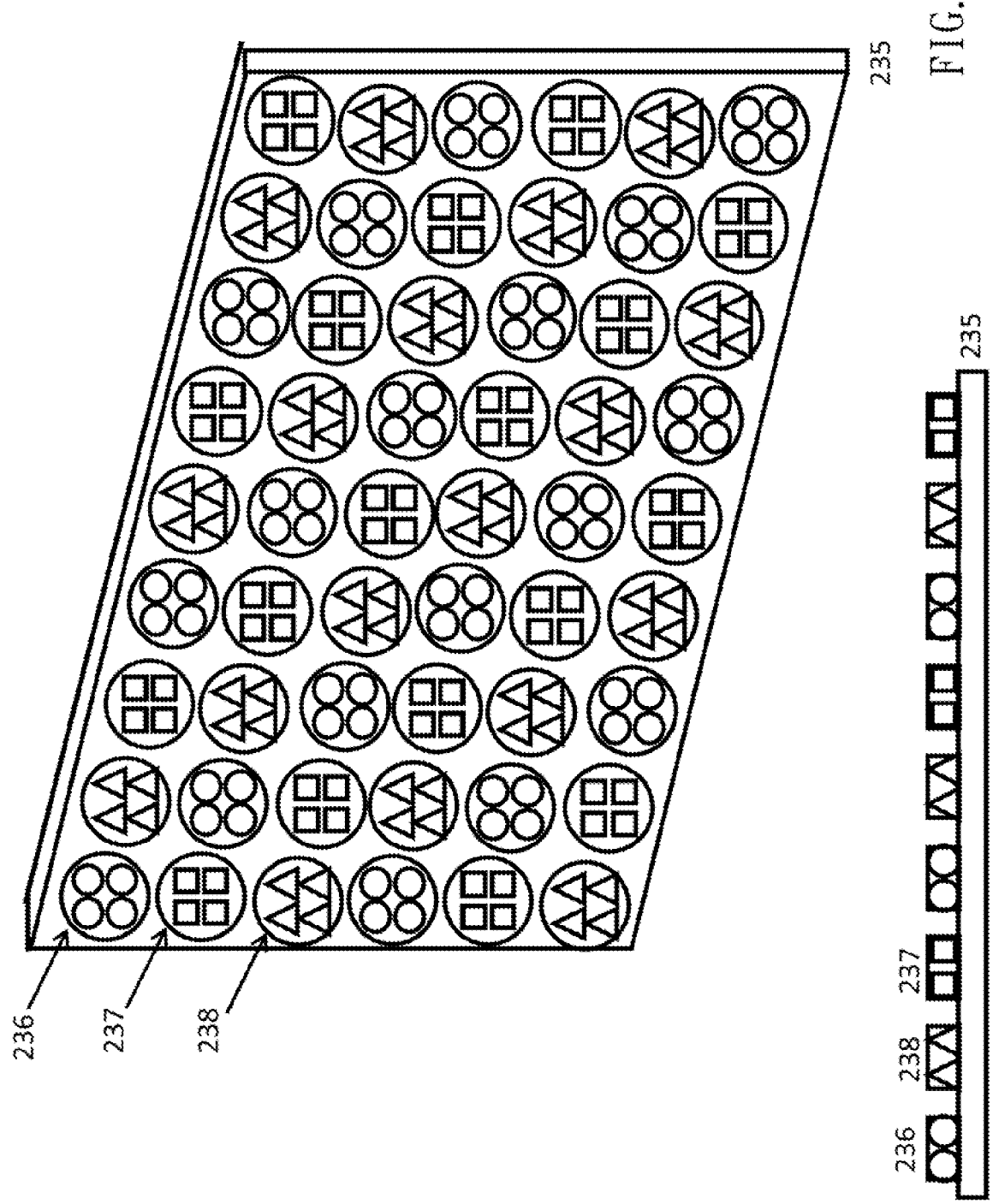

The longitudinal section of the light emitting layer is including but not limited to 2A, FIG. 2B or FIG. 2C. The circles, triangles, and squares respectively represent different luminescent materials. In the FIG. 2A, a substrate 231 includes but not limited to transparent plastic or glass such as twisted nematic (TN) material, super twisted nematic (STN) material, polycarbonate resin (PC), cyclo-olefin copolymers (COC), polyethylene terephthalate (PET), epoxy, etc with a plurality of luminescent materials. In the substrate, the light power ($P_{1E}, P_{2E}, ..., P_{nE}$) of light beams ($L_{1S}, L_{2S}, ..., L_{nS}$) of the excitation light is easy to be set for generating required light energy per unit area of the excitation light when the luminescent materials are distributed evenly at each position that may be irradiated by the excitation light.

In FIG. 2B, each of the three substrates 232, 233, 234 include but not limited to transparent plastic such as TN, STN, PC, COC, PET, epoxy, etc. with a luminescent material. The light power of the excitation light beams can be set easily to generate required light energy per unit area of the excited light when each luminescent material is distributed evenly at each position of the respective substrate that may be irradiated by the excitation light. In FIG. 2B, each substrate 232, 233, 234 only includes, but not limited to, a layer of luminescent material.

In FIG. 2C, a substrate plate 235 is used to load microparticle 236, 237, 238 of various luminescent materials. The respective microparticle 236, 237, 238 includes different substrate loaded with different luminescent material. The microparticle 236, 237, 238 is distributed evenly at each position of the substrate plate 235 that may be irradiated by the excitation light.

In order to make each position of a single laser beam Ls projected onto the projection screen 201 become excited and emit light with different wavelengths at the same time, a cross section of the single laser beam should cover lots of different kinds of particles of luminescent materials. Thus transverse distance between microparticles 236, 237, 238, parallel to both the cross section of the substrate plate 235 and the projection screen 201, should be far more smaller than the diameter of the cross section of the laser beam Ls.

Compared with the structure shown in FIG. 2A and FIG. 2B, the distribution density of the microparticles at different positions in the structure in FIG. 2C are more easily to be adjusted. When the light beam with the same light energy scans each position of the projection screen, the light emitting layer is excited to generate different energy combination of the excited light. This is especially suitable for an embodiment of a static image display system in FIG. 5. The structure and working principle of the embodiment in FIG. 5 will be described in details later.

The manufacturing of the embodiment in FIG. 2C includes, but not limited to, the following steps. Each of various luminescent materials is dissolved in a respective solution. The solution includes but not limited to epoxy. The respective solution containing each luminescent material is disposed on the substrate plate 235 by ink-jet printing, evaporation, etc. to form microparticles. Then the substrate plate 235 with various kinds of microparticles is cured.

The signal conversion module 260 receives the image signal $S_1$ of a single static image or dynamic image and coverts the signal $S_1$ into a signals $S_L$ that controls the laser light source module 210 and a signal $S_M$ that controls the rotation plane mirror module 240. The signal conversion module 260 also coordinates signals of the laser signal modulation module 220 and signals of the rotation plane mirror module 240 in a synchronous manner.

The laser light source module 210 includes at least one set of laser source, respectively emitting laser beam $L_{1S}$, $L_{2S}, ..., L_{nS}$ with wavelength of $\lambda_{1L}, \lambda_{2L}, ..., \lambda_{nL}$, corresponding to and within wavelength range $\lambda_{1S}, \lambda_{2S}, ..., \lambda_{nS}$ of the excitation light for respective luminescent material of the light emitting layer. Thus each luminescent material of the light emitting layer is excited to generate light with wavelength of $\lambda_{1E}, \lambda_{2E}, \ldots, \lambda_{nE}$.

In order to enable light power per unit area of the light with the wavelength of $\lambda_{1E}, \lambda_{2E}, \ldots, \lambda_{nE}$ generated at each point of the projection screen is under control of light power of excitation light $L_{1S}, L_{2S}, \ldots, L_{nS}$ it should be avoided that a single excitation light is irradiated from a light source and excited light emitted is having at least two wavelengths. While selecting the wavelength of the laser and the luminescent materials of the light emitting layer, the overlapping between $\lambda_{iS}$ and $\lambda_{jS}$ should be reduced, wherein $1 \le i, j \le n$ and $\lambda_{iE} \ne \lambda_{jE}$. Moreover, the excited light whose wavelength is not equal to $\lambda_{iE}$ is produced when the $\lambda_{iS}$ is irradiated to the luminescent materials of each light emitting layer. Thus the $\lambda_{iS}$ irradiated to the luminescent should be reduced.

Furthermore, the light power of the laser with the wavelength of $\lambda iL$ is limited due to the production of the laser light source. If users intend to increase the light energy per unit area of the laser light with a specific wavelength $\lambda iE$, there are two ways. Firstly, there are m kinds of luminescent materials in the light emitting layer and each luminescent material is excited by light with different wavelength range $\lambda_{1mS}, \lambda_{2mS}, \ldots, \lambda_{mmS}$ while the excited light generated is with the same wavelength $\lambda_{iE}$. The laser light source module 210 is arranged with a number of m laser sources whose wavelength is corresponding to respective excitation wavelength of the luminescent material while the number m is greater than or equal to 2 ($m \ge 2$). Thus the light energy per unit area of the excited light with wavelength of $\lambda_{iE}$ on the positions each light beam projected onto the light emitting layer is equal to the total excited light of m luminescent materials excited by m laser light sources. Secondly, generally the excitation wavelength range of the luminescent material is larger than the wavelength range of the excitation laser light source. Thus luminescent material with wider excitation wavelength $\lambda_{iS}$ and excited light wavelength $\lambda_{iE}$ is selected. There are $m_2$ light sources disposed in the laser light source module 210 whose wavelength is within the excitation wavelength $\lambda_{iS}$ of the luminescent material while the number $m_2$ is greater than or equal to 2 ($m_2 \ge 2$). Therefore, the light energy per unit area of the excited light with wavelength of $\lambda_{iE}$ on the positions each light beam projected onto the light emitting layer is equal to the total excited light of the luminescent material excited by the number of $m_2$ laser light sources.

The alignment module 230 includes, but not limited to, different wavelength filters or prisms that align all the laser beams $L_{1S}, L_{2S}, \ldots, L_{nS}$ to generate the gross modulated laser beam $L_M$. The gross modulated laser beam $L_M$ is incident into and is reflected by the rotation plane mirror module 240 to form a gross modulated scanning laser beam $L_S$ which is projected onto the projection screen 201.

The rotation plane mirror module 240 includes, but not limited to, two orthogonal 1-D (one-dimensional) polygon mirrors, two orthogonal 1-D Micro-electro-mechanical Systems (MEMS) mirrors, or one 2-D MEMS mirror that is able to rotate an angle $\theta$ in a first plane and rotate an angle $\phi$ in a second plane that is not parallel to the first plane.

The rotation plane mirror control module 250 drives the rotation plane mirror module 240 to rotate, receives the signals $S_M$ from the signal conversion module 260 and coverts the signal SM into signal that controls rotation angle of the rotation plane mirror module 240. Thus the rotation angle of the rotation plane mirror module 240 is controlled by the rotation plane mirror control module 250 to be changed along with the time. Along with the changes of the rotation angle of the rotation plane mirror module 240, the gross modulated scanning laser beam $L_S$ progressively scans each position of the projection screen 201 that is intended to produce exited light. The rotation plane mirror module 240 can be rotated periodically or not. The scanning patterns of the gross modulated scanning laser beam $L_S$ over the projection screen 201 include but not limited to Raster scanning, Lissajous scanning and Vector scanning. The laser components in the gross modulated scanning laser beam $L_S$ with the wavelength of $\lambda_{1S}, \lambda_{2S}, \ldots, \lambda_{nS}$ respectively excites each luminescent materials $F_1, F_2, \ldots, F_n$ so as to emit light with wavelength of $\lambda_{1E}, \lambda_{2E}, \ldots, \lambda_{nE}$.

According to the image signal $S_1$ of a single static image or dynamic image from the signal conversion module 260, the laser signal modulation module 220 generates respective driving current $I_1, I_2, \ldots, I_n$ corresponding to each laser light source so as to modulate light power of the respective laser beam $L_{1S}, L_{2S}, \ldots, L_{nS}$ with specific wavelength.

The higher light power of the excitation light, the longer time of a certain position on the projection screen being scanned by the excitation light and the higher intensity of luminescent materials all make the excited light emitted from the certain position being projected on the projection screen have higher light power. The light energy per unit area of the excited light with different wavelengths at the certain position of the projection screen 201 is proportional to a value given by light power of the corresponding excitation light multiplying by the time of scanning that certain position according to the intensity of respective luminescent material ($D_1, D_2, \ldots, D_n$).

In order to make the light energy of an unit area at a certain position on the projection screen being excited by $i^{th}$ excited wavelength become $P_{iE}$, the light power $P_{iS}$ of the laser beam $L_{iS}$ with excitation wavelength needs to be adjusted or time $\tau$ of the laser beam scanning over the certain position on the projection screen needs to be adjusted when the gross modulated scanning laser beam $L_S$ scans that position. Thus the luminescent material at the certain position of the projection screen is excited to produce $P_{iE}$ light energy per unit area.

The $i^{th}$ luminescent material at the position (x, y) of the projection screen is excited by the light beam $L_{iS}$ to emit excited light whose light energy $P_{iE}(x,y)$ per unit area is represented as:

$$P_{iE}(x,y) = \mathcal{P}_{iS}(x,y) * \tau(x,y) * C_i(\mathcal{P}_{iS}(x,y), D_i(x,y))$$

wherein (x,y) is coordinate space that defines the position, $\mathcal{P}_{iS}(x,y)$ represents light power of the light beam $L_{iS}$ while scanning the position $$(x,y), \mathcal{P}_{iS}(x,y) = P_{iS}(x,y) * L_O;$$

$P_{iS}(x,y)$ is light power of the light beam $L_{iS}$ emitted from the laser light source module while scanning the position (x,y), $L_O$ is loss coefficient of the light beam $L_{iS}$ passing the alignment module 230 passing through the alignment module 230 and all optical elements (components) between the projection screen 201 and the laser light source module 210, and reflected by the rotation plane mirror module 240. Generally, $L_O$ is not related to position $\rho$. $\tau(x,y)$ is scanning time of the gross modulated scanning laser beam $L_S$ through the position (x,y), $D_i(x,y)$ is a density of the $i^{th}$ luminescent material at the position (x,y), $C_i(\mathcal{P}_{iS}(x,y), D_i(x,y))$ is light power conversion efficiency per unit area of the $i^{th}$ luminescent material at the position (x,y) that converts excitation wavelength $\lambda_{iS}$ into the excited wavelength $\lambda_{iE}$. $C_i(\mathcal{P}_{iS}(x,y), D_i(x,y)$ is affected by $\mathcal{P}_{iS}(x,y)$ and $D_i(x,y)$. Under the condition that $C_i(\mathcal{P}_{iS}(x,y), D_i(x,y))$ of the $i^{th}$ luminescent material is not affected by $\mathcal{P}_{iS}(x,y)$, $C_i(\mathcal{P}_{iS}(x,y), D_i(x,y))$ can be simplified into $C_i(D_i(x,y))$. $D_i(x,y)) = C_i(D_i(x,y))$. In the equation $P_{iE}(x,y) = \mathcal{P}_{iS}(x,y) * \tau(x,y) * C_i(\mathcal{P}_{iS}(x,y), D_i(x,y))$, (x,y) is obtained according to rotation mode of the rotation plane mirror module 240 while $L_O$ and $C_i(\mathcal{P}_{iS}(x,y), D_i(x,y))$ are obtained by measurement. Thus $P_{iS}(x,y)$ can be adjusted to $P_{iE}(x,y)$ required by the laser signal modulation module 220.

In some rotation plane mirror modules 240 with different rotation ways, the scanning of the scanning laser beam $L_S$ on the projection screen 201 is not with a constant velocity. Thus the scanning time $\tau(x,y)$ through the position $\rho$ on the projection screen 201 is not constant. When the density of luminescent materials at each position of the projection screen is the same, $D_i(x,y)=D_i$, the value of the $P_{iS}(x,y)$ needs to be adjusted according to the scanning time $\tau(x,y)$ of the gross modulated scanning laser beam $L_S$ through the position $(x,y)$ so as to make each position on the projection screen achieve preset light energy per unit area $P_{iE}$. $P_{iS}(x,y)$ is not a fixed value such as $P_{iS}(x,y)=P_{iS}$.

Take the two scanning ways-Raster Scanning and Lissajous Scanning as examples. The scanning speed of the laser beam near the edge area of the image is slower than the scanning speed of the laser beam bear the center area of the image. Thus the time the laser beam takes passing the edge area of the image is longer than the time that the laser beam takes passing the center area of the image. If the density of the ith luminescent material at each position of the projection screen is the same, power of laser light with the wavelength $\lambda_{iL}$ that scans to the edge area of the image is reduced so as to achieve the same light energy per unit area of the excited light with the wavelength of $\lambda_{iS}$. The basic principle and calculation are as following. The present invention is not limited to the following embodiments.

When the time is set as zero (t=0), the rotation angle of the 2D rotation mirror $\theta(0)=\phi(0)=0$ and the following equations are obtained.

$$\theta(t)=\theta_0*\sin(2\pi/T_0*t);$$

$$\phi(t)=\phi_0*\sin(2\pi/T_\phi*t);$$

wherein $\theta_0$ and $\phi_0$ respectively represent maximum rotational angle of the laser beam along the X axis and the Y axis reflected by the 2D rotation mirror while $T_0$ and $T_\phi$ respectively represent the rotation cycle of the laser beam along the X axis and the Y axis. In order to simplify the calculation, it is supposed that the projection screen is a flat surface in which a point of $(x,y)=(0,0)$ is perpendicular to the laser beam $\theta=0$, $\phi=0$, $x=D*\tan(\theta(t))$ and $y=D*\tan(\theta(t))$. D is the shortest distance between the 2D rotation mirror and the projection screen. In accordance with the above equations, the scanning speed of the X axis, $v_x(x)=dx/dt$, and the scanning speed of the Y axis are obtained. The scanning speed at the point $(x,y)$ is $v(x,y)=(v_x^2(x)+v_y^2(y))^{1/2}$. In order to make the light energy per unit area at the projection screen become equivalent, $P_{iS}(x,y)$ should be proportional to $v(x,y)/C_i(\mathcal{P}_{iS}(x,y), D_i)$. Under the condition that $C_i(\mathcal{P}_{iS}(x,y), D_i(x,y))$ of the ith luminescent material is not affected by $\mathcal{P}_{iS}(x,y)$, it should be set that $P_{iS}(x,y)$ is proportional to $v(x,y)=(v_x^2(x)+v_y^2(y))^{1/2}$.

If the rotation speed of the 2D (two dimensional) mirror makes the time required by the gross modulated laser beam LS passing through each position of the projection screen less than an exposure time for image capture of an observer during image capture, each light point of the excited light from each position of the projection screen into the observer's retina forms an image. The exposure time of the observer during image capture means persistence of vision, the fact that human eyes retain an image for about one-sixteenth of a second after seeing it. This is similar to the exposure time for each image in cameras.

When the rotation time of the 2D mirror is longer than the exposure time for image capture of the observer during image capture, a plurality of images is formed. If the rotation speed of the 2D mirror makes the updating time of each image become smaller than the exposure time for image capture of the observer, the observer sees these images as continuous dynamic images.

Moreover, once a relaxing process time of one luminescent material is longer than the updating time of each image, the observer will see residual excited light of the previous image that forms a ghost image. Thus in a projection system that projects dynamic images continuously, the luminescent materials with smaller relaxing process time such as fluorophores, laser dyes, laser crystals, etc are used.

An embodiment of the laser projection system 200 is a full color laser projection display system. Take a full color laser projection display system in which a single primary color is $\alpha$-bit ($2^\alpha$ levels) as an example. The laser beams $L_{RS}$, $L_{GS}$, $L_B$ with the wavelength of $\lambda_{RS}$, $\lambda_{GS}$, $\lambda_{BS}$ respectively excite the luminescent materials $F_R$, $F_G$, $F_B$ in the light emitting layer of the projection screen to generate red light, green light and blue light with maximum light power per unit area $P_{REM}$, $P_{GEM}$, $P_{BEM}$ respectively. The wavelength of these excited three primary colors of light is respectively represented by $\lambda_{RE}$, $\lambda_{GE}$, $\lambda_{BE}$. There is a certain ratio between $P_{REM}$, $P_{GEM}$, $P_{BEM}$ so as to achieve white balance of the image.

The color intended displayed at a certain point of the projection screen is corresponding to $n_R$, $n_G$, $n_B$ level red, green, blue colors (RGB). Without consideration of the fact that human eyes are more sensitive to visible light with lower power, the light powers $P_{RL}$, $P_{GL}$, $P_{BL}$ of laser beams $L_{RS}$, $L_{GS}$, $L_{BS}$ scanning that position should be adjusted so as to make the light emitting layer of the projection screen emit red, green, blue color light with the light power $(n_R-1)/(2^\alpha-1)*P_{REM}$, $(n_G-1)/(2^\alpha-1)P_{GEM}$, $(n_B-1)/(2^\alpha-1)P_{BEM}$ per unit area respectively.

If the fact that human eyes are more sensitive to visible light with lower power is taken into consideration, a $\gamma$ (Gamma Correction Factor) is introduced to adjust the light power $P_{RL}$, $P_{GL}$, $P_{BL}$ of the laser beams $L_{RS}$, $L_{GS}$, $L_{BS}$ passing through that position. Thus the light emitting layer of the projection screen emits red, green, blue color light with the light power $[(n_R-1)/(2^\alpha-1)]^{1/\gamma}P_{REM}$, $[(n_G-1)/(2^\alpha-1)]^{1/\gamma}P_{GEM}$, $[(n_B-1)/(2^\alpha-1)]^{1/\gamma}P_{BEM}$ per unit area respectively.

The values of the maximum light power per unit area $P_{REM}$, $P_{GEM}$, $P_{BEM}$ are not changing along with different positions if each position of the projection screen with $n_R$, $n_G$, $n_B$ level RGB shows the same lightness, hue and chroma. However, the maximum light power $P_{REM}$, $P_{GLM}$, $P_{BLM}$ of the laser beams $L_{RS}$, $L_{GS}$, $L_{BS}$ should be adjusted according to distribution density of each luminescent materials and scanning speed of the laser beam at each position of the projection screen. The method has been described in the above paragraphs. The followings are related to the control of the laser light power $P_{RL}$, $P_{GL}$, $P_{BL}$.

Under the condition that each luminescent material at each position of the projection screen is distributed evenly, the full color laser projection display system uses Raster Scanning or Lissajous Scanning and the influence of incident light power on the light power conversion efficiency $C_R$, $C_G$, $C_B$ of the three RGB luminescent materials is neglected, the maximum light power $P_{RLM}(x,y)$, $P_{GLM}(x,y)$, $P_{BLM}(x,y)$ of each laser light source module that emits light beams to scan the position (x,y) of the projection screen should be proportional to the speed v(x,y) of the light beams scanning the position (x,y):

$$P_{RLM}(x,y)=P_{RLM}(0,0)*v(x,y)/v(0,0); P_{GLM}(x,y)=P_{GLM}(0,0)*v(x,y)/v(0,0);$$

$$P_{BLM}(x,y)=P_{BLM}(0,0)*v(x,y)/v(0,0).$$

wherein $v(0,0) \geq v(x,y)$ so that $P_{RLM}(x,y) \leq P_{RLM}(0,0)$, $P_{GLM}(x,y) \leq P_{GLM}(0,0)$, $P_{BLM}(x,y) \leq P_{BLM}(0,0)$. In order to make the full color laser projection display system have the brightest images, possible maximum values of $P_{RLM}(0,0)$, $P_{GLM}(0,0)$, $P_{BLM}(0,0)$ should be selected after considering other related factors such as the ratio of $P_{REM}$, $P_{GEM}$, $P_{BEM}$ that achieves white balance, manufacturing technique and lifespan of laser sources.

Without consideration of the fact that human eyes are more sensitive to visible light with lower light power, the light power of the laser beams $L_{RS}$, $L_{GS}$, $L_{BS}$ scanning the position (x,y) should be adjusted:

$$P_{RL}(x,y)=(n_R-1)/(2^\alpha-1)*P_{RLM}(x,y)=(n_R-1)/(2^\alpha-1)*P_{RLM}(0,0)*v(x,y)/v(0,0);$$

$$P_{GL}(x,y)=(n_G-1)/(2^\alpha-1)*P_{GLM}(x,y)=(n_G-1)/(2^\alpha-1)P_{GLM}(0,0)*v(x,y)/v(0,0);$$

$$P_{BL}(x,y)=(n_B-1)/(2^\alpha-1)*P_{BLM}(x,y)=(n_B-1)/(2^\alpha-1)*P_{BLM}(0,0)*v(x,y)/v(0,0).$$

In consideration of the fact that human eyes are more sensitive to visible light with lower light power, the Gamma Correction Factor γ is introduced for adjustment of light power of the laser beams $L_{RS}$, $L_{GS}$, $L_{BS}$ scanning the position (x,y):

$$P_{RL}(x,y)=[(n_R-1)/(2^\alpha-1)]^{1/\gamma}*P_{RLM}(x,y)=[(n_R-1)/(2^\alpha-1)]^{1/\gamma}*P_{RLM}(0,0)*v(x,y)/v(0,0);$$

$$P_{GL}(x,y)=[(n_G-1)/(2^\alpha-1)]^{1/\gamma}*P_{GLM}(x,y)=[(n_G-1)/(2^\alpha-1)]^{1/\gamma}*P_{GLM}(0,0)*v(x,y)/v(0,0);$$

$$P_{BL}(x,y)=[(n_B-1)/(2^\alpha-1)]^{1/\gamma}*P_{BLM}(x,y)=[(n_B-1)/(2^\alpha-1)]^{1/\gamma}*P_{BLM}(0,0)*v(x,y)/v(0,0).$$

If the rotation speed of the 2D mirror allows the total time of the gross modulated laser beam $L_M$ passing through each position of the projection screen shorter than the retention time, each light points generated by excitation of the laser beams passing through each position is focused on the retina of people's eyes to form an image.

If the rotation speed of the 2D mirror enables the updating time of each image shorter than the retention time of the image on the retina of eyes, the projection system 200 can show dynamic images.

In order to avoid ghost image problems, the relaxing process time should be shorter than 1/F second, the updating time of each image. F is the frame rate, is the frequency (Hz) at which the dynamic image display system produces unique consecutive images (frames).

Moreover, in order to increase image brightness, the light emitting layer of the projection screen can be added with w kind of luminescent material with broadband emission, wherein $w \geq 1$. The luminescent material with broadband emission can be excited to generate light with wavelength $\lambda_{1WE}, \lambda_{2WE}, \ldots, \lambda_{wWE}$. The light with the wavelength $\lambda_{iWE}$ covers not only one primary color light, wherein $1 \leq i \leq w$. For example, it covers green and blue colors, or red, green and blue colors (RGB). There are a number of w laser light sources with the wavelength of $\lambda_{1WS}, \lambda_{2WS}, \ldots, \lambda_{wWS}$ arranged at the laser light source module 210, respectively within the excitation wavelength range of the w kinds of luminescent materials.

In order to achieve white balance of the image produced by the w kinds of luminescent materials with broadband emission, the ratio of the light power of the w kinds of lasers should be designed so as to generate light with the broadband wavelength $\lambda_{1WE}, \lambda_{2WE}, \ldots, \lambda_{wWE}$ for setting the white balance.

In addition, in order to expand the color gamut, g kinds of luminescent material that increases the color gamut is added into the light emitting layer of the projection screen and $g \geq 1$. The luminescent material that increases the color gamut is excited to generate light with the wavelength of $\lambda_{1GE}, \lambda_{2GE}, \ldots, \lambda_{gGE}$. In the CIE Chromaticity Diagram, the area formed by the (g+3) wavelength including $\lambda_{1GE}, \lambda_{2GE}, \ldots, \lambda_{gGE}$ and $\lambda_{RE}, \lambda_{GE}, \lambda_{BE}$ is larger than the area formed by the wavelength of $\lambda_{RE}, \lambda_{GE}, \lambda_{BE}$. The laser light source module 210 is added with a number of g laser light sources whose wavelength are within the excitation wavelength range of g kinds of luminescent materials that increase the color gamut. Generally, the image signal S1 includes image information of the three primary colors, red, green and blue. The signal conversion module 260 converts the image signal S1 into the image information related to the RGB primary colors and $\lambda_{1GE}, \lambda_{2GE}, \ldots, \lambda_{gGE}$ for control of the excited RGB laser beams $L_{RS}, L_{GS}, L_{BS}$ and light power of the laser light sources with g kinds of luminescent materials that increase the color gamut so as to display the color of the position on the projection screen passed by the laser beams vividly.

In order to reduce the laser light sources and the kinds of luminescent materials that increase the color gamut required, the production of the laser light sources and the luminescent materials that increase the color gamut should be considered while selecting the wavelength $\lambda_{1GE}, \lambda_{2GE}, \ldots \lambda_{gGE}$. Thus larger color area is achieved by the minimum g.

The light emitted may still be reflected or scattered by the projection screen. The wavelength distribution of the reflected or scattered light is the same with that of the emitted light. If the human eyes have a greater sensitivity to the emitted light, the observer sees the emitted light and the excited light at the same primitive simultaneously, the colors are messed up and the contrast is affected. In order to avoid these conditions, the better way is to use laser light sources of the laser light source module 210 with the wavelength of invisible light or with the wavelength less sensitive for the eyes. The wavelength of invisible light includes, but not limited to, 808 nm, 850 nm, 980 nm, 1064 nm, etc. The wavelength less sensitive for the eyes includes, but not limited to, 405 nm, 780 nm, etc.

If it is inevitable to use visible light as light sources, the light source with similar color of the excited light is selected. For example, the laser light emitting layer with the wavelength of 405 nm (violet purple) or 450 nm (blue) produces blue images (about 450 nm wavelength). The red laser light emitting layer at 780 nm/640 nm generates read images whose wavelength is about 640 nm. Due to similar colors of the light source and the excited light, the problem of the messed up colors caused by reflection or scattering can be avoided.

In another simplified application of the laser projection system 200, a violet semiconductor laser (405 nm wavelength) is used as a laser light source 210. A two-dimensional rotatable micro electro mechanical systems (MEMS) mirror or two one-dimensional rotatable MEMS mirror assembled form the rotation plane mirror module 240. The projection screen 201 includes a light emitting layer with a luminescent material. The luminescent material can be excited by the wavelength of 405 nm to produce red, blue or green visible light. The projection screen 201 is transparent and is able to be attached to a front windshield of a car, without blocking the vision of the driver. The laser projector 202 is installed in a vehicle to project laser beams onto the projection screen 201. The signal conversion module 260 receives the image signal $S_1$ from but not limited to image source elements including computers, mobile phones, GPS (global positioning system), night vision cameras, visible light cameras, etc. in a wired or wireless way and then projects various information on the projection screen 201. The information includes but not limited to vehicle speed, mileage, oil consumption, map, warning signals, direction signs, incoming call information, etc.

Embodiment 2

Figure 3:
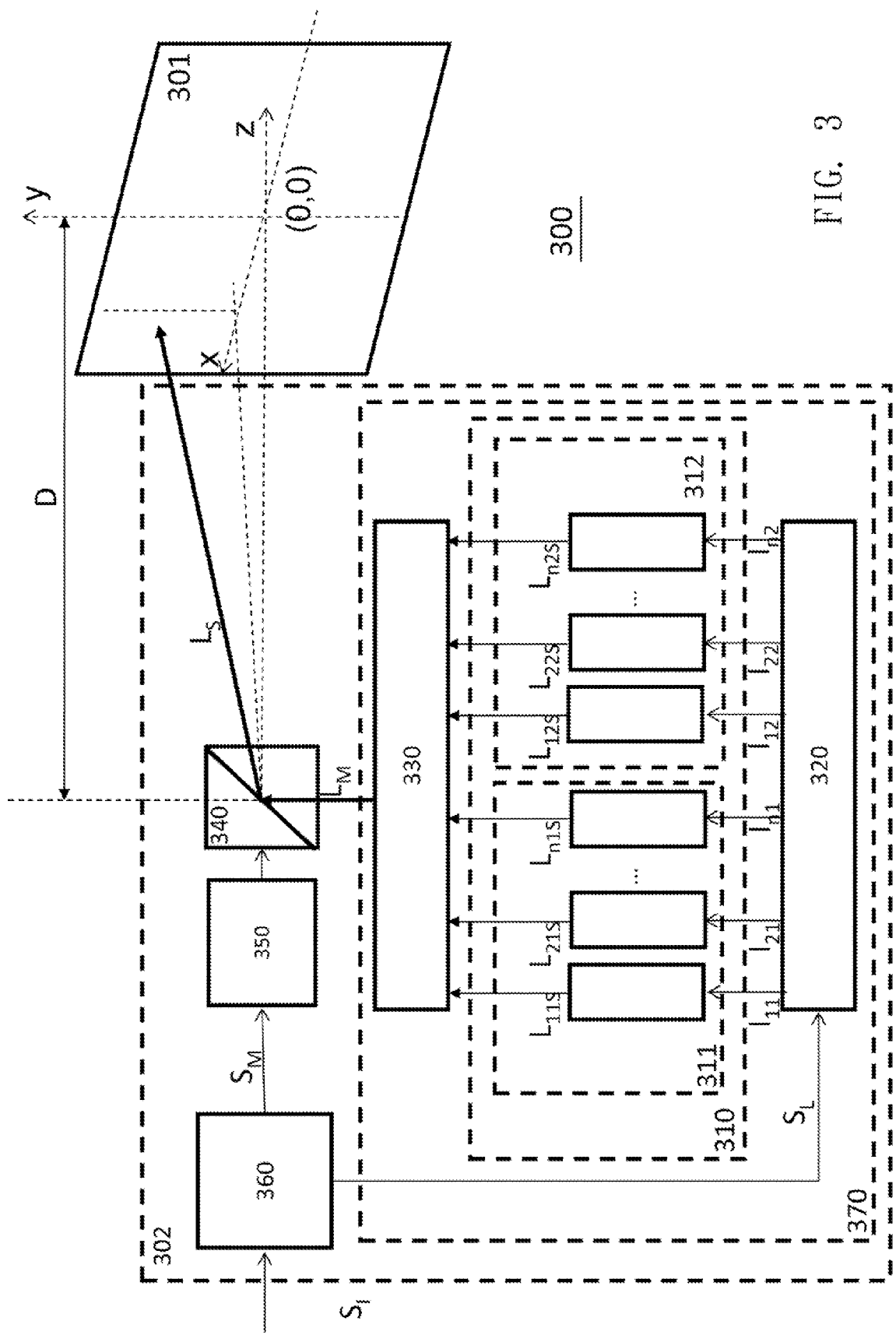
FIG. 3 is a schematic drawing showing another embodiment of a laser projection system according to the present invention.

Refer to FIG. 3, another embodiment (the second) of a laser projection system 300 is revealed. The laser projection system 300 includes a projection screen 301 and a laser projector 302. The laser projector 302 projects images onto the projection screen 301 in accordance with an image signal $S_1$ of a single static image or dynamic image. The laser projector 302 consists of a laser light source module 310, a laser signal modulation module 320, an alignment module 330, a rotation plane mirror module 340, a rotation plane mirror control module 350, and a signal conversion module 360. Moreover, an optical laser module 370 is defined and including the laser light source module 310, the laser signal modulation module 320, and the alignment module 330.

The structure and functions of the laser signal modulation module 320, the alignment module 330, the rotation plane mirror module 340, the rotation plane mirror control module 350, and the signal conversion module 360 in the laser projector 302 are similar to those of the signal modulation module 220, the alignment module 230, the rotation plane mirror module 240, the rotation plane mirror control module 250, and the signal conversion module 260 in the laser projector 202.

The main difference between this embodiment and the above one is in that: the laser light source module 310 of the laser projector 302 includes a type one laser light source module 311 and a type two laser light source module 312. The projection screen 301 includes a light emitting layer 331 and a scattering layer 332. The type one laser light source module 311 and the light emitting layer 331 in this embodiment are equivalent to the laser light source module 210 and the light emitting layer of the projection screen 201 of the above embodiment. This embodiment further includes the type two laser light source module 312 and the scattering layer 332. Thus the components in this and following embodiments that have similar or equivalent structure and functions are referred to the above embodiment.

The laser light source module 310 includes the type one laser light source module 311 and the type two laser light source module 312. The type one laser light source module 311 includes at least one set of laser sources, respectively emitting light beams $L_{11S}, L_{21S}, \ldots, L_{n1S}$ with the wavelength of $\lambda_{11L}, \lambda_{21L}, \ldots, \lambda_{n1L}$ corresponding to and falling within the wavelength range $\lambda_{1S}, \lambda_{2S}, \ldots, \lambda_{nS}$ of the excited light beams of various luminescent materials in the light emitting layer. Thus the luminescent materials in the light emitting layer are excited to emit light with the wavelength of $\lambda_{1E}, \lambda_{2E}, \ldots, \lambda_{nE}$.

The type two laser light source module 312 includes at least one set of laser light sources, respectively emitting light beams $L_{12S}, L_{22S}, \ldots, L_{n2S}$ with the wavelength of $\lambda_{12L}, \lambda_{22L}, \ldots, \lambda_{n2L}$.

Figure 3A:
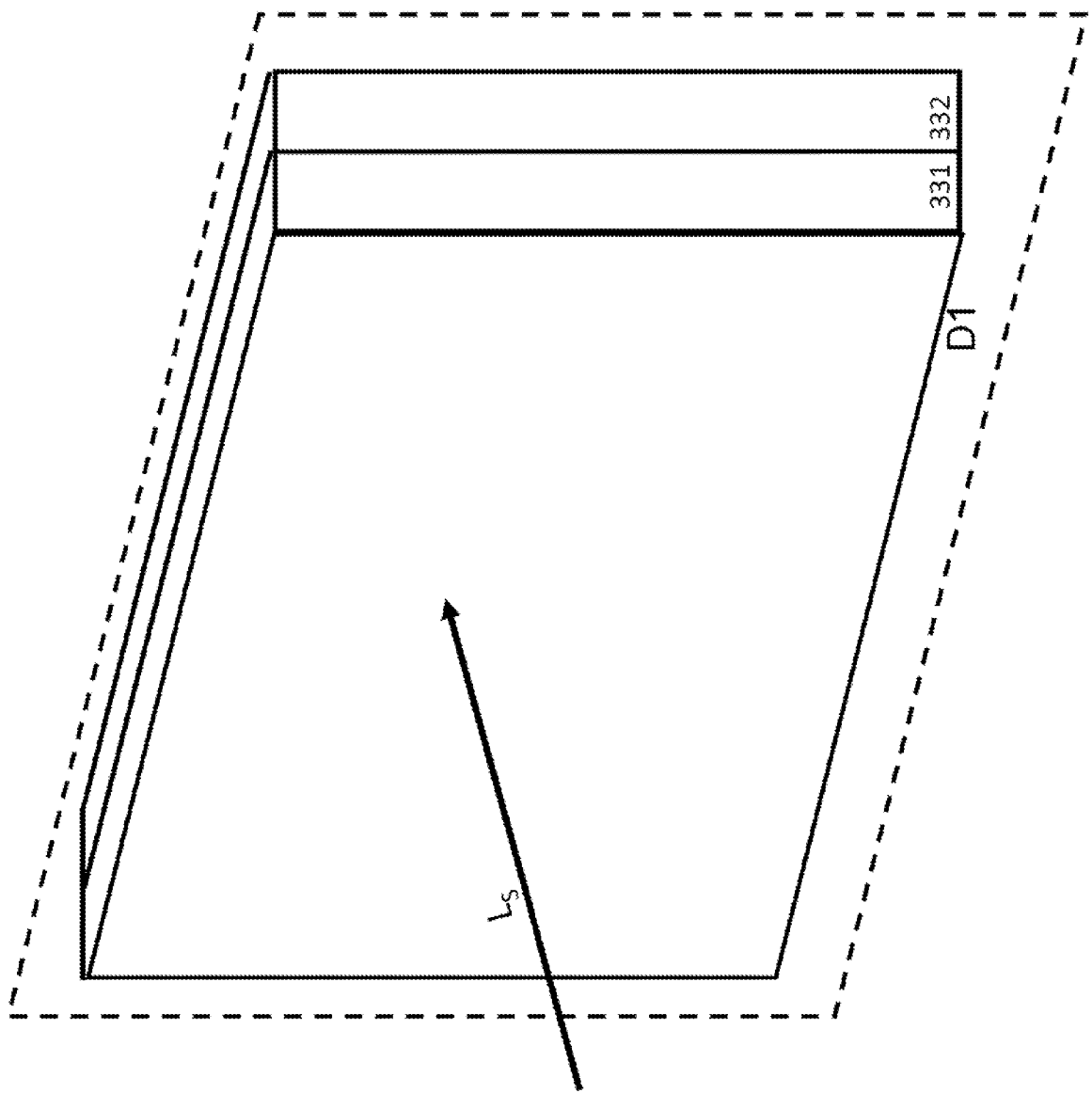
FIG. 3A is a schematic drawing showing basic structure of a projection screen of the embodiment in FIG. 3.

Refer to FIG. 3A, a basic structure of the projection screen 301 is revealed. The projection screen 301 includes the light emitting layer 331 and the scattering layer 332. The light emitting layer 331 is in front of the scattering layer 332, facing a light beam Ls emitted from the laser projector 302. D1 is a medium over the light emitting layer 331 toward the incident light source.

The single direction of the incident laser is forced to deviate by the scattering layer 332 to generate light scattered in different directions with the same wavelength of the incident laser light.

The light emitting layer 331 includes at least one luminescent material excited by light sources with various wavelengths of $\lambda_{1S}, \lambda_{2S}, \ldots, \lambda_{nS}$ to emit light with various wavelengths of $\lambda_{1E}, \lambda_{2E}, \ldots, \lambda_{nE}$. The structure, operation and properties of the light-emitting layer 331 and the luminescent materials therein are the same with those of the light emitting layer and the luminescent materials of the projection screen 201 of the first embodiment of the laser projection system 200.

The light emitting layer 331 has low absorption and scattering of the light with the type two wavelength emitted from the type two laser light source module 312. Thus most of the laser light with the type two wavelength passes through the light emitting layer 331 into the scattering layer 332.

In order to get better excitation efficiency of the light emitting layer 331, the light emitting layer 331 absorbs almost the entire laser with the type one wavelength emitted by the type one laser light source module 311. Thus the scattering layer 332 is mainly used to scatter the laser with the type two wavelength and the and the excited light from the light emitting layer 331 excited by the laser with the type one wavelength.

The interface between the medium $D_1$ and the light emitting layer 331 is applied with anti-reflection treatment, including but not limited to inserting an anti-reflection layer, so as to reduce reflection of the light with the wavelength of the two types of modulated laser beam and the excited light from the light emitting layer 331. Thus the ratio of the type one modulated laser beam entering the light emitting layer 331 is increased. The ratio of the type two modulated laser beam entering the scattering layer 332 is increased, so is the ratio of the excited light from the light emitting layer 331 entering the medium $D_1$ and the ratio of the light scattered by the scattering layer and entering the medium $D_1$. Therefore, the observer can see the excited light and the scattered light, both with higher brightness, when the observer is located on the side of the projection screen with D1 medium.

The interface between the light emitting layer 331 and the scattering layer 332 is applied with anti-reflection treatment according to the wavelength of the type two modulated laser beam so as to increase the ratio of the type two modulated laser beam entering the scattering layer 332 as well as the ratio of the light scattered by the scattering layer 332 and entering the medium $D_1$. Therefore, the observer can see the scattered light with higher brightness when he is located on the side of the projection screen with D1 medium.

The interface between the light emitting layer 331 and the scattering layer 332 is applied with reflective treatment according to the wavelength of the type one modulated laser beam so as to reflect residual energy of the type one modulated laser beam passing through the light emitting layer 331 and the energy turns back to the light emitting layer 331 for increasing light power of the excited light. Therefore, the observer can see the scattered light with higher brightness when he is located on the side of the projection screen with D1 medium.

According to the image signal $S_1$ of a single static image or dynamic image from the signal conversion module 360, the laser signal modulation module 320 generates respective driving current $I_{11}, I_{21}, \ldots, I_{n1}$ and $I_{12}, I_{22}, \ldots, I_{n2}$ corresponding to each laser light source with specific wavelength so as to modulate light power of the respective laser beam $L_{1S}$, $L_{2S}$, ..., $L_{nS}$ and $L_{12S}$, $L_{22S}$, ..., $L_{n2S}$ with specific wavelength.

The higher light power of the type one laser light, the longer time of the type one laser light passing through a certain position of the projection screen and the higher density of luminescent material, all allows the certain position of the projection screen emitting excited light with higher light power. According to the density of respective luminescent material, there is a certain ratio between light energy of the excited light with various wavelengths per unit area at the certain position of the projection screen, and the value obtained by the corresponding type one laser light power multiplying the time the laser light passing the certain position.

Similarly, the higher light power of the type two laser light, the longer time of the type two laser light passing through a certain position of the projection screen and the higher scattering efficiency, all allows the certain position of the projection screen scattering the scattered light with higher light power. According to the scattering efficiency of the scattering layer, there is a certain ratio between light energy of the excited light with various wavelengths per unit area at the certain position of the projection screen, and the value obtained by the corresponding type two laser light power multiplying the time the laser light passing through the certain position.

Along with the modulation of two types of laser with different wavelength in the laser beam $L_S$ that scans the projection screen 301, images are formed by the scattered laser light with type two wavelength and the excited light from the light emitting layer being excited by the laser light with type one wavelength. The two types of laser with different wavelength includes the laser with different wavelength emitted from the type one laser light source module 311 and the type two laser light source module 312 respectively.

An application of the laser projection system 300 is a full color laser projection display system. Take a full color laser projection display system in which a single primary color is $\alpha$-bit ($2^\alpha$ levels) as an example.

In order to expand the color gamut, there are two ways that can be used at the same time. Firstly, g kinds of luminescent material that increases the color gamut is added into the light emitting layer 331 of the projection screen and the type one laser light source module 311 is added with a number of g laser light sources whose wavelength are within the excitation wavelength of g kinds of luminescent materials that increase the color gamut. The functions can refer to the embodiment one. Secondly, the type two laser light source module 312 is added with a number of h laser light sources with the wavelength of $\lambda_{1HE}$, $\lambda_{2HE}$, ..., $\lambda_{hHE}$ and h≥1. In the CIE Chromaticity Diagram, the area formed by the (h+3) wavelength including $\lambda_{1HE}$, $\lambda_{2HE}$, ..., $\lambda_{hHE}$ and $\lambda_{RE}$, $\lambda_{GE}$, $\lambda_{BE}$ is larger than the area formed by the wavelength of $\lambda_{RE}$, $\lambda_{GE}$, $\lambda_{BE}$. The laser light source module 210 is added with a number of g laser light sources whose wavelength are within the excitation wavelength of g kinds of luminescent materials that increase the color gamut. Generally, the image signal S1 includes image information of the three primary colors, red, green and blue. The signal conversion module 360 converts the image signal $S_1$ into the image information related to $\lambda_{RE}$, $\lambda_{GE}$, $\lambda_{BE}$, $\lambda_{1GE}$, $\lambda_{2GE}$, ..., $\lambda_{gGE}$, and $\lambda_{1HE}$, $\lambda_{2HE}$, ..., $\lambda_{hHE}$ and controls laser beams $L_{RS}$, $L_{GS}$, $L_{BS}$ and light power of both the type one laser light source module 311 with g laser light sources and the type two laser light source module 312 with h laser light sources. Thus the color of the position on the projection screen passed by the laser beams is displayed vividly.

In order to reduce the laser light sources and the kinds of luminescent materials that increase the color gamut required, the production of the laser light sources and the luminescent materials that increase the color gamut should be considered while selecting the wavelength $\lambda_{1GE}$, $\lambda_{2GE}$, ..., $\lambda_{gGE}$ and $\lambda_{1HE}$, $\lambda_{2HE}$, ..., $\lambda_{hHE}$. Thus larger color area is achieved by the minimum (g+h).

In the full color laser projection display system, besides the light with the wavelength of $\lambda_{1WS}$, $\lambda_{2WS}$, ..., $\lambda_{wWS}$ excited by the laser from the type one laser light source module, the (3+g+h) (g, h≥0) wavelength including $\lambda_{RE}$, $\lambda_{GE}$, $\lambda_{BE}$, $\lambda_{1GE}$, $\lambda_{2GE}$, ..., $\lambda_{gGE}$ and $\lambda_{1HE}$, $\lambda_{2HE}$, ..., $\lambda_{Hhe}$ on the projection screen can be excited by the laser light from the type one laser light source module or the type two laser light source module. The light emitting layer includes at least one luminescent material that is excited by the laser source of the type one laser light source module to produce light with wavelengths within part of the (3+g+h) wavelength. As to the type two laser light source module, it is responsible for the light with the rest part of the wavelength within the (3+g+h) wavelength.

In order to avoid the messed-up colors, the wavelength of invisible light is selected to use as laser light sources of the type one laser light source module 311, including but not limited to 808 nm, 850 nm, 980 nm, 1064 nm etc. Or the wavelength less sensitive for the eyes can also be selected, including but not limited to, 405 nm, 780 nm, etc. If it is inevitable to use visible light as light sources, the light source with similar color of the excited light is selected. For example, the light emitting layer is excited by laser light with the wavelength of 405 nm b (violet purple) or 450 nm (blue) to produce blue images (about 450 nm wavelength). The red laser light emitting layer at 780 nm/640 nm excites the light emitting layer to generate read images whose wavelength is about 640 nm. Due to similar colors of the light source and the excited light, the problem of the messed up colors caused by reflection or scattering can be avoided.

Green is not easily directly oscillated by a semiconductor laser. Thus the wavelength of the laser at 1064 nm is converted to 532 nm green light by second harmonic generation. Thus the high power and high modulation bandwidth green light laser module is not with larger volume, high manufacturing cost, the control way is complicated. In an embodiment of the full color laser projection display system of the laser projection system 300, blue laser and red laser are used as laser light sources of the type one laser light source module 311. The luminescent material in the light emitting layer is excited by 405 nm laser or 980 nm laser so as to form full color dynamic images on the projection screen.

Embodiment 3

Figure 4:
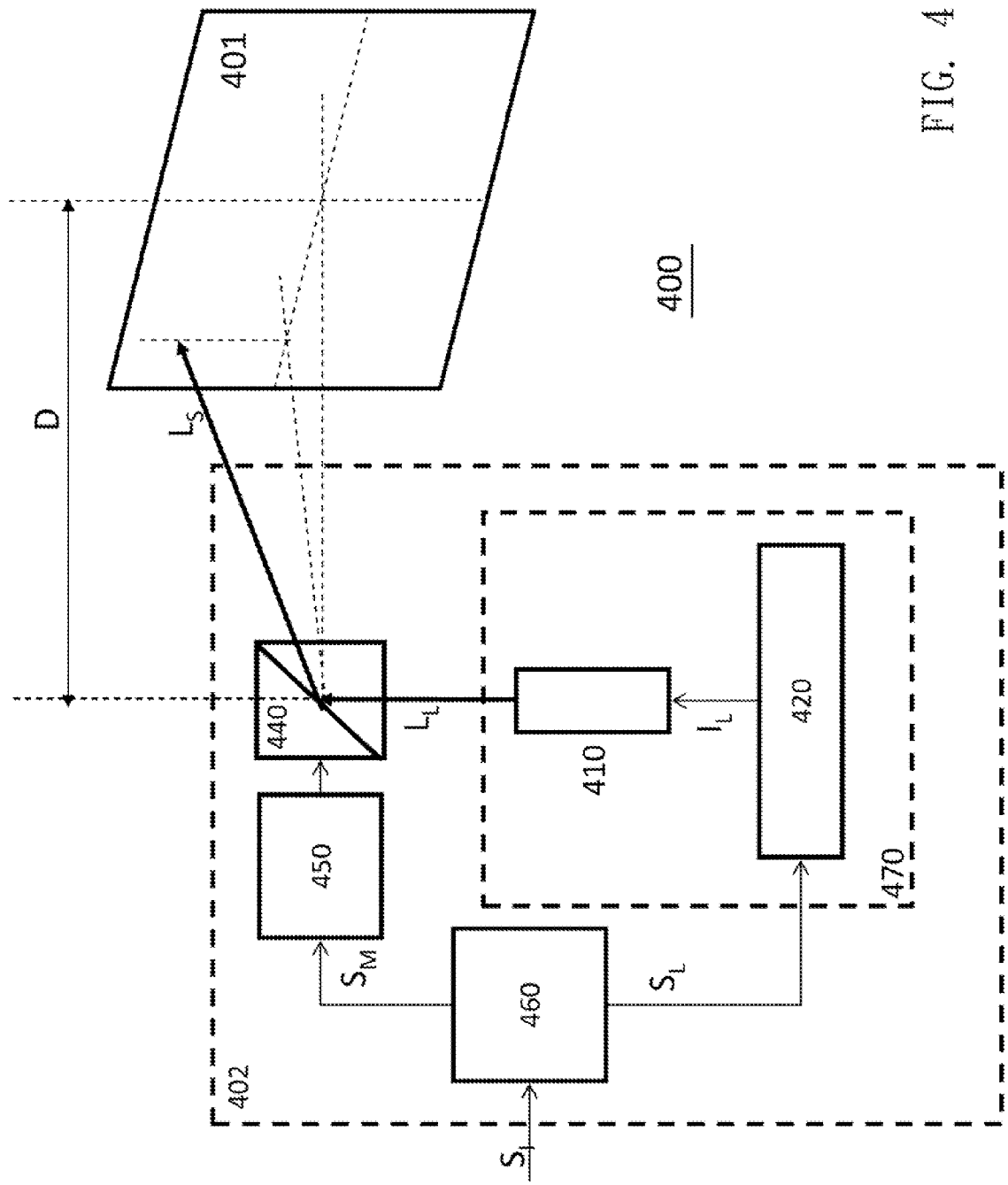
FIG. 4 is a schematic drawing showing a further embodiment of a laser projection system according to the present invention.

Refer to FIG. 4, a further embodiment (the third) of a laser projection system 400 is disclosed. The laser projection system 400 includes a projection screen 401 and a laser projector 402. The laser projector 402 projects images onto the projection screen 401 according to an image signal $S_1$ of a single static image or dynamic image. The laser projector 402 consists of a laser light source module 410, a laser signal modulation module 420, a rotation plane mirror module 440, a rotation plane mirror control module 450, and a signal conversion module 460. Moreover, an optical laser module 470 is defined and having the laser light source module 410, and the laser signal modulation module 420.

The structure and operation of the rotation plane mirror module 440, the rotation plane mirror control module 450, and the signal conversion module 460 are similar to those of the rotation plane mirror module 240, the rotation plane mirror control module 250, and the signal conversion module 260 of the first embodiment.

Figure 4B:
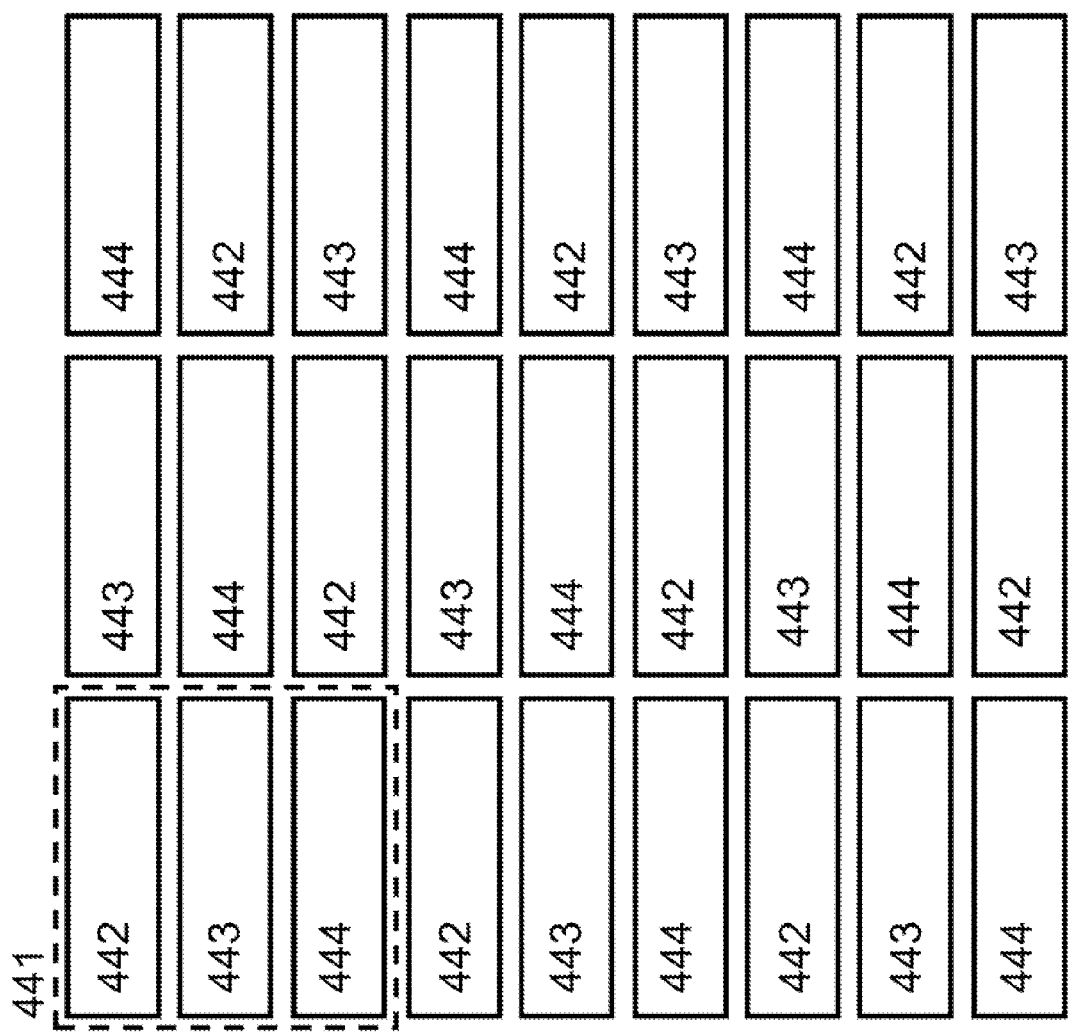

The projection screen 401 is divided into a plurality of pixels 431 corresponding to the screen resolution displayed. Take SVGA (Super Video Graphics Array), it supports for a maximum resolution of 800×600 (=480,000) pixels. The structure of adjacent pixels in the light emitting layer of the projection screen 401 is shown in, but not limited to, FIG. 4A and FIG. 4B.

Refer to FIG. 4A, a single pixel 431 includes three subpixels-red subpixel 432, blue subpixel 433 and green subpixel 434. In the FIG. 4B, a single pixel 441 includes three subpixels-red subpixel 442, blue subpixel 443 and green subpixel 444. The area of each subpixel is not necessary the same. The arrangement of the subpixels in adjacent pixels can be the same, as shown in the FIG. 4A or different, as shown in the FIG. 4B. Each subpixel includes respective luminescent material. Thus there are three luminescent materials, including but not limited to fluorescent materials, respectively excited by light beams with the wavelength of $\lambda_{RS}, \lambda_{GS}, \lambda_{BS}$ to emit red, blue and green light with the wavelength of $\lambda_{RE}$, $\lambda_{GE}, \lambda_{BE}$. The structure, operation and properties of these three luminescent materials are the same with the luminescent materials of the laser projection system 200 in the first embodiment.

The laser light source module 410 includes a set of laser light source emitting light beam $L_L$ with the wavelength of $\lambda_L$. The is within the wavelength range of excitation light of the three luminescent materials in the light emitting layer.

In order to control energy of the excited light corresponding to each subpixel precisely, the minimum length of each subpixel should be larger than a diameter of the cross section of the laser beam $L_L$. And there is a certain distance between adjacent subpixels so as to avoid the laser beam projecting onto at least two subpixels at the same time.

Moreover, the scanning pathway of the laser beam is aligned with the arrangement of the subpixels on the projection screen 401 so as to avoid the laser light projecting onto at least two subpixels at the same time.

According to the image signal $S_1$ of a single static image or dynamic image from the signal conversion module 460, the laser signal modulation module 420 generates respective driving current $I_1$ corresponding to the laser light source so as to modulate light power $P_L$ of the laser beam $L_L$. When the laser beam $L_S$ scans a specific subpixel of the pixel, the driving current $I_1$ provided by the laser signal modulation module 420 enables the subpixel being excited by the light power $P_L$ to generate the color. Through different combinations of the excited light energy of the red, blue and green colors, the pixel displays different lightness hue and chroma. The operation and control method of lightness hue and chroma are referred to the embodiment one.

Figure 4C:
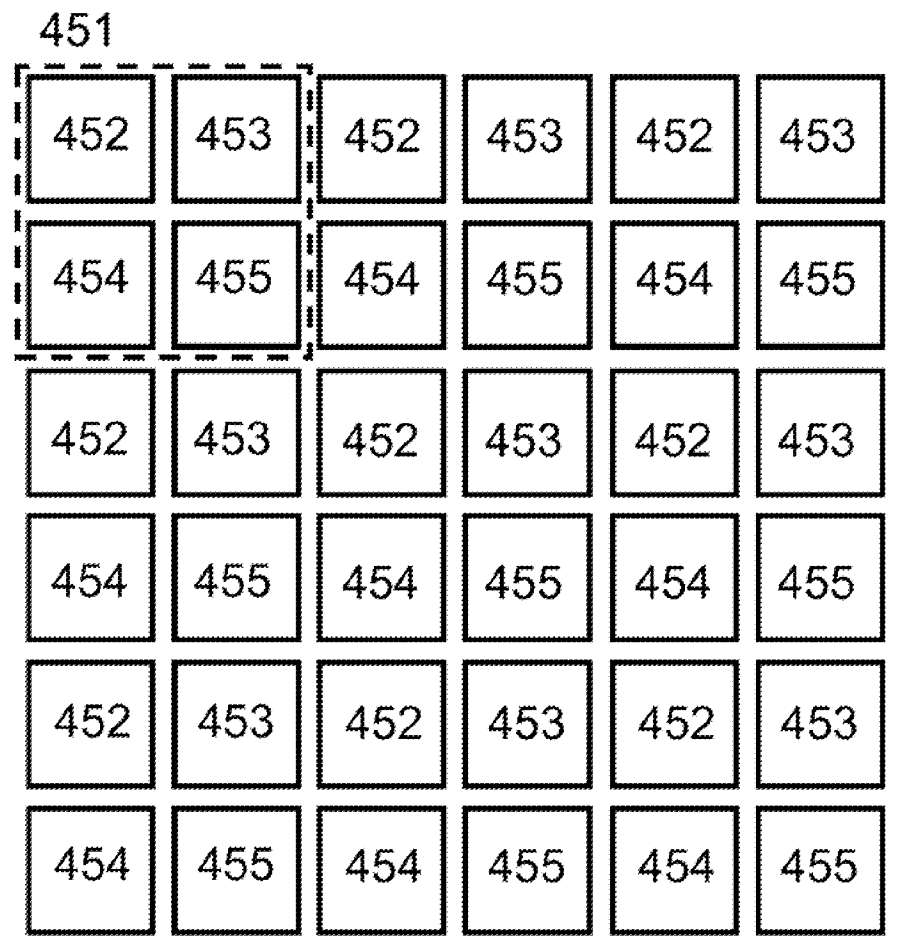
Figure 4D:
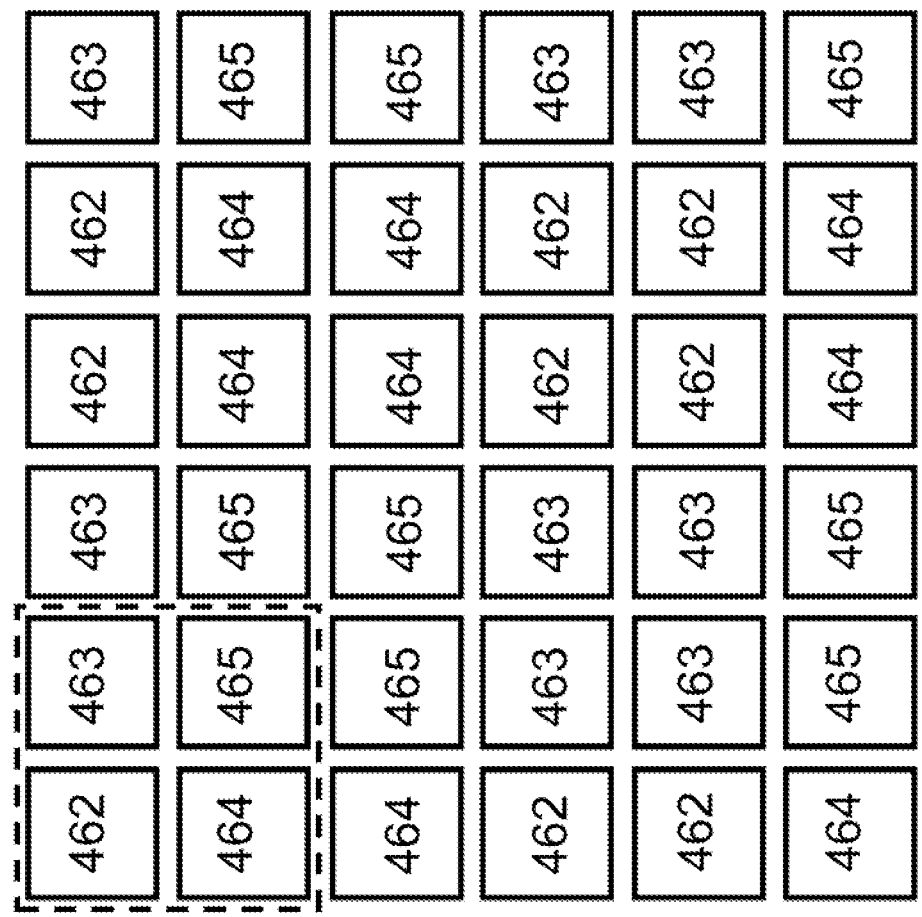

Moreover, in order to increase the brightness, a white subpixel is added into the projection screen. The luminescent material of the white subpixel is excited by the laser beam $L_S$ to produce broad band wavelengths $\lambda_{WE}$ covering red, green and blue wavelengths. The lighting structure added with the white subpixel is shown in, but not limited to, FIG. 4C, and FIG. 4D. In the FIG. 4C, a single pixel 451 includes four subpixels, red, blue, green, and white 452, 453, 454, 455. In the FIG. 4D, a single pixel 461 includes four subpixels, red, blue, green, and white 462, 463, 464, 465. The area of the each subpixel is not necessarily the same. The arrangement of the subpixels in adjacent pixels can be the same, as shown in the FIG. 4C or different, as shown in the FIG. 4D.

Furthermore, in order to increase the color gamut, g kinds of subpixel that expand the color gamut are added into the projection screen, and g≥1. The luminescent materials included in the subpixels that increase the color gamut are excited by the laser beam $L_S$ to produce the wavelengths $\lambda_{1GE}, \lambda_{2GE}, \ldots \lambda_{g1GE}$. In the CIE Chromaticity Diagram, the area formed by the (h+3) wavelengths including $\lambda_{1GE}$, $\lambda_{2GE}, \ldots, \lambda_{g1GE}$ and $\lambda_{RE}, \lambda_{GE}, \lambda_{BE}$ is larger than the area formed by the wavelength of $\lambda_{RE}, \lambda_{GE}, \lambda_{BE}$. The subpixels that increase the color gamut together with the previous four subpixels-red, blue, green and white can be arranged in the same pixel. The lighting structure includes but not limited to the FIG. 4E.

In order to avoid the messed-up colors, the wavelength of invisible light is selected to use as a laser source of the laser light source module 410, including but not limited to 808 nm, 850 nm, 980 nm, 1064 nm etc. Or the wavelength less sensitive for the eyes can also be selected and used as a laser source of the laser light source module 410, including but not limited to, 405 nm, 780 nm, etc.

Embodiment 4

Refer to FIG. 5, a further embodiment (the fourth) of a laser projection system 500 is disclosed. The laser projection system 400 includes a projection screen 501 and a laser projector 502. According to an image signal $S_1$ of a single static image or dynamic image, the laser projector 502 projects images onto the projection screen 501. The laser projector 502 consists of a laser light source module 510, a laser source control module 520, a rotation plane mirror module 540, a rotation plane mirror control module 550, and a signal coordination module 560. Moreover, an optical laser module 570 is defined and having the laser light source module 510, and the laser source control module 520.

The structure and operation of the rotation plane mirror module 540 and the rotation plane mirror control module 550 are similar to those of the rotation plane mirror module 240 and the rotation plane mirror control module 250.

The projection screen 501 includes a light emitting layer having at least one luminescent material, ranging from $F_1, F_2, \ldots, F_n$. The luminescent materials can be excited by $\lambda_L$ laser light emitted from the laser light source module 510 to produce light with different wavelengths $\lambda_{1E}, \lambda_{2E}, \ldots \lambda_{nE}$. The structure, operation and properties of the light emitting layer and the luminescent materials are similar to those of the light emitting layer and the luminescent materials of the laser projection system 200 in the first embodiment.

In order to make a specific position of the projection screen produce light having the wavelength $\lambda_{iE}$ and higher light energy per unit area, the specific position is distributed with higher distribution density of luminescent material $F_i$.

The laser light source module 510 includes a set of laser light source that produces wavelength $\lambda_L$ to excite all luminescent materials and the laser beam is represented by $L_L$.

The light energy of the wavelength $\lambda_{iE}$ at the position of the projection screen is determined by unit area light energy of the excited light with the wavelength of $\lambda_L$ and the distribution density of the luminescent material $F_i$.

In order to make the luminescent material $F_i$ at each position of the projection screen have the same density and generate the same light energy of the wavelength $\lambda_{iE}$ per unit area, the laser beam scanning each position of the projection screen should provide the same light energy per unit area. Thus the light power $P_L(x,y)$ of the laser beam passing through the position (x,y) should be proportional to the scanning speed v(x,y) at that position. At this moment, the signal coordination module 560 is used for synchronization of the light power of the laser light source and the rotation angle of the 2D rotatable mirror.

If the light power of the laser beam $L_L$ keeps the same during the scanning process, the synchronization of the light power of the laser light source and the rotation angle of the 2D rotatable mirror can be simplified. Under such condition, the distribution density of the luminescent material $F_i$ at each position of the projection screen should be proportional to the scanning speed v(x,y) of the laser beam passing through the position (x,y) so as to make each position of the projection screen produce the wavelength $\lambda_{iE}$ with the same light energy per unit area.

Embodiment 5

Figure 6:
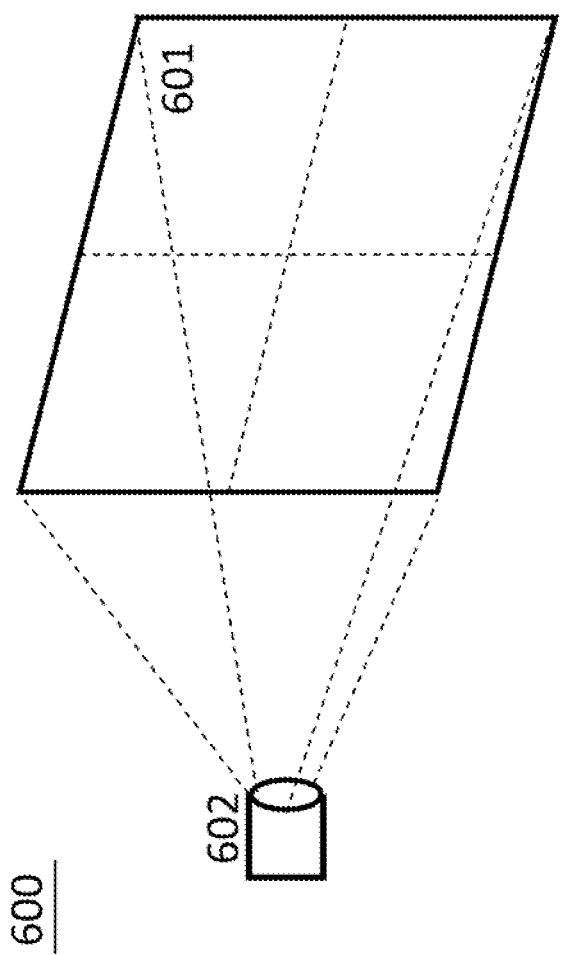
FIG. 6 is a schematic drawing showing a further embodiment of a laser projection system according to the present invention.

Refer to FIG. 6, a further embodiment of a simplified laser projection system 600 is disclosed. The laser projection system 600 includes a projection screen 601 and a laser projector 602. The laser projector 602 projects images onto the projection screen 601. The structure and operation of the projection screen 601 are the same with those of the projection screen 501 of the fourth embodiment. As to the laser projector 602, it can be a broadband light source or a narrowband light source. The wavelength emitted from the light source can excite all luminescent materials in the projection screen 601 and respective luminescent material produces the wavelength $\lambda_{1E}, \lambda_{2E}, \ldots, \lambda_{nE}$. The static image is displayed according to the distribution and distribution density of the luminescent materials $F_1, F_2, \ldots, F_n$ at different positions of the projection screen.

An embodiment in the FIG. 6 shows that a light tube or light bulb is used as a light source. The light tube emits light that excites the luminescent materials in the projection screen to produce red color, green color, blue color, white color or other colors that increase the color gamut. The distribution density of various luminescent materials in the projection screen is determined according to the static image displayed. The light beam from the light source is evenly projected onto the projection screen to form the static image.

Embodiment 6

Refer to FIG. 7A, a schematic drawing showing a projection screen 700 is revealed. The projection screen 700 includes an excited light absorption layer 720 and a light emitting layer 730. The light emitting layer 730 includes but not limited to the structure of the light emitting layer shown in the FIG. 2A, FIG. 2B, FIG. 2C, FIG. 4A, FIG. 4B, FIG. 4C, FIG. 4D and FIG. 4E.

The excited light absorption layer 720 absorbs the excited light emitted from the light emitting layer 730 so as to reduce the excited light entering the medium $D_1$ side. Thus the observer or optical receiver can only see the displayed image or detect the excited light from the light emitting layer at the $D_2$ side. At the $D_1$ side, no image displayed can be seen or the excited light from the light emitting layer is detected.

The excited light absorption layer 720 can also be designed to have high absorption of the visible light. Thus the projection screen is opaque, in black color. The projection screen is suitable to be used in the rear projection display system so as to prevent people see the circuit inside the display.

Moreover, if the excited light absorption layer 720 has lower absorption and scattering of the wavelength of the projected light beam $L_S$, the projected light beam $L_{S1}$ is incident into the projection screen from the $D_1$ side.

The projected light beam $L_S$, or $L_{S2}$ incident into the projection screen 700 from the $D_1$ side or the $D_2$ side includes excitation light with at least one wavelength so as to excite various luminescent materials in the light emitting layer. Thus images are formed on the projection screen.

The interface between the medium $D_1$ and the excited light absorption layer 720, and the interface between the excited light absorption layer 720 and the light emitting layer 730 are applied with anti-reflection treatment, including but not limited to inserting an anti-reflection layer, so as to reduce reflection of the projected light beam $L_{S2}$ at these two interfaces and increase lighting efficiency of the projection screen.

The interface between the light emitting layer 730 and the medium $D_2$, and the interface between the excited light absorption layer 720 and the light emitting layer 730 are applied with anti-reflection treatment, including but not limited to inserting an anti-reflection layer, so as to reduce reflection of light within the spectrum of the excited light at these two interfaces. Thus background light $L_{A2}$ incident from the medium $D_2$ side within the excited light spectrum is seldom reflected back to the $D_2$ side, passing through the light emitting layer 730 to be absorbed by the excited light absorption layer 720. Moreover, background light $L_{A1}$ incident from the medium $D_1$ side within the excited light spectrum is absorbed by the excited light absorption layer 720. Thus the image displayed on the projection screen 700 is not affected by the background light $L_{A1}$ and $L_{A2}$.

In an embodiment shown in FIG. 7A, the excited light selected is visible light including red color, green color, blue color, white color or other colors of the increasing color gamut.

Refer to FIG. 7B, a schematic drawing shows a second kind of projection screen 701. The projection screen 700 includes an excited light absorption layer 720A, a light emitting layer 730, and an excitation light absorption layer 740.

The excitation light absorption layer 740 absorbs light within the projected light beam $L_S$ having the wavelength that excites the light emitting layer. The excitation light absorption layer 740 has less absorption and scattering of the excited light. Thus the excited light from the light emitting layer 730 is transmitted to the $D_2$ side smoothly and seen by the observer.

Compared with the FIG. 7A, the excitation light absorption layer 740 of the FIG. 7B has the limits that only the projected light beam $L_{S1}$ projects to the projection screen 701 through the $D_1$ side but also ensures that the light power of the projected light beam $L_{S1}$ will not pass through the light emitting layer 730 and enter the $D_2$ side to be seen by the observer.

Moreover, the background light $L_{A2}$ may include the wavelengths that excite the light emitting layer 730 to emit light. The excitation light absorption layer 740 can ensure that the background light $L_{A2}$ will not make the light emitting layer 730 generate any image. Thus the influence of the background light $L_{A2}$ on the image displayed on the projected image is completely eliminated.

In an embodiment shown in FIG. 7B, the excited light selected is visible light including red color, green color, blue color, white color or other colors of the increasing color gamut.

Refer to FIG. 7C, a schematic drawing shows a third kind of projection screen 702. The projection screen 702 includes an excited light and scattered light absorption layer 720B, a light emitting layer 730 and a scattering layer 750. The single direction of the incident laser is forced to deviate by the scattering layer 750 to generate light scattered in different directions with the same wavelength of the incident laser light. The excited light and scattered light absorption layer 720B not only absorbs light with the wavelength in the excited light spectrum but also the light with the wavelength in the scattering spectrum.

Compared with the FIG. 7A, the excited light absorption layer 720 in FIG. 7A is replaced by the excited light and scattered light absorption layer 720B in FIG. 7C and the scattering layer 750 is added between the excited light and scattered light absorption layer 72013 and the light emitting layer 730. Thus only the light beam $L_{S2}$ is projected to the projection screen through the D2 side and the projection screen 702 is suitable for the projection system 300.

In an embodiment shown in FIG. 7C, the excited light selected is visible light including red color, green color, blue color, white color or other colors of the increasing color gamut.

Figure 7D:
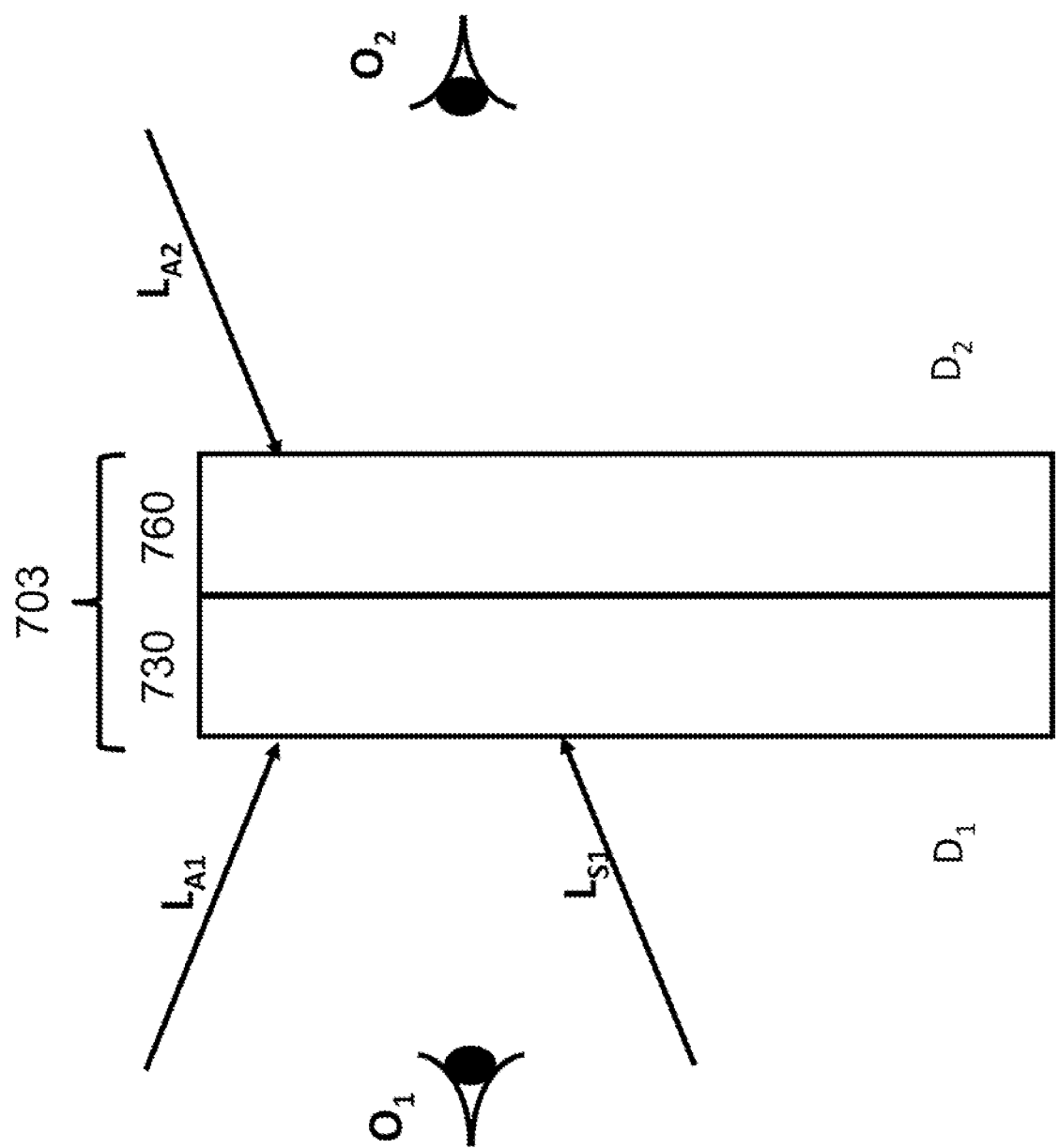

Refer to FIG. 7D, a schematic drawing shows a fourth kind of projection screen 703. The projection screen 703 includes a light emitting layer 730 and an excitation light reflection layer 760.

Because the light energy of the laser projected light beam $L_{S1}$ is not absorbed by the light emitting layer 730, the excitation light reflection layer 760 reflects the projected light beam $L_{S1}$. Then residual energy of the light beam $L_{S1}$ passed through and back to the light emitting layer 730 excites luminescent materials in the light emitting layer 730 again so as to increase lighting efficiency of the projection screen 703 and avoid the projected light beam $L_{S1}$ passing through the projection screen and entering the $D_2$ side to be seen by the observer. The excitation light reflection layer 760 has quite low absorption and scattering of the excited light so that the excited light can enter the $D_2$ side smoothly.

The interface between the light emitting layer 730 and the excitation light reflection layer 760 is processed by a special treatment. The treatment includes but not limited to selecting the light emitting layer and the excitation light reflection layer with similar optical indexes or inserting an anti-reflection layer so as to reduce the reflection of the excited light from the light emitting layer 730. Thus the excited light from the light emitting layer 730 is not limited in the projection screen 703. Therefore, not matter the observer or optical receiver is located on which side of the projection screen 703, the observer can see the image displayed or the optical receiver can detect the excited light from the light emitting layer. Both the emitting layer 730 and the excitation light reflection layer 760 can be designed to have quite lower absorption and scattering of the visible light. Thus human eyes can see these two layers as transparent and the projection screen is transparent.

In an embodiment shown in FIG. 7D, the excited light selected is visible light including red color, green color, blue color, white color or other colors of the increasing color gamut.

Refer to FIG. 7E, a schematic drawing shows a fifth kind of projection screen 704. The projection screen 704 includes a light emitting layer 730 and an excitation light reflection layer 760, and a scattering layer 750.

Compared with the FIG. 7D, the excitation light reflection layer 760 is located between the light emitting layer 730 and the added scattering layer 750 in FIG. 7E so as to thicken the projection screen 704 and the projection screen 704 is suitable for the projection system 300.

In an embodiment shown in FIG. 7E, the excited light and the scattered light selected are visible light including red color, green color, blue color, white color or other colors of the increasing color gamut.

Figure 7F:
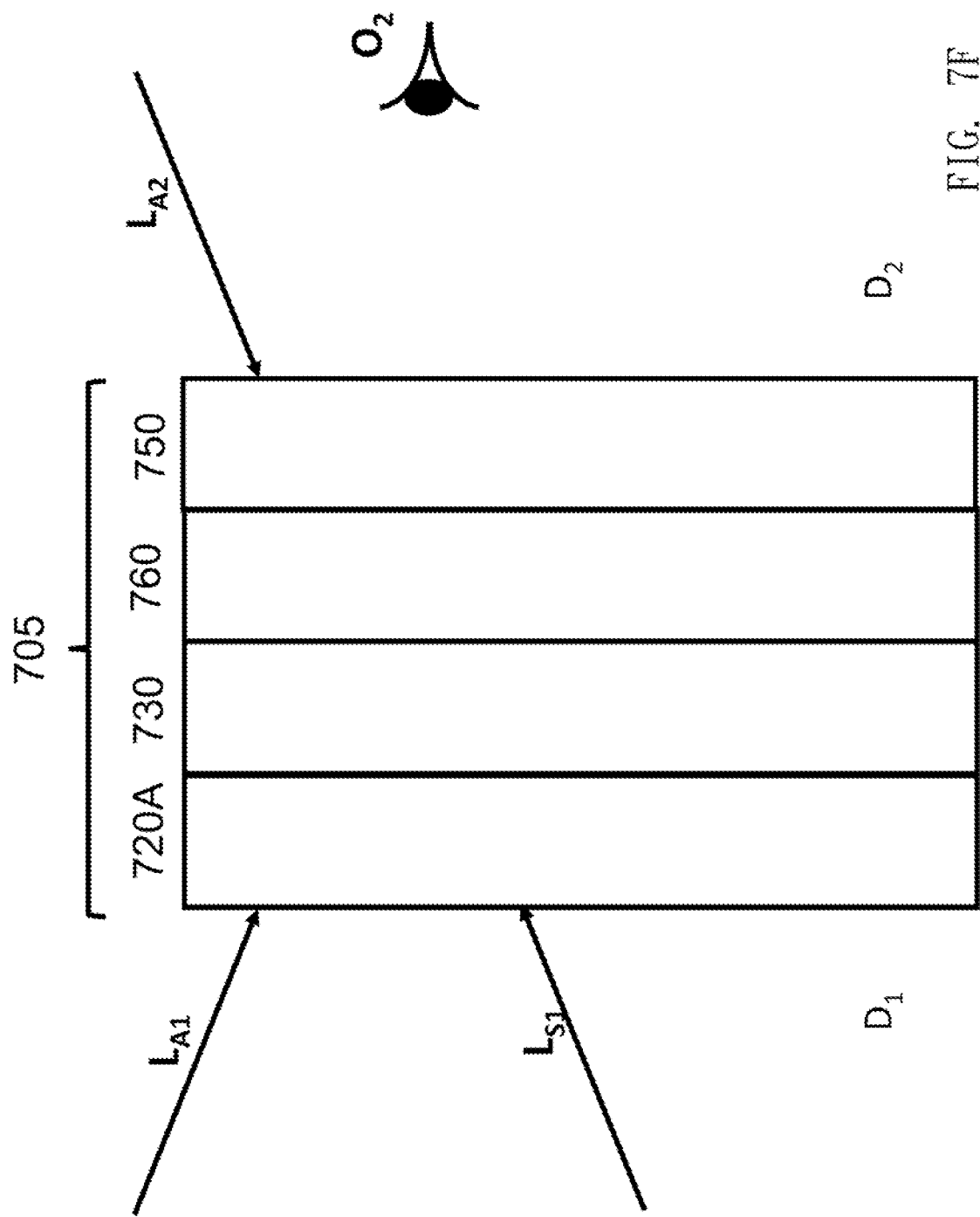

Refer to FIG. 7F, a schematic drawing shows a sixth kind of projection screen 705. The projection screen 705 includes an excited light absorption layer 720A, a light emitting layer 730, an excitation light reflection layer 760, and a scattering layer 750.

Compared with the FIG. 7C, the excitation light reflection layer 760 added is located between the light emitting layer 730 and the scattering layer 750 in FIG. 7F so as to increase lighting efficiency of the light emitting layer 730 and ensure that the light power of projected light beam $L_{S1}$ will not enter the $D_2$ side to be received by the observer.

In an embodiment shown in FIG. 7F, the excited light and the scattered light selected are visible light including red color, green color, blue color, white color or other colors of the increasing color gamut.

Figure 7G:
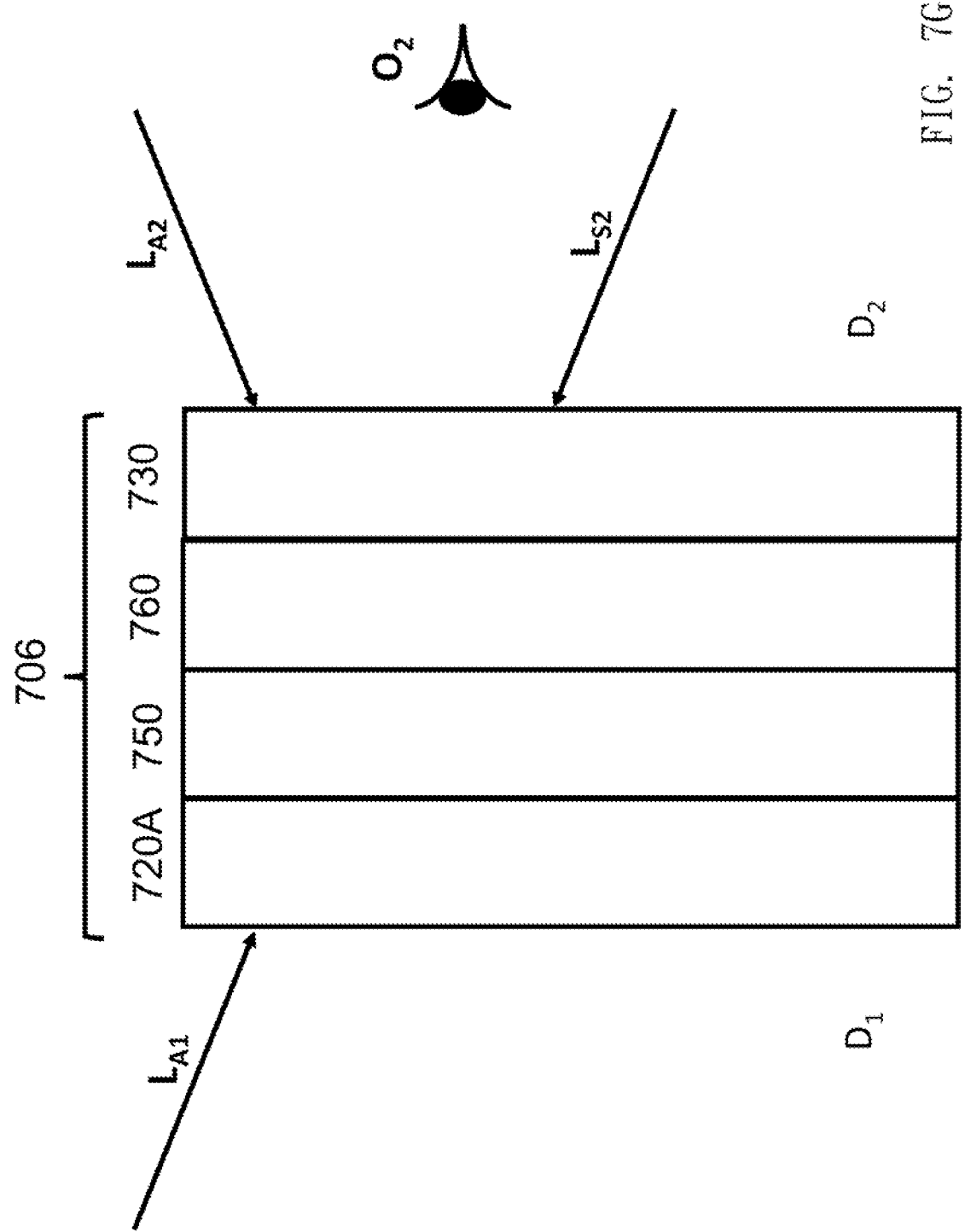

Refer to FIG. 7G, a schematic drawing shows a seventh kind of projection screen 706. The projection screen 706 includes an excited light absorption layer 720A, a scattering layer 750, an excitation light reflection layer 760, and a light emitting layer 730.

Compared with the FIG. 7C, the excitation light reflection layer 760 added is located between the light emitting layer 730 and the scattering layer 750 in FIG. 7G so as to increase lighting efficiency of the light emitting layer 730.

In an embodiment shown in FIG. 7G, the excited light and the scattered light selected are visible light including red color, green color, blue color, white color or other colors of the increasing color gamut.

Figure 7H:
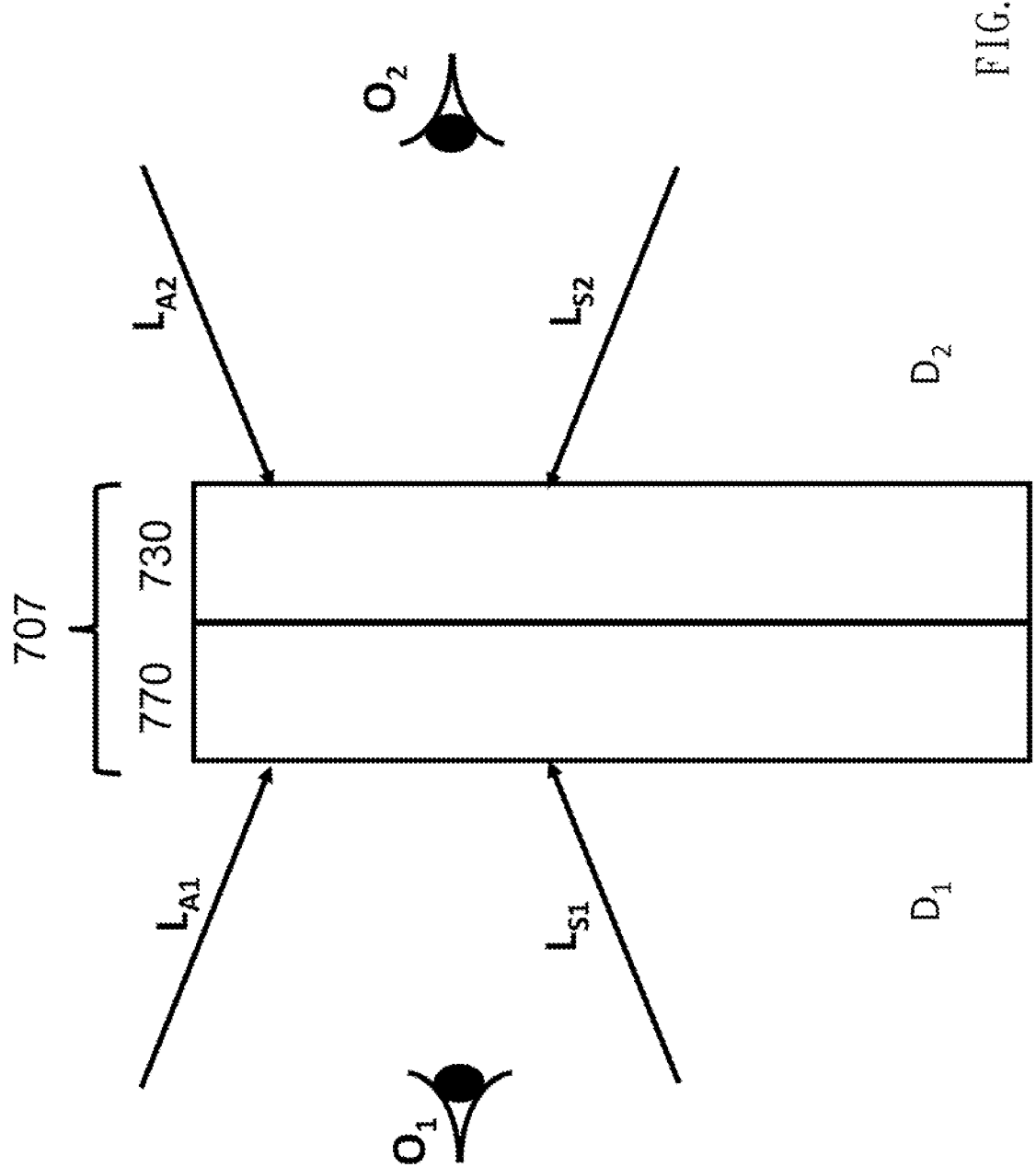

Refer to FIG. 7H, a schematic drawing shows an eighth kind of projection screen 707. The projection screen 707 includes an excited light partial reflection layer 770 and a light emitting layer 730. The excited light partial reflection layer 770 allows the excited light no matter incident from which side passing therethrough at a certain ratio (such as 20%) while the rest is reflected (such as 80%). Moreover, there is a high ratio of the excitation light passing through the excited light partial reflection layer 770.

If the light beam projected $L_{S1}$ or $L_{Ss}$ is incident from the $D_1$ side or the $D_2$ side can excite the light emitting layer 730 to produce the excited light. The excited light is received by an observer $O_2$ at the $D_2$ side to form a projected image. Part of the excited light passes though the excited light partial reflection layer 770 to the $D_1$ side so that the observer $O_2$ can also see the projected image formed by the excited light.

Beside the projected image, the observer $O_1$ also see an image of an object in the $D_2$ (including the observer $O_2$) passing through the projection screen to be received by the observer $O_1$ and an image of an object in the $D_1$ (including the observer $O_1$) reflected by the projection screen to be received by the observer $O_1$. Similarly, beside the projected image, the observer $O_2$ also see an image of an object in the $D_1$ (including the observer $O_1$) passing through the projection screen to be received by the observer $O_2$ and an image of an object in the $D_2$ (including the observer $O_2$) reflected by the projection screen to be received by the observer $O_2$.

When the spectral power of the excited light of the background light $L_{A1}$ is far more smaller than the spectral power of the excited light of the background light $L_{A2}$, the light power of the light from the object in the medium $D_2$ reflected by the projection screen and observed by the observer $O_2$ is far more larger than the light power of the light from the object in the medium $D_1$, passing through the projection screen and observed by the observer $O_2$. The background light $L_{A1}$ includes light sources emitting from the $D_1$ side to the projection screen and light emitted to the objects (including the observer $O_1$) in the medium $D_1$ and then scattered or reflected to the projection screen. The background light $L_{A2}$ includes light sources emitting from the $D_2$ side to the projection screen and light emitted to the objects (including the observer $O_2$) in the medium $D_2$ and then scattered or reflected to the projection screen. Under such condition, the observer $O_2$ can clearly see images and projected image s of the objects in the medium $D_2$ formed by the light within the excited light spectrum reflected by the projection screen and received by the observer $O_2$ but the observer $O_2$ can't clearly observe images of the objects in the medium $D_1$ formed by the light passing through the projection screen and received by the observer $O_2$. For the observer $O_1$, he/she can only observe images and projected image s of the objects in the medium $D_2$ formed by the light within the excited light spectrum, passing through the projection screen and received by the observer $O_1$. Thus the projected image s can be seen by the observer $O_1$ and the observer $O_2$ at the same time but the privacy of the observer $O_1$ can be protected.

On the other hand, if the spectral power of the excited light of the background light $L_{A1}$ is far more larger than the spectral power of the excited light of the background light $L_{A2}$, the projected image s can be seen by the observer $O_1$ and the observer $O_2$ at the same time but the privacy of the observer $O_2$ can be protected. The background light $L_{A1}$ includes light sources emitting from the $D_1$ side to the projection screen and light emitted to the objects (including the observer $O_1$) in the medium $D_1$ and then scattered or reflected to the projection screen. The background light $L_{A2}$ includes light sources emitting from the $D_2$ side to the projection screen and light emitted to the objects (including the observer $O_2$) in the medium $D_2$ and then scattered or reflected to the projection screen.

In an embodiment shown in FIG. 7H, the excited light selected are visible light including red color, green color, blue color, white color or other colors of the increasing color gamut.

Figure 7I:
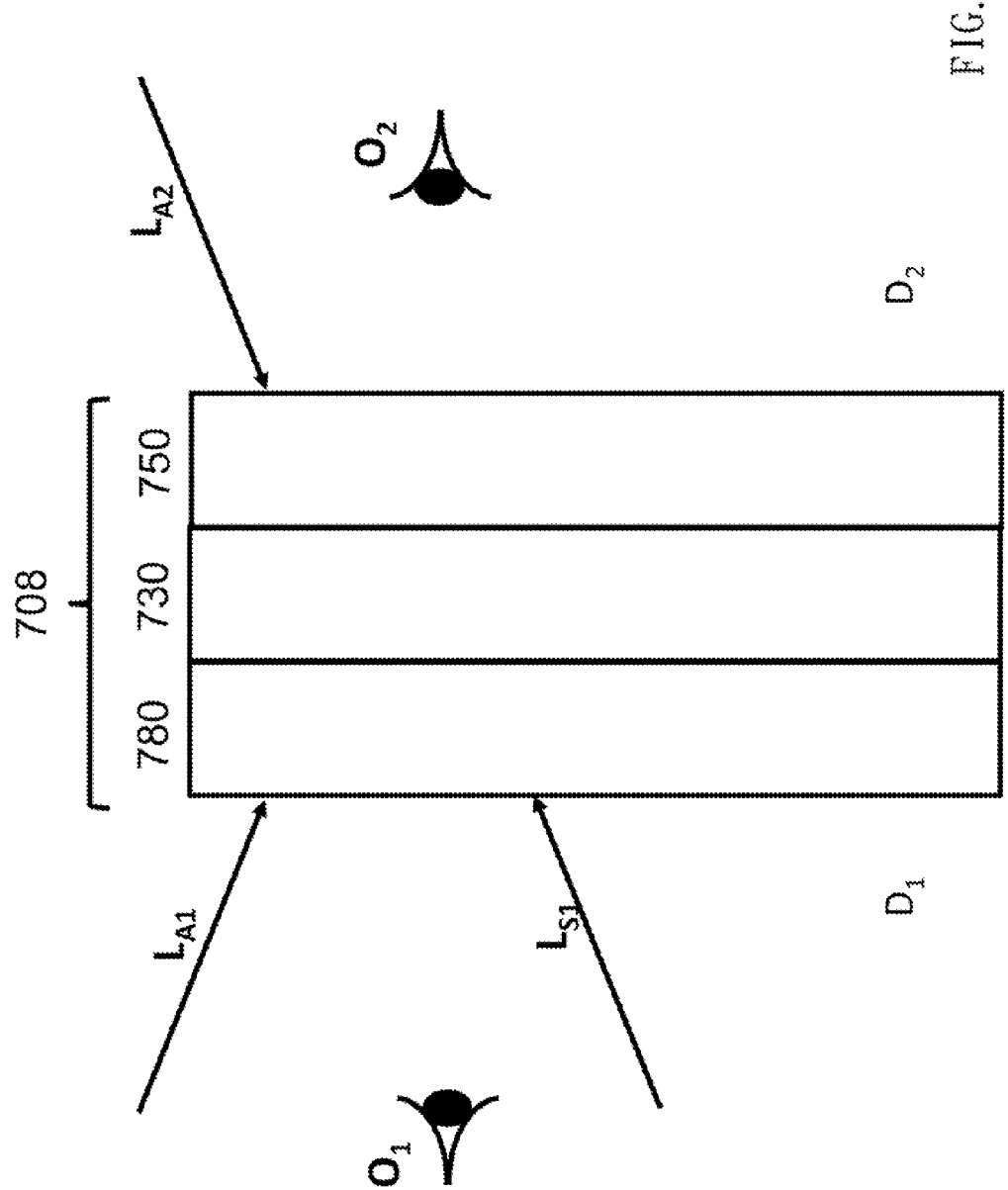

Refer to FIG. 7I, a schematic drawing shows a ninth kind of projection screen 708. The projection screen 708 includes a partial reflection layer of excitation light and scattered light 780, a light emitting layer 730, and a scattering layer 750. The partial reflection layer of excitation light and scattered light 780 can not only partially reflect light within the spectrum of the excited light but also partially reflect light within the spectrum of the scattered light.

Compared with the FIG. 7H, besides the excited light partial reflection layer 770 is replaced by the partial reflection layer of excitation light and scattered light 780, a scattering layer 750 is added between the light emitting layer 730 and $D_2$. Thus the light beam $L_{S2}$ is only projected to the projection screen from the $D_2$ side. Thus the projection screen 708 is suitable for the projection system 300.

The spectrum (spectra) of the scattered light is equal to the spectrum of laser light scanned and projected to the scattering layer 750. Thus light energy within the scattering spectra of the projected light beam $L_{S1}$ is partially reflected by the partial reflection layer of excitation light and scattered light 780. Thus while determining scattering light energy per unit area of the light within the scattering spectra of the projected light beam $L_{S1}$, the partial reflection of the laser beam should be considered so that light power of the laser light within the scattering spectra of the projected light beam $L_{S1}$ should be increased.

In an embodiment shown in FIG. 7I, the excited light and the scattered light selected are visible light including red color, green color, blue color, white color or other colors of the increasing color gamut.

Refer to FIG. 7J, a schematic drawing shows a tenth kind of projection screen 709. The projection screen 709 includes a partial reflection layer of excitation light and scattered light 780, and a scattering layer 750 and a light emitting layer 730.

Compared with the FIG. 7I, the light emitting layer 730 is between the scattering layer 750 and the $D_2$. Moreover, the modulated laser beam $L_{S2}$ is incident from the $D_2$ side. Thus the modulated laser beam $L_{S2}$ will not be reflected by the partial reflection layer of excitation light and scattered light 780 before entering the scattering layer 750. Thus the problem of the reduced laser light power of the light within the scattering spectra of the projected light beam $L_{S1}$ incident into the scattering layer can be avoided.

In an embodiment shown in FIG. 7J, the excited light and the scattered light selected are visible light including red color, green color, blue color, white color or other colors of the increasing color gamut.

Figure 7K:
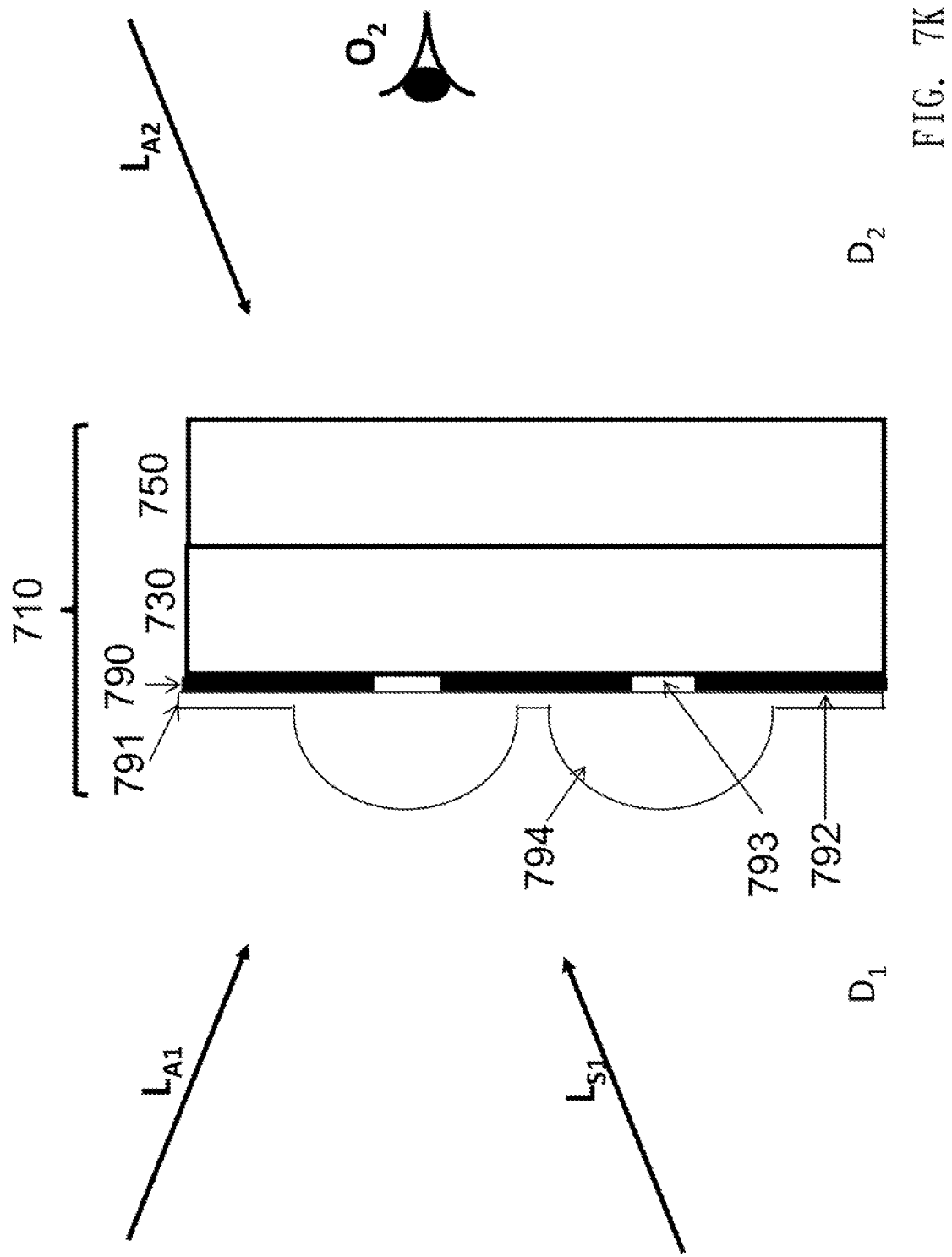
Figure 7K:
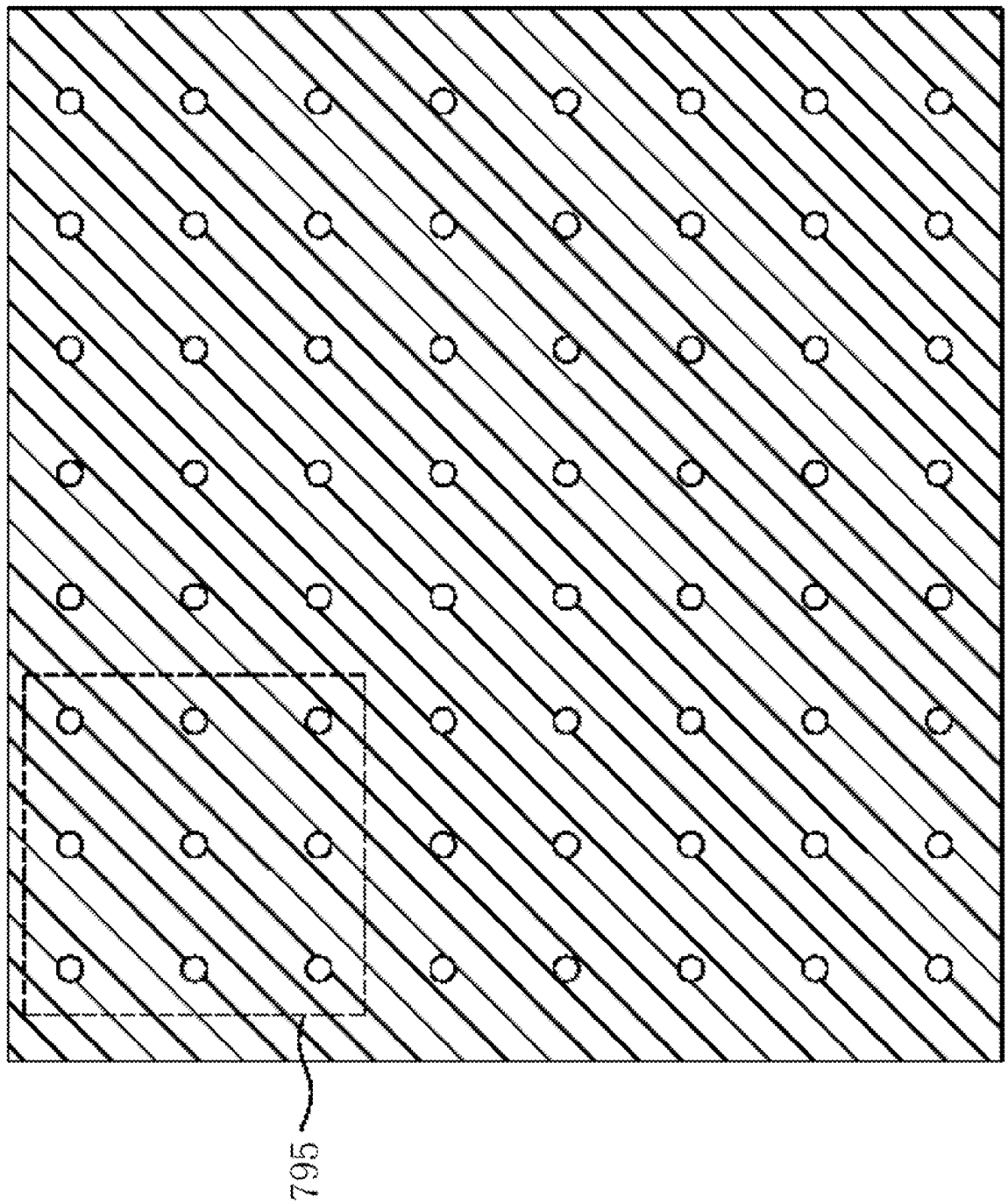

Refer to FIG. 7K, a schematic drawing shows an eleventh kind of projection screen 710. The projection screen 710 includes a light gathering layer 791, a partial light shielding layer 790, a light emitting layer 730 and a scattering layer 750. The partial light shielding layer 790 includes a plurality of light-shielding elements 792 and a plurality of openings 793. The light gathering layer 791 includes a plurality of condensers 794. The projection screen 710 is suitable for the projection system 300.

Refer to FIG. 7KA, a schematic drawing showing structure of the light shielding layer 790 is revealed. The black part represents the light-shielding element 792 while the white circle represents the opening 793. An area of a pixel 795 at the projection screen includes at least one opening 793. If there are several openings 793 in the pixel 795, one opening is located at the center of the pixel while other openings are aligned with the centered one. The pixel 795 in the FIG. 7KA includes 9 openings 793. The tight-shielding elements 792 cover most of the area of the light shielding layer 790. The openings 793 are distributed evenly over the light shielding layer 790 and are allowing light incident to that position passing through. The shape of the cross section of the opening 793 is not limited to circle. It can also be a square. The light-shielding element 792 blocks the light incident thereto completely by reflection or absorption. The light-shielding elements 792 face the side surface of the light emitting layer so as to absorb the excited light and the scattered light completely.

In order to make each position at the projection screen have part of light passing through to improve the efficiency of the laser beam projected, the distance between two adjacent openings 793 should be smaller than a diameter along the cross section of the laser beam.

Refer to FIG. 7KB, a schematic drawing showing structure of the light gathering layer 791 is revealed. The white circle represents the condenser 794. The condenser 794 covers most of the area of the light gathering layer 791 for collecting most of incident light beams. A center of each condenser 794 is aligned with the center of each opening 793. The condenser 794 serves to concentrate light projected thereto, allowing the concentrated light passing through the opening 793, without being blocked by the light-shielding elements 792. The material of the light gathering layer 791 has lower absorption and scattering of the excited light and the scattered light. Thus the light power of the light within the wavelength of the excited light and the scattered light of the projected light beam $L_{S1}$ passes through the opening 793 smoothly.

The light gathering layer 791 and the light shielding layer 790 can be integrated with each other. Under such condition, the opening 793 is filled by the material of the light gathering layer 791. Thus the interface between the light gathering layer 791 and the light shielding layer 790 at the opening area is reduced and the efficiency of light beam incident to the light emitting layer 730 and the scattering layer 740.

After the projected light beam passing through the opening 793 and entering the light emitting layer 730, the light with the excitation light wavelength makes the light emitting layer produce excited light. The excited light from the light emitting layer, together with the light with other wavelength of the projected light beam enters the scattering layer 740 to be scattered. Because the scatter light is emitted in multiple directions, the excited light and the scatter light corresponding to a single opening 793 form a light spot on the surface of the $D_2$ side of the projection screen. The area of the light spot is much larger than the area of the opening. By the proper design of the curvature of the condenser, the thickness of the light shielding layer, the thickness of the light emitting layer, the thickness of the scattering layer, and the distribution of the openings, the light points of each pixel fill the corresponding pixels full as possible. Thus the observer $O_2$ will see the image formed by light points.

Moreover, the surface of the light-shielding element 792 facing the light emitting layer absorbs the excited light and the scattered light completely. Thus part of ambient light $L_{A2}$ that includes light with the wavelength in the excited light spectrum and in the scattered light spectrum is absorbed by the light-shielding element 792. Thus the interference of the ambient light $L_{A2}$ on the projected image is reduced and the projected image has better color contrast.

In an embodiment shown in FIG. 7I, the excited light and the scattered light selected are visible light including red color, green color, blue color, white color or other colors of the increasing color gamut.

Refer to FIG. 7L, a schematic drawing shows a twelfth kind of projection screen 711. The projection screen 711 includes an imaging layer 796, and an anti-ultraviolet (UV) layer 797 on one side or both sides of the imaging layer 796. The light beam is projected onto the imaging layer 796 to form an image and the imaging layer 796 includes all projection screen mentioned in the present invention. The anti-UV layer 797 prevents light with the wavelength in the UV wavelength range entering the imaging layer 796 by reflection or absorption. And the anti-UV layer 797 has lower absorption and scattering of the light with the wavelength of the excitation light and scattered light of the image formed on the imaging layer 796. Thus the light of the projected light beam with the wavelength of the excitation light and the scattered light enters the imaging layer 796 smoothly. The imaging layer 796 may include a light emitting layer 730, a scattering layer 750, an excited light absorption layer 720A, an excitation light absorption layer 740, an excited light and scattered light absorption layer 720B, an excitation light reflection layer 760, an excited light partial reflection layer 770, a partial reflection layer of excitation light and scattered light 780, and various anti-reflection layers. The substrate of above functional layers is made from different chemical substances for various functions such as light emitting, scattering, wavelength-selective absorption, wavelength-selective reflection, etc. The optical properties of these chemical substances and the substrate of the functional layers may be changed under the radiation of UV light. Thus the life span of the imaging layer 796 is reduced. The anti-UV layer 797 located on one side of the imaging layer 796 blocks the light with the wavelength in the UV wavelength range in the ambient light incident from that side so as to stabilize optical properties of the imaging layer 796 and extend the life span of the imaging layer 796.

Embodiment 7

Figure 8:
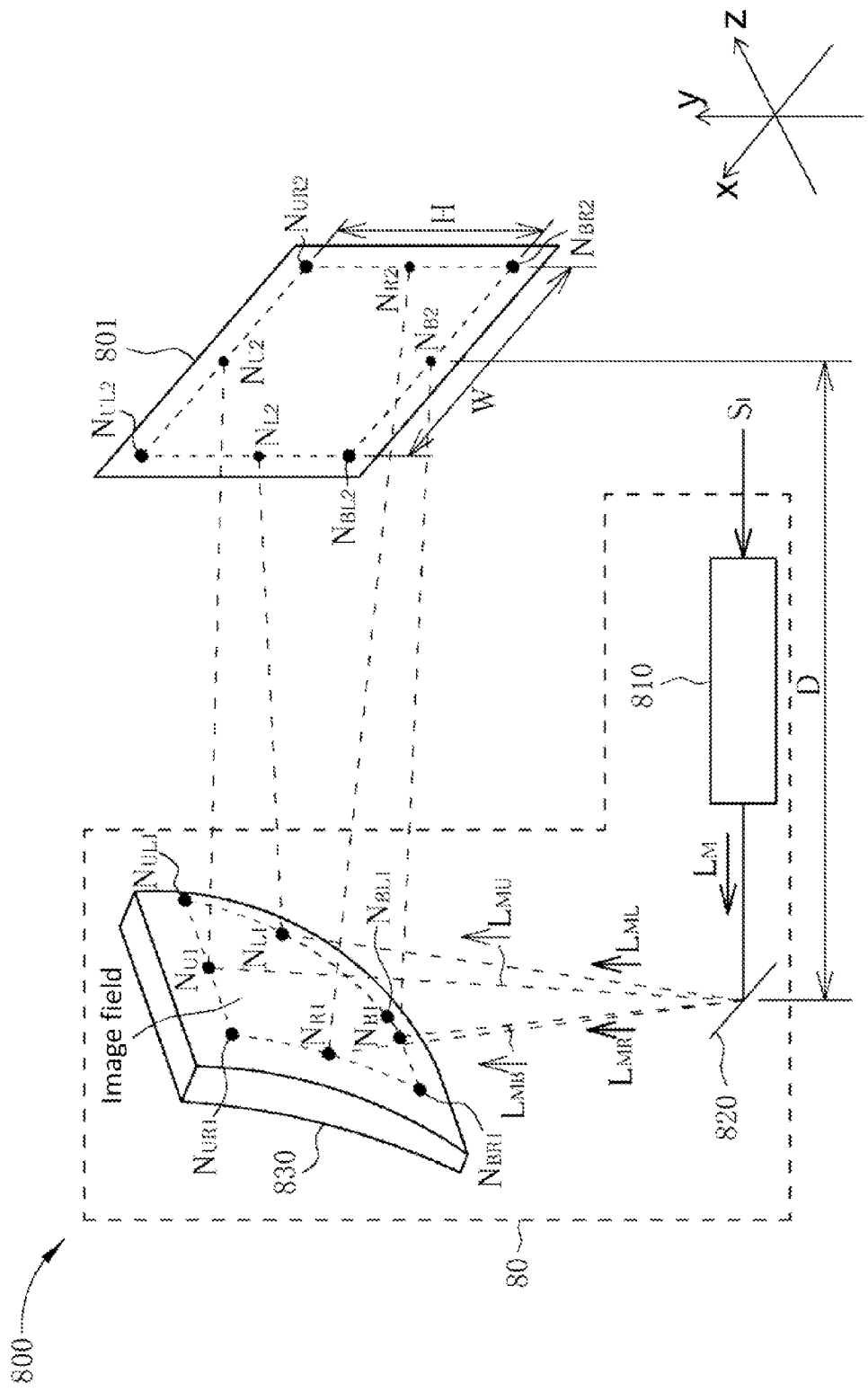
FIG. 8 is a schematic drawing showing a laser projection system that enlarges images displayed of an embodiment according to the present invention.

Refer to FIG. 8, a first embodiment of a laser projection system 800 with enlarged displayed image is revealed. The laser projection system 800 includes a laser projector 80 and a projection screen 801. The laser projector 80 consists of an optical laser module 810, a rotation plane mirror module 820, and a convex mirror 830.

The structure and the operation of the rotation plane mirror module 820 are similar to those of the rotation plane mirror module 240.

The projection screen 801 includes a general projectable surface such as a projection screen, including but not limited to the projection screens 101, 201, 301, 501, 700, 701, 702, 730, 704, 705, 706, 707, 708, 709, 710, and 711 mentioned above.

Figure 1:
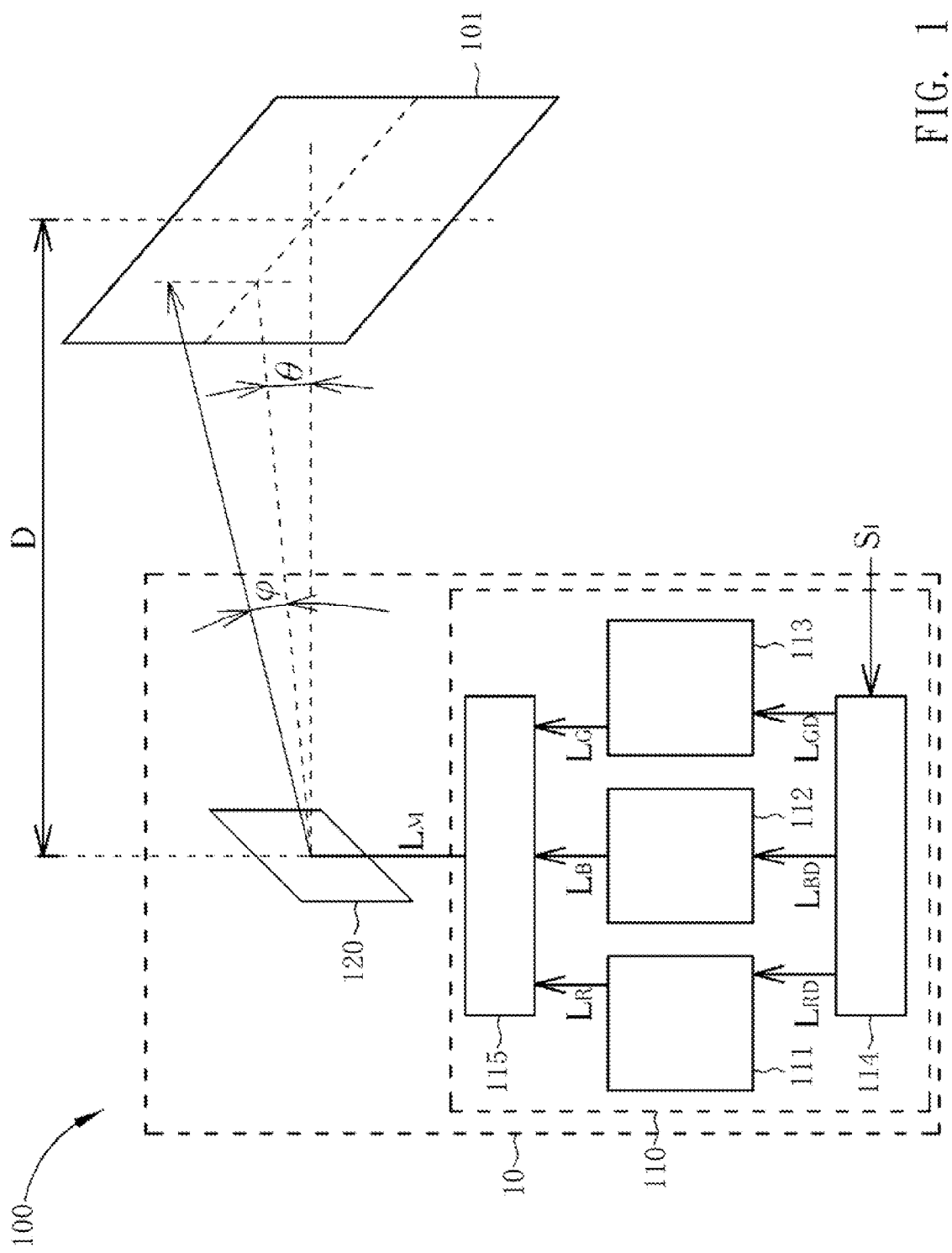
FIG. 1 is a schematic drawing showing a prior art of a laser projection system.

The optical laser module 810 projects a laser beam onto the rotation plane mirror module 820. The structure of the laser optical module 810 includes but not limited to the laser light source module 110 in FIG. 1, the optical laser module 270 in FIG. 2, the optical laser module 370 in FIG. 3, the optical laser module 470 in FIG. 4, and the optical laser module 570 in FIG. 5.

The modulated laser beam $L_M$ emitted from the optical laser module 810 is reflected to the convex mirror 830 by the rotation plane mirror module 820. For example, when the rotation plane mirror module 820 makes the rotation angle of the laser beam in x-z plane is $\theta_{URX}$ and in y-z plane is $\theta_{URY}$, the laser beam $L_M$ is reflect to an end-point $N_{UR1}$ on the convex mirror 830 by the rotation plane mirror module 820. Then the laser beam $L_M$ is reflected to an end-point $N_{UR2}$ on the upper right corner of the projection screen 801 by the convex mirror 830. Similarly, when the rotation plane mirror module 820 makes the rotation angle of the laser beam along the x axis is $\theta_{ULX}$, $\theta_{BRX}$, $\theta_{BLX}$ respectively and the rotation angle of the laser beam along the y axis is $\theta_{ULY}$, $\theta_{BRY}$, $\theta_{BLY}$, the laser beam $L_M$ is reflect to an end-point $N_{UL1}$, $N_{BR1}$, $N_{BL1}$ respectively on the convex mirror 830 by the rotation plane mirror module 820. Then the laser beam $L_M$ is reflected to an end-point $N_{UL2}$ on the upper left corner, an end-point $N_{BR2}$ on the lower right corner, and an end-point $N_{BL2}$ on the lower left corner of the projection screen 801 by the convex mirror 830.

Figure 8B:
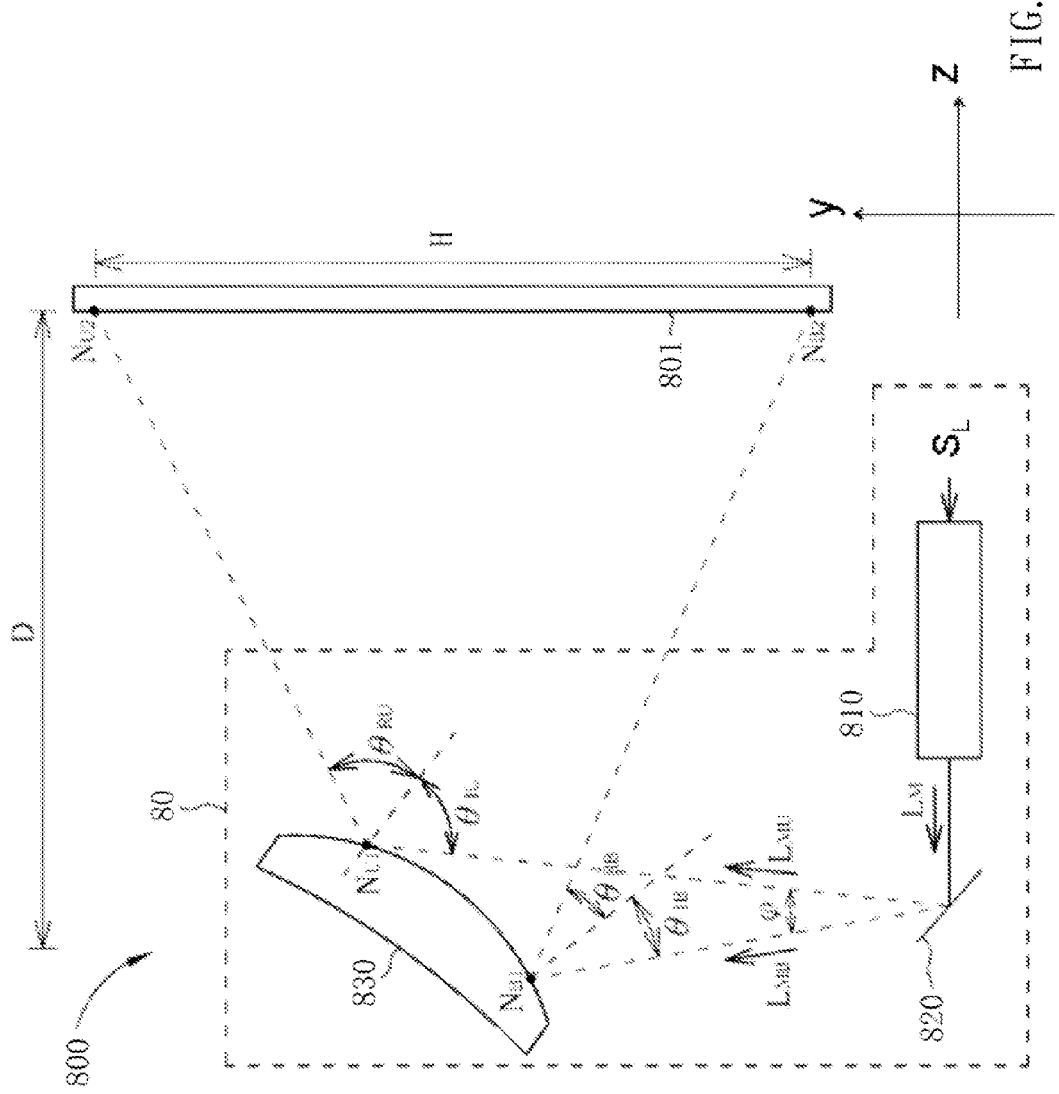
FIG. 8B a side view of a cross section of a laser projection system parallel to the x-y plane according to the present invention.

The scanning angle of the laser beam can be increased through the reflection of the convex mirror 830. Moreover, under the condition that the distance D between the projection screen 801 and the laser projection 80 is fixed, the height and the width of the image are increased. Refer to FIG. 8 and FIG. 8A, FIG. 8A is a top view of a cross section of the laser projection system 800 parallel to the x-z plane. In the x-z plane, the rotation plane mirror module 820 makes the laser beam rotate at an angle θ. Because that the incident angle $\theta_{IL}$ is equal to the reflection angle $\theta_{RL}$ and the incident angle $\theta_{IR}$ is equal to the reflection angle $\theta_{RR}$, the scanning angle of the laser beam is increased from the angle θ to the angle (θ+Δθ) after being reflected by the convex mirror 830 while the angle Δθ is an angle between a normal line to the surface $N_{L1}$, $N_{R1}$ of the convex mirror 830 passing through the point $N_{L1}$ and a normal line to the surface $N_{L1}$ $N_{R1}$ of the convex mirror 830 passing through the point $N_{R1}$. Thus the width W of the projected image is increased under the condition that the distance D between the projection screen 801 and the laser projector 80 is fixed. Refer to FIG. 8B, it is a side view of a cross section of the laser projection system 800 parallel to the x-y plane. The scanning angle of the laser beam is increased from the angle φ to the angle (φ+Δφ) in y-z plane after being reflected by the convex mirror 830 while the angle Δφ is an angle between a normal line to the surface $N_{U1}$ $N_{B1}$ of the convex mirror 830 passing through the point $N_{U1}$ and a normal line to the surface $N_{U1}$ $N_{B1}$ of the convex mirror 830 passing through the point $N_{B1}$. Thus the height H of the projected image is increased under the condition that the distance D between the projection screen 801 and the laser projector 80 is fixed.

Figure 8C:
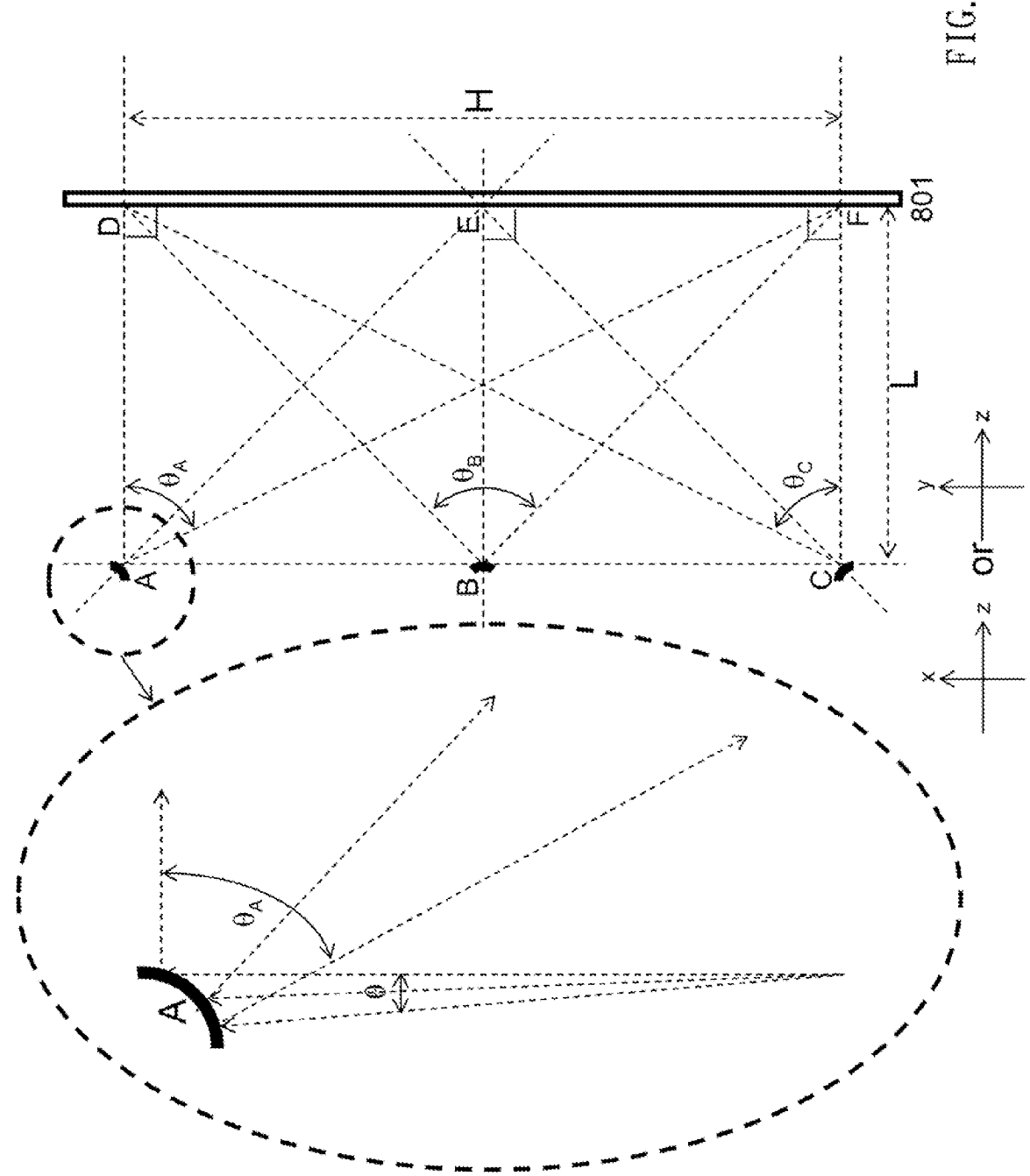
FIG. 8C is a schematic drawing showing a relationship between different positions of a convex mirror of a laser projection system and the increased scanning angle in x-z (or y-z) plane according to the present invention.

The convex mirror 830 is positioned near a central line of the projected image so as to increase curvature thereof and the curvature thereof is symmetrical to a center of the mirror so as to reduce the volume of the convex mirror 830. This helps reduce the cost of the convex mirror 830. Refer to FIG. 8C, a schematic drawing showing a relationship between different positions of the convex mirror and the increased scanning angle in x-z (or y-z) plane. A, B, C respectively represent three different positions the convex mirror 830 is arranged while D, E, F is corresponding to a left-most (or topmost) point, a center point, and a right-most (or lowest) point of the projected image. ∠ADF, ∠BEF, ∠CFD, ∠DAC, ∠EBC, ∠FCA are all right angles. When the laser beam is incident into the convex mirror 830 at the point A, the maximum angle scanned at this plane is $\theta_A$ and the central beam path of the image is AE. When the laser beam is incident into the convex mirror 830 at the point B, the maximum angle scanned at this plane is $\theta_B$ and the central beam path of the image is BE. When the laser beam is incident into the convex mirror 830 at the point C, the maximum angle scanned at this plane is $\theta_C$ and the central beam path of the image is CE. When the laser beam with the scanning angle $\theta_0$ is incident into the convex mirror 830 at the A, B, C point, the maximum angle scanned in this plane is $\theta_A$, $\theta_B$, $\theta_C$ respectively and the central beam path of the image is AE, BE, CE respectively. It is clear from the figure that $\theta_A = \theta_C = \tan^{-1}(H/L)$, $\theta_B = 2*\tan^{-1}(H/2/L)$. Due to the fact that $2*\tan^{-1}(H/2/L) > \tan^{-1}(H/L)$, $\theta_B > \theta_A = \theta_C$, $\theta_B > \theta_A = \theta_C$.

After being reflected by the convex mirror 830 at the point A, the point B, and the point C, the respective increased scanning angle is:

$$\Delta\theta_A = (\theta_A - \theta_0), \Delta\theta_B = (\theta_B - \theta_0), \Delta\theta_C = (\theta_C - \theta_0), \text{ and}$$
$$\Delta\theta_B > \Delta\theta_A = \Delta\theta_C.$$

The increased scanning angle is corresponding to the maximum angle between the normal lines of the convex mirror 830. Thus it is learned that the convex mirror 830 located at the point B has higher curvature change and corresponds to the convex mirror 830 with smaller volume. Moreover, as shown in FIG. 8, ∠DAE>∠EAF, ∠DBE=∠EBF, ∠DCE<∠ECF, the curvature change of the convex mirror 830 located at the point B is symmetrical to an axial line BE while the curvature change of the convex mirror 830 located at the point A/the point C is not symmetrical to an axial line AE/CE. Thus arrange the convex mirror 830 around the central line of the projected image to increase the curvature of the convex mirror 830 and make the curvature symmetrical to the center of the mirror for reducing the volume of the convex mirror 830. This helps reduce manufacturing cost of the convex mirror 830.

Embodiment 8

Figure 9:
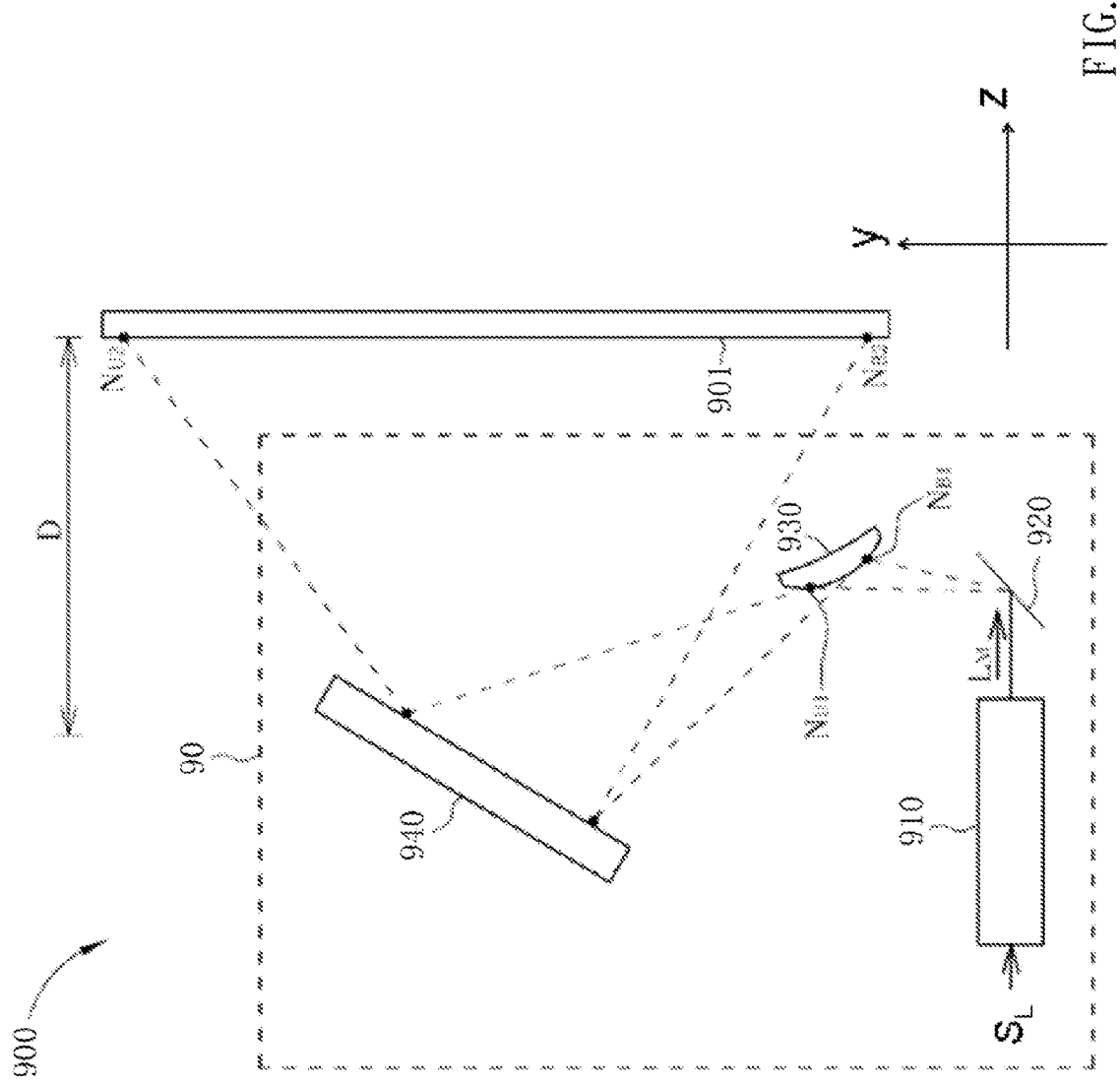
FIG. 9 is a second embodiment of a laser projection system with enlarged images

Refer to FIG. 9, a second embodiment of a laser projection system 900 with enlarged displayed image is revealed. The plane mirror can change direction of the laser beam without changing scanning angle of the laser beam. Thus through the convex mirror 830 and the plane mirror, the distance between the laser projector and the projection screen can be dramatically reduced and the displayed image is enlarged. As shown in the FIG. 9, the laser projection system 900 includes a laser projector 90 and a projection screen 901. The laser projector 90 consists of an optical laser module 910, a rotation plane mirror module 920, a convex mirror 930, and a plane mirror module 940. The structure and operation of the optical laser module 910, the rotation plane mirror module 920, and the convex mirror 930 are similar to those of the optical laser module 810, the rotation plane mirror module 820, and the convex mirror 830. The modulated laser beam $L_M$ reflected by the convex mirror 930 is reflected again to the projection screen 901 by the plane mirror module 940.

Under the condition that the scanning angle of the laser beam remains the same, the longer beam path between the rotation plane mirror module 920 and the projection screen 901, the wider and the higher the projected image. Refer to FIG. 9, although the plane mirror module 940 is unable to increase the scanning angle of the laser beam, it makes the beam path turn. Under the condition that distance D along the z axis between the projection screen and the laser projector, the height H and the width W of the projected image is increased along with the increasing beam path between the rotation plane mirror module 920 and the projection screen 901.

The embodiments in FIG. 8 and FIG. 9 explain how the convex mirror and the plane mirror increase the scanning angle in the laser scanning and projection system. The number of the convex mirror/the plane mirror is not limited.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A laser projection system comprising a projection screen and a laser projector; the laser projector produces excitation light according to at least one image signal of a single static image or dynamic image and projects to the projection screen correspondingly to generate at least one image; wherein the projection screen includes at least one light emitting layer having at least one luminescent material ranging from $F_1$, $F_2$, ..., $F_n$ and the luminescent material is excited to emit excited light with a wavelength range after being exposed to and radiated by the excitation light with another wavelength rang; a transverse distance between particles of respective luminescent material, parallel to the projection screen, is much smaller than a diameter of a cross section of a laser beam;

the laser projector includes a laser light source module, a laser signal modulation module, a rotation plane mirror module, a rotation plane mirror control module, and a signal conversion module;

the signal conversion module receives an image signal $S_1$ of each static image or dynamic image, coverts the image signal $S_1$ into a signals $S_L$ that controls the laser light source module and a signal $S_M$ that controls the rotation plane mirror module, and coordinates light signals of the laser signal modulation module and light signals of the rotation plane mirror module in a synchronous manner;

the laser light source module includes at least one set of laser source, respectively emitting laser beam $L_{1S}$, $L_{2S}$, ..., $L_{nS}$ with wavelength of $_{1L}$, $\lambda_{2L}$, ..., $\lambda_{nL}$, corresponding to and falling within wavelength range $\lambda_{1S}$, $\lambda_{2S}$, ..., $\lambda_{nS}$ of the excitation light for respective luminescent material of the light emitting layer so as to excite each luminescent material of the light emitting layer for producing light with wavelength of $\lambda_{1E}$, $\lambda_{2E}$, ..., $\lambda_{nE}$;

each laser beam $L_{1S}$, $L_{2S}$, ..., $L_{nS}$ is incident into the rotation plane mirror module or firstly is aligned by an alignment module to generate a gross modulated laser beam ($L_M$) and then is incident into and is reflected by the rotation plane mirror module to form a modulated scanning laser beam or gross modulated scanning laser beam $L_S$ that is projected onto the projection screen;

the rotation plane mirror module is used to rotate a certain angle θ at a first plane and rotate a certain angle φ at a second plane that is not parallel to the first plane;

the rotation plane mirror control module is used to control rotation of the rotation plane mirror module, receive the signal $S_M$ from the signal conversion module and coverts the signal $S_M$ into signal that controls rotation angle of the rotation plane mirror module so that the rotation angle of the rotation plane mirror module is controlled by the rotation plane mirror control module to be changed along with the time, allowing the modulated scanning laser beam or the gross modulated scanning laser beam $L_s$ progressively scanning each position of the projection screen that is intended to produce exited light;

according to the image signal $S_1$ of a single static image or dynamic image from the signal conversion, the laser signal modulation module generates respective driving current $I_i$ corresponding to each laser light source so as to modulate light power of the respective laser beam $L_{iS}$ with specific wavelength.

2. The system as claimed in claim 1, wherein the luminescent material is a fluorescent material, a phosphorescent material, a laser dye, or a laser crystal.

3. The system as claimed in claim 1, wherein the light emitting layer absorbs most of energy of excitation light and reduces scattering and absorption of visible light so that the light emitting layer looks transparent.

4. The system as claimed in claim 3, wherein particle diameter of the luminescent material of the light emitting layer is smaller than the shortest wavelength of visible light so that the light emitting layer looks transparent.

5. The system as claimed in claim 1, wherein the light emitting layer is a layer of substrate having a plurality of luminescent materials distributed evenly at each position that may be irradiated by the excitation light so as to produce light energy of the excited light per unit area required.

6. The system as claimed in claim 1, wherein the light emitting layer includes a plurality layers of substrate and each layer of substrate having at least one luminescent material that is distributed evenly at each position that may be irradiated by the excitation light so as to produce light energy of the excited light per unit area required.

7. The system as claimed in claim 1, wherein the light emitting layer is a substrate plate used to load microparticle of various luminescent materials; the respective microparticle includes different substrate and different luminescent material; each microparticle is distributed evenly or unevenly at each position of the substrate plate that may be irradiated by the excitation light.

8. The system as claimed in claim 7, wherein in the light emitting layer, each luminescent material is dissolved in a respective solution, disposed on the substrate plate by ink-jet printing, evaporation, and then cured to form microparticles on the substrate plate.

9. The system as claimed in claim 1, wherein and excited light emitted by a single excitation light irradiated from a light source is having at least two wavelengths should be avoided; while selecting laser wavelength and luminescent materials of the light emitting layer, the overlapping between wavelength $\lambda_{iS}$ and $\lambda_{jS}$ should be reduced, wherein $1 \leq i, j \leq n$ and $\lambda_{iE} \neq \lambda_{jE}$ so that light power per unit area of the light with the wavelength of $\lambda_{1E}, \lambda_{2E}, \ldots, \lambda_{nE}$ generated at each point of the projection screen is under control of light power of excitation light $L_{1S}, L_{2S}, \ldots, L_{nS}$.

10. The system as claimed in claim 1, wherein there are m kinds of luminescent materials in the light emitting layer, $m \geq 2$, and each luminescent material is excited by excitation light with different wavelength range $\lambda_{1mS}, \lambda_{2mS}, \ldots, \lambda_{mmS}$ while the excited light generated is with the same wavelength $\lambda_{iE}$; the laser light source module is arranged with a number of m laser sources whose wavelength is corresponding to respective excitation light wavelength range of the luminescent material; thus the light energy per unit area of the excited light with wavelength of $\lambda_{iE}$ at positions each light beam projected onto the light emitting layer is equal to the total excited light of m luminescent materials excited by m laser light sources.

11. The system as claimed in claim 1, wherein the luminescent material with wider excitation wavelength $\lambda_{iS}$ and excited light wavelength $\lambda_{iE}$ is selected and used in the light emitting layer while a number of $m_2$ light sources is disposed in the laser light source module whose wavelength is within the excitation wavelength $\lambda_{iS}$ of the luminescent material and the number $m_2$ is greater than or equal to 2 ($m_2 \geq 2$); thus the light energy per unit area of the excited light with wavelength of $\lambda_{iE}$ on the positions each light beam projected onto the light emitting layer is equal to the total excited light of the luminescent material excited by the number of $m_2$ laser light sources.

12. The system as claimed in claim 1, wherein scanning pattern of the modulated scanning laser beam or gross modulated scanning laser beam $L_S$ over the projection screen is Raster scanning, Lissajous scanning or Vector scanning.

13. The system as claimed in claim 1, wherein in order to make light energy of an unit area at a certain position on the projection screen being excited by the $i^{th}$ excited wavelength become $P_{iE}$, the light power $P_{iS}$ of the laser beam $L_{iS}$ with excitation wavelength needs to be adjusted or time τ of the laser beam scanning over the certain position on the projection screen needs to be adjusted when the gross modulated scanning laser beam $L_S$ scans that position. Thus the luminescent material at the certain position of the projection screen is excited to produce $P_{iE}$ light energy per unit area;

$$P_{iE}(x,y)=P_{iS}(x,y)*\tau(x,y)*C_i(P_{iS}(x,y),D_i(x,y))$$

wherein $P_{iE}(x,y)$ is light energy per unit area of the excited light from $i^{th}$ luminescent material at the position (x, y) of the projection screen excited by the light beam $L_{iS}$; (x,y) is coordinate space that defines the position, $P_{iS}(x,y)$ represents light power of the light beam $L_{iS}$ while scanning the position (x,y), $P_{iS}(x,y)=P_{iS}(x,y)*L_O$; $P_{iS}(x,y)$ is light power of the light beam $L_{iS}$ emitted from the laser light source module while scanning the position (x,y), $L_O$ is loss coefficient of the light beam $L_{iS}$ passing through all optical elements between the projection screen and the laser light source module and reflected by the rotation plane mirror module; τ(x,y) is scanning time of the gross modulated scanning laser beam $L_s$ through the position (x,y), $C_i(P_{iS}(x,y), D_i(x,y))$ is light power conversion efficiency per unit area of the $i^{th}$ luminescent material at the position (x,y) that converts excitation wavelength $\lambda_{iS}$ into the excited wavelength $\lambda_{iE}$ and is affected by $P_{iS}(x,y)$ and $D_i(x,y)$; $D_i(x,y)$ is a density of the $i^{th}$ luminescent material at the position (x,y);

wherein under the condition that $C_i(P_{iS}(x,y), D_i(x,y))$ of the $i^{th}$ luminescent material is not affected by $P_{iS}(x,y)$:

$$C_i(P_{iS}(x,y),D_i(x,y))=C_i(D_i(x,y));$$

wherein (x,y) is obtained according to rotation mode of the rotation plane mirror module and $L_O$ and $C_i(P_{iS}(x,y), D_i(x,y))$ are obtained by measurement so that $P_{iS}(x,y)$ is adjusted into $P_{iE}(x,y)$ required by the laser signal modulation module.

14. The system as claimed in claim 13, wherein when density of luminescent materials at each position of the projection screen is the same, $D_i(x,y)=D_i$, a value of the $P_{iS}(x,y)$ is adjusted according to scanning time $\tau(x,y)$ of the gross modulated scanning laser beam $L_S$ through the position (x,y) so as to make each position on the projection screen achieve preset light energy per unit area $P_{iE}$.

15. The system as claimed in claim 13, wherein when the scanning pattern is Raster scanning, or Lissajous scanning and density of the $i^{th}$ luminescent material at each position of the projection screen is the same, for achieving the same light energy per unit area of the excited light with the wavelength of $\lambda_{iS}$, a calculation is as following:
if time is set as zero (t=0), the rotation angle of the rotation plane mirror control module $\theta(0)=\phi(0)=0$ and the following equations are obtained:

$\theta(t)=\theta*\sin(2\pi/T_\theta*t)$;

$\phi(t)=\phi*\sin(2\pi/T_\phi*t)$;

wherein $\theta$ and $\phi$ respectively represent maximum rotational angle of the laser beam along the X axis and the Y axis reflected by the 2D rotation mirror while $T_\theta$ and $T_\phi$ respectively represent rotation cycle of the laser beam along the X axis and the Y axis;
wherein when the projection screen is a flat surface in which a point of (x,y)=(0,0) is perpendicular to the laser beam $\theta=0, \phi=0$, following equation is obtained:

$x=D*\tan(\theta(t))$ and $y=D*\tan(\theta(t))$;

wherein D is the shortest distance between the rotation plane mirror and the projection screen;
wherein in accordance with the above equations, scanning speed of the X axis, $v_x(x)=dx/dt$, and scanning speed of the Y axis are obtained so that scanning speed at the point (x,y) is $v(x,y)=(v_x^2(x)+v_y^2(y))^{1/2}$;
wherein $P_{iS}(x,y)$ is proportional to $v(x,y)/C_i(P_{iS}(x,y), D_i)$;
wherein $P_{iS}(x,y)$ is proportional to $v(x,y)=(v_x^2(x)+v_y^2(y))^{1/2}$ under the condition that $C_i(P_{iS}(x,y), D_i(x,y))$ of the ith luminescent material is not affected by $P_{iS}(x,y)$ so as to make the light energy per unit area at the projection screen become equivalent.

16. The system as claimed in claim 13, wherein if rotation speed of the rotation plane mirror control module allows time required by the modulated scanning laser beam or the gross modulated scanning laser beam LS passing through each position of the projection screen less than an exposure time for image capture of an observer, the laser beam scans each position of the projection screen and each light spot is excited so as to form an image; the exposure time for image capture of the observer means persistence of vision, the fact that human eyes retain an image for about one-sixteenth of a second after seeing it; the exposure time for image capture of the observer is similar to exposure time for each image in cameras.

17. The system as claimed in claim 13, wherein if rotation time of the rotation plane mirror control mirror is longer than exposure time for image capture of an observer, the laser beam scans each position of the projection screen and each light spot is excited so as to form a plurality of images; when rotation speed of the rotation plane mirror control mirror makes updating time of each image become smaller than exposure time for image capture of the observer, the observer sees the plurality of images as continuous dynamic images.

18. The system as claimed in claim 13, wherein when the projection system is a full color laser projection display system in which a single primary color is $\alpha$-bit ($2^\alpha$ levels) and color intended displayed at a position of the projection screen is corresponding to $n_R$, $n_G$, $n_B$ level red, green, blue colors, the light powers $P_{RL}$, $P_{GL}$, $P_{BL}$ of laser beams $L_{RS}$, $L_{GS}$, $L_{BS}$ scanning that position are adjusted so as to make the light emitting layer of the projection screen emit red, green, blue color light with the light power $(n_R-1)/(2^\alpha-1)*P_{REM}$, $(n_G-1)/(2^\alpha-1)P_{GEM}$, $(n_B-1)/(2^\alpha-1)P_{BEM}$ per unit area respectively; wherein $P_{REM}$, $P_{GEM}$, $P_{BEM}$ respectively are maximum light power per unit area of red light, green light and blue light and there is a certain ratio between $P_{REM}$, $P_{GEM}$, $P_{BEM}$ so as to achieve white balance.

19. The system as claimed in claim 18, wherein a $\gamma$ (Gamma Correction Factor) factor is introduced to adjust the light power $P_{RL}$, $P_{GL}$, $P_{BL}$ of the laser beams $L_{RS}$, $L_{GS}$, $L_{BS}$ passing through that position if a fact that human eyes are more sensitive to visible light with lower power is taken into consideration, and light power per unit area of red, green, blue color light from the light emitting layer of the projection screen is $[(n_R-1)/(2^\alpha-1)]^{1/\gamma}P_{REM}$, $[(n_G-1)/(2^\alpha-1)]^{1/\gamma}P_{GEM}$, $[(n_B-1)/(2^\alpha-1)]^{1/\gamma}P_{BEM}$ respectively.

20. The system as claimed in claim 18, wherein if each position of the projection screen with $n_R$, $n_G$, $n_B$ level of red, green and blue color light shows the same lightness, hue and chroma is required, the maximum light power $P_{RLM}$, $P_{GLM}$, $P_{BLM}$ of the laser beams $L_{RS}$, $L_{GS}$, $L_{BS}$ is adjusted according to distribution density of each luminescent materials and scanning speed of the laser beam at each position of the projection screen.

21. The system as claimed in claim 1, wherein the light emitting layer of the projection screen is added with w kinds of luminescent material with broadband emission and w≥1; the luminescent material with broadband emission is excited to produce light with wavelength $\lambda_{1WE}, \lambda_{2WE}, \ldots, \lambda_{wWE}$ and light with the wavelength $\lambda_{iWE}$ covers not only one primary color light, 1≤i≤w; a number of w laser light sources with wavelength $\lambda_{1WS}, \lambda_{2WS}, \ldots, \lambda_{wWS}$ is arranged at the laser light source module and the wavelength $\lambda_{1WS}, \lambda_{2WS}, \ldots, \lambda_{wWS}$ is respectively within the excitation wavelength range of the w kinds of luminescent materials.

22. The system as claimed in claim 21, wherein a ratio of the light power of the w kinds of laser light sources is designed to make total light energy of excited light from w kinds of luminescent material with broadband emission with broadband wavelength $\lambda_{1WE}, \lambda_{2WE}, \ldots, \lambda_{wWE}$ achieve white balance.

23. The system as claimed in claim 1, wherein g kinds of luminescent material that increases the color gamut is added into the light emitting layer of the projection screen and g≥1; the luminescent material that increases the color gamut is excited to generate light with wavelength of $\lambda_{1GE}, \lambda_{2GE}, \ldots, \lambda_{gGE}$; in the CIE Chromaticity Diagram, area formed by the (g+3) wavelength including $\lambda_{1GE}, \lambda_{2GE}, \ldots, \lambda_{gGE}$ and $\lambda_{RE}, \lambda_{GE}, \lambda_{BE}$ is larger than area formed by the wavelength of $\lambda_{RE}, \lambda_{GE}, \lambda_{BE}$; the laser light source module is disposed with a number of g laser light sources whose wavelength are within excitation wavelength range of g kinds of luminescent materials that increase the color gamut.

24. The system as claimed in claim 1, wherein of the excitation light is with wavelength of invisible light or wavelength of light less sensitive for eyes, including laser light with wavelength of 405 nm, 780 nm, 808 nm, 850 nm, 980 nm, or 1064 nm, used as the laser light source of the laser light source module.

25. The system as claimed in claim 1, wherein the excitation light used as laser light source of the laser light source module is laser light with wavelength of 405 nm and violet purple color, or 450 nm with blue color so as to excite the light emitting layer and produce blue images with about 450 nm wavelength so as to reduce messed-up colors caused by reflection or scattering of excitation light.

26. The system as claimed in claim 1, wherein the excitation light used as laser light source of the laser light source module is laser light with wavelength of 780 nm red color, or 640 nm red color so as to excite the light emitting layer and produce red images with about 640 nm wavelength so as to reduce messed-up colors caused by reflection or scattering of excitation light.

27. The system as claimed in claim 1, wherein a 405 nm semiconductor laser is used as the laser light source of the laser light source module; a two-dimensional rotatable micro-electromechanical systems (MEMS) mirror or two one-dimensional rotatable MEMS mirror assembled form the rotation plane mirror module; the light emitting layer of the projection screen includes a luminescent material that is excited by 405 nm wavelength to produce red, blue or green visible light.

28. The system as claimed in claim 1, wherein the projection screen is attached to a front windshield of a vehicle and the laser projector is installed in a vehicle to project laser beams onto the projection screen; the signal conversion module receives an image signal from image source elements having computers, mobile phones, GPS (global positioning system), night vision cameras, or visible light cameras in a wired or wireless way and then projects various information including vehicle speed, mileage, oil consumption, map, warning signals, direction signs, incoming call information on the projection screen.

29. The system as claimed in claim 1, wherein the laser light source module further includes a type one laser light source module and a type two laser light source module while a corresponding transparent projection screen includes a light emitting layer and a scattering layer; the light emitting layer is in front of the scattering layer, facing light beam projected from the laser projector; the type one laser light source module includes at least one set of laser sources, respectively emitting laser light with type one wavelength $\lambda_{i1L}$ that is corresponding to and within excitation light wavelength range $\lambda_{is}$ of various luminescent materials in the light emitting layer so as to excite each luminescent material in the light emitting layer and produce excited light with wavelength of $\lambda_{iE}$; the type two laser light source module includes at least one set of laser sources, respectively emitting laser light with type two wavelength $\lambda_{i2L}$; the light emitting layer has low absorption and scattering of the laser light with the type two wavelength $\lambda_{i2L}$ so that the laser light with the type two wavelength $\lambda_{i2L}$ passes through the light emitting layer and enters the scattering layer while most of the laser light with the type one wavelength $\lambda_{i1L}$ emitted from the type one laser light source module is absorbed by the light emitting layer; the scattering layer is used to scatter the laser light with the type two wavelength $\lambda_{i2L}$ and the excited light that is emitted from the light emitting layer and is excited by the laser light with the type one wavelength $\lambda_{i1L}$.

30. The system as claimed in claim 29, wherein an interface of the light emitting layer facing scanning light beam projected by the laser projector is disposed with at least one anti-reflection layer so as to reduce reflection of the laser light with the type one wavelength $\lambda_{i1L}$, the laser light with the type two wavelength $\lambda_{i2L}$ and the excited light from the light emitting layer; thus a ratio of the laser light with the type one wavelength $\lambda_{i1L}$ entering the light emitting layer is increased, a ratio of the laser light with the type two wavelength $\lambda_{i2L}$ entering the scattering layer is increased, a ratio of the excited light from the light emitting layer entering external environment through the interface is increased, a ratio of the light scattered by the scattering layer and entering external environment through the interface is increased and an observer in front of the interface of the projection screen sees the excited light with higher brightness and the scattered light with higher brightness.

31. The system as claimed in claim 29, wherein an interface between the light emitting layer and the scattering layer is arranged with at least one anti-reflection layer so as to increase a ratio of the laser beam with the type two wavelength entering the scattering layer as well as a ratio of light scattered by the scattering layer and entering environment outside the light emitting layer; thus an observer located outside the light emitting layer of the projection screen sees the scattered light with higher brightness.

32. The system as claimed in claim 29, wherein an interface between the light emitting layer and the scattering layer is disposed with at least one high-reflection layer related to the laser light with the type one wavelength so as to reflect residual energy of the laser light with the type one wavelength modulated passing through the light emitting layer and the residual energy is back to the light emitting layer for increasing light power of the excited light; thus observer located outside the light emitting layer of the projection screen see the scattered light with higher brightness.

33. The system as claimed in claim 29, wherein there is a ratio between light energy of the laser light with the type two wavelength per unit area at projected to a position of the projection screen and a value obtained by light power of the laser light with the type two wavelength scanning at the position of the projection screen multiplying time the laser light scanning the position, multiplying a value of scattering efficiency; the ratio is not related to the position at the screen.

34. The system as claimed in claim 29, wherein the type two laser light source module is added with a number of h laser light sources with wavelength of $\lambda_{1HE}, \lambda_{2HE}, \ldots, \lambda_{hHE}$ and h≥1; in a CIE Chromaticity Diagram, an area formed by the (h+3) wavelength including $\lambda_{1HE}, \lambda_{2HE}, \ldots, \lambda_{hHE}$ and $\lambda_{RE}, \lambda_{GE}, \lambda_{BE}$ is larger than an area formed by the wavelength of $\lambda_{RE}, \lambda_{GE}, \lambda_{BE}$; the signal conversion module converts the image signal into image information related to $\lambda_{RE}, \lambda_{GE}, \lambda_{BE}$, $\lambda_{1GE}, \lambda_{2GE}, \ldots, \lambda_{gGE}$, and $\lambda_{1HE}, \lambda_{2HE}, \ldots, \lambda_{hHE}$ for control of laser beams $L_{RS}, L_{GS}, L_{BS}$, light power of both the type one laser light source module with g laser light sources and the type two laser light source module with h laser light sources so that a color of a position of the projection screen scanned by laser beams is displayed vividly.

35. The system as claimed in claim 34, wherein the (3+g+h) (g, h≥0) wavelength including $\lambda_{RE}, \lambda_{GE}, \lambda_{BE}, \lambda_{1GE}, \lambda_{2GE}, \ldots, \lambda_{gGE}$ and $\lambda_{1HE}, \lambda_{2HE}, \ldots, \lambda_{Hh}$ produced on the projection screen are excited by laser light from the type one laser light source module or formed by scattering of laser light from the type two laser light source module; the light emitting layer includes at least one luminescent material that is excited by the laser source of the type one laser light source module to produce light with wavelengths within part of the (3+g+h) wavelength while light with the rest part of the wavelength within the (3+g+h) wavelength is produced by the type two laser light source module.

36. The system as claimed in claim 29, wherein blue laser and red laser are used as laser light sources of the type one laser light source module and one luminescent material in the light emitting layer is excited by 405 nm laser light, 980 nm laser light or 1064 nm laser light so as to produce green color images.

37. The system as claimed in claim 1, wherein the light emitting layer of the projection screen is divided into a plurality of pixels corresponding to screen resolution displayed.

38. The system as claimed in claim 37, wherein a single pixel includes red subpixel, blue subpixel and green subpixel; an area of each subpixel is not necessary the same and arrangement of subpixels in adjacent pixels can be the same or different from one another.

39. The system as claimed in claim 38, wherein each of the three subpixels is distributed with respective luminescent material and the laser light source module of the laser projection system includes at least one set of laser light source emitting light beam $L_L$ with wavelength of $\lambda_L$; the $\lambda_L$ is within wavelength range of the excitation light of the three luminescent materials in the three subpixels of the light emitting layer.

40. The system as claimed in claim 39, wherein the minimum length of each subpixel is larger than a diameter of the cross section of the laser beam $L_L$ and there is a certain distance between adjacent subpixels so as to avoid the laser beam $L_L$ projecting onto at least two subpixels at the same time.

41. The system as claimed in claim 40, wherein scanning pathway of the laser beam is aligned with the arrangement of the subpixels on the projection screen so as to avoid the laser beam projecting onto at least two subpixels at the same time while when the laser is turned off when the laser beam projects onto at least two subpixels that are excited by the laser beam at the same time.

42. The system as claimed in claim 37, wherein each single pixel includes four subpixels, red, blue, green, and white; an area of each subpixel is not necessary the same and arrangement of subpixels in adjacent pixels can be the same or different from one another.

43. The system as claimed in claim 37, wherein each single pixel includes four subpixels, red, blue, green, white and g kinds of subpixels that increase the color gamut while $g \geq 1$.

44. The system as claimed in claim 1, wherein position of the projection screen is disposed with high distribution density luminescent material $F_i$, so that light generated at the position is with wavelength of higher light power per unit area.

45. The system as claimed in claim 44, wherein a static image formed on the projection screen is determined according to distribution density of various luminescent materials $F_i$ in the light emitting layer at each position of the projection screen.

46. The system as claimed in claim 45, wherein in order to make the luminescent material $F_i$ at each position of the projection screen have the same density and generate the same light energy of the wavelength $\lambda_{iE}$ per unit area, the laser beam scanning each position of the projection screen provides the same light energy of the excitation light per unit area; and light power $P_L(x,y)$ of the laser beam passing through a position (x,y) is proportional to scanning speed v(x,y) at that position; the signal coordination module is used for synchronization of the light power of the laser light source and the rotation angle of the rotation plane mirror control module; when light beam $L_L$ has the same light power during scanning process and the light power of the laser light source and the rotation angle of the rotation plane mirror control module are controlled synchronously, each position of the projection screen produces wavelength $\square_{iE}$ with the same light energy per unit area due to that distributed density of the luminescent material $F_i$ at each position of the projection screen is proportional to the scanning speed v(x,y) of the laser beam passing through the position (x,y).

47. The system as claimed in claim 45, wherein the laser projector in the laser projection system uses a broadband light source or a narrowband light source to replace the laser light source as projection light sources; the broadband light source or the narrowband light source is a light tube or light bulb that emits light to excite the luminescent materials in the projection screen for producing red color, green color, blue color, white color or other colors that increase the color gamut.

48. The system as claimed in claim 1, wherein the projection screen includes an excited light absorption layer and a light emitting layer; the excited light absorption layer absorbs the excited light emitted from the light emitting layer so as to reduce the excited light entering an outer surface side of the excited light absorption layer; thus an observer or optical receiver only sees a displayed image or detects the excited light from the light emitting layer at the outer surface side of the excited light absorption layer while at the outer surface side of the excited light absorption layer, no image displayed can be seen or the excited light from the light emitting layer is detected.

49. The system as claimed in claim 1, wherein the projection screen includes an excited light absorption layer, a light emitting layer, and an excitation light absorption layer; the projected light beam is projected onto the projection screen by an outer surface side of the excited light absorption layer; the excitation light absorption layer absorbs light within the projected light beam $L_S$ having wavelength that excites the light emitting layer and has less absorption and scattering of the excited light so that the excited light from the light emitting layer is transmitted to an outer surface side thereof smoothly and seen by an observer while no image produced by the light emitting layer due to background light from the outer surface side of the excitation light absorption layer.

50. The system as claimed in claim 1, wherein the projection screen includes an excited light and scattered light absorption layer, a light emitting layer and a scattering layer; the projected light beam is projected onto the projection screen by an outer surface side of the light emitting layer; a single direction of incident laser light is forced to deviate by the scattering layer to generate light scattered in different directions with the same wavelength of the incident laser light; the excited light and scattered light absorption layer not only absorbs light with wavelength in the excited light spectrum but also the light with wavelength in the scattering spectrum.

51. The system as claimed in claim 1, wherein the projection screen includes a light emitting layer and an excitation light reflection layer; residual energy of projected light beams passing through the light emitting layer is reflected by the excitation light reflection layer and turned back to the light emitting layer to excite luminescent materials in the light emitting layer again so as to increase lighting efficiency of the projection screen and avoid the projected light beam passing through the projection screen and entering an outer surface side of the excitation light reflection layer to be seen by an observer; the excitation light reflection layer has quite low absorption and scattering of the excited light so that the excited light enters outer surface side of the excitation light reflection layer smoothly.

52. The system as claimed in claim 51, wherein a scattering layer is arranged at an outer surface side of the excitation light reflection layer.

53. The system as claimed in claim 1, wherein the projection screen includes an excited light absorption layer, a light emitting layer, an excitation light reflection layer, and a scattering layer in order so as to increase lighting efficiency of the light emitting layer and ensure that light power of projected light beam projected from an outer surface side of the excited light absorption layer will not enter an outer surface side of the scattering layer to be received by the observer.

54. The system as claimed in claim 1, wherein the projection screen includes an excited light absorption layer, a scattering layer, an excitation light reflection layer, and a light emitting layer in order for increasing lighting efficiency of the light emitting layer and an projected light beam is projected from an outer surface side of the light emitting layer to the projection screen.

55. The system as claimed in claim 1, wherein the projection screen includes an excited light partial reflection layer and a light emitting layer; the excited light partial reflection layer allows the excited light no matter incident from which side passing therethrough at a certain ratio while the rest is reflected and there is a high ratio of the excitation light passing through the excited light partial reflection layer; when background light on a first outer surface side of the projection screen is smaller than background light on a second outer surface side, projected images on the projection screen are seen by observers on both outer surface sides of the projection screen at the same time; the observer on the first outer surface side can see the observer on the second outer surface side while the observer on the second outer surface side can't see the observer on the first outer surface side.

56. The system as claimed in claim 1, wherein the projection screen includes a partial reflection layer of excitation light and scattered light, a light emitting layer, and a scattering layer; the partial reflection layer of excitation light and scattered light is used to partially reflect light within spectrum of the excited light and light within spectrum of the scattered light.

57. The system as claimed in claim 1, wherein the projection screen includes a partial reflection layer of excitation light and scattered light, and a scattering layer and a light emitting layer; when projected light beam is incident from an outer surface side of the light emitting layer, the laser beam will not be reflected by the partial reflection layer of excitation light and scattered light before entering the scattering layer.

58. The system as claimed in claim 1, wherein the projection screen includes a light gathering layer, a partial light shielding layer, a light emitting layer and a scattering layer; the partial light shielding layer includes a plurality of light-shielding elements and a plurality of openings; the light gathering layer includes a plurality of condensers; an area of each pixel at the projection screen includes at least one opening; opening corresponding to the same pixel are aligned with a center of the pixel.

59. The system as claimed in claim 58, wherein the condenser that covers most area of the light gathering layer and gathers most of incident light is used to concentrate light, allowing the concentrated light passing through the opening.

60. The system as claimed in claim 58, wherein a distance between two adjacent openings is smaller than a diameter of a cross section of the laser beam so that part of laser light passes through each position of the projection screen projected by a single laser beam for improving efficiency of the projected laser beam.

61. The system as claimed in claim 1, wherein an anti-ultraviolet (UV) layer is disposed on one side or two sides of the projection screen so as to stabilize properties of the projection screen and extend life span of the projection screen.

62. The system as claimed in claim 1, wherein the laser projector further includes at least one convex mirror disposed between the rotation plane mirror module and the projection screen therein so that the laser beam from the laser projector is reflected to the convex mirror by the rotation plane mirror module and then is projected to the projection screen so as to increase scanning angle of the laser beam for increasing height and width of the projected image under condition that a distance between the projection screen and the laser projector is fixed.

63. The system as claimed in claim 62, wherein the convex mirror is disposed around a central line of an image intended to be projected, or a left-most point, a topmost point, a right-most point or a lowest point of the projected image.

64. The system as claimed in claim 62, wherein the laser projector further includes at least one plane mirror module arranged between the convex mirror and the projection screen so that laser beam from the laser projector is reflected to the convex mirror by the rotation plane mirror module and then is reflected by the plane mirror module to be projected onto the projection screen for increasing scanning angle of the laser beam.

\* \* \* \* \*